(12) United States Patent
Yamauchi et al.

(10) Patent No.: US 8,169,672 B2
(45) Date of Patent: May 1, 2012

(54) IMAGE SCANNING DEVICE AND ILLUMINATING DEVICE THAT DIVIDE A LIGHT BEAM FROM A LIGHT SOURCE INTO MULTIPLE LIGHT BEAMS AND DIRECT THE MULTIPLE LIGHT BEAMS TO A TARGET

(75) Inventors: Satoshi Yamauchi, Kanagawa (JP); Fumihiro Nakashige, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1135 days.

(21) Appl. No.: 11/886,578

(22) PCT Filed: Mar. 20, 2006

(86) PCT No.: PCT/JP2006/305504
§ 371 (c)(1),
(2), (4) Date: Jan. 23, 2008

(87) PCT Pub. No.: WO2006/098468
PCT Pub. Date: Sep. 21, 2006

(65) Prior Publication Data
US 2008/0316548 A1    Dec. 25, 2008

(30) Foreign Application Priority Data

Mar. 18, 2005 (JP) .................................. 2005-080772
Mar. 17, 2006 (JP) .................................. 2006-075711

(51) Int. Cl.
*H04N 1/04* (2006.01)
(52) U.S. Cl. ........ 358/475; 358/474; 358/509; 358/486; 382/275; 369/44.11
(58) Field of Classification Search .................. 358/474, 358/497, 483, 475, 509, 486, 482; 382/275, 382/254; 369/112, 44.11, 116, 112.02, 53.33
See application file for complete search history.

(56) References Cited

U.S. PATENT DOCUMENTS
4,847,734 A    7/1989    Katoh et al.
(Continued)

FOREIGN PATENT DOCUMENTS
EP    0 395 156 A1    10/1990
(Continued)

OTHER PUBLICATIONS

Notice of Rejection of Japanese Patent Application 2006-075711, issue date Apr. 26, 2011.

*Primary Examiner* — Neguisse Worku
(74) *Attorney, Agent, or Firm* — Dickstein Shapiro LLP

(57) ABSTRACT

A disclosed image scanning device illuminates a document with a light source, focuses light reflected from the document on an image sensor to obtain one-dimensional images of the document, and obtains a two-dimensional image of the document from the one-dimensional images. The device includes an illumination lens for dividing a light beam emitted from the light source into multiple light beams and a combining unit for combining the multiple light beams on the document. A disclosed image scanning method includes the steps of illuminating a document with a light source; focusing light reflected from the document on an image sensor to obtain one-dimensional images of the document; and obtaining a two-dimensional image of the document from the one-dimensional images. In this method, a light beam from the light source is divided into multiple light beams and the multiple light beams are combined on the document. A disclosed image forming apparatus includes the image scanning device.

11 Claims, 45 Drawing Sheets

U.S. PATENT DOCUMENTS

| | | | | |
|---|---|---|---|---|
| 5,235,349 A * | 8/1993 | Yamazaki | | 347/241 |
| 5,333,066 A * | 7/1994 | Sugata | | 358/471 |
| 5,726,436 A * | 3/1998 | Oka et al. | | 250/201.5 |
| 5,889,750 A * | 3/1999 | Summers et al. | | 369/112.24 |
| 5,942,746 A * | 8/1999 | Tsai | | 250/208.1 |
| 5,942,749 A * | 8/1999 | Takeuchi et al. | | 250/214.1 |
| 6,307,661 B1 * | 10/2001 | Fujibayashi et al. | | 359/207.1 |
| 6,339,214 B1 * | 1/2002 | Takakura et al. | | 250/208.1 |
| 6,466,372 B1 * | 10/2002 | Morris et al. | | 359/567 |
| 6,714,323 B1 | 3/2004 | Onishi et al. | | |
| 6,876,471 B1 * | 4/2005 | Konno | | 358/500 |
| 7,129,503 B2 * | 10/2006 | Valley et al. | | 250/397 |
| 7,170,845 B2 * | 1/2007 | Ogasawara | | 369/112.02 |
| 7,688,700 B2 * | 3/2010 | Ooi et al. | | 369/112.05 |
| 7,831,106 B2 * | 11/2010 | Elsner et al. | | 382/254 |
| 7,843,612 B2 * | 11/2010 | Kimura et al. | | 358/474 |
| 7,894,105 B2 * | 2/2011 | Amimoto | | 358/474 |
| 7,944,794 B2 * | 5/2011 | Fujita et al. | | 369/103 |
| 2003/0156303 A1 | 8/2003 | Schnee et al. | | |
| 2005/0018255 A1 * | 1/2005 | Nakaya et al. | | 358/497 |
| 2006/0044628 A1 * | 3/2006 | Huang | | 358/475 |
| 2006/0158696 A1 * | 7/2006 | Amimoto | | 358/474 |
| 2008/0062478 A1 * | 3/2008 | Tatsuno | | 358/509 |
| 2008/0239922 A1 * | 10/2008 | Fujita et al. | | 369/103 |
| 2009/0262415 A1 * | 10/2009 | Cottingame et al. | | 359/341.1 |
| 2010/0074580 A1 * | 3/2010 | Aizawa et al. | | 385/33 |

FOREIGN PATENT DOCUMENTS

| | | |
|---|---|---|
| JP | 62-053565 | 3/1987 |
| JP | 09-051405 | 2/1997 |
| JP | 09-247364 | 9/1997 |
| JP | 10-190990 | 7/1998 |
| JP | 2000-250146 | 9/2000 |
| JP | 2000-253213 | 9/2000 |
| JP | 2002-184206 | 6/2002 |
| JP | 2003-280094 | 10/2003 |
| JP | 2004-235861 | 8/2004 |
| JP | 2004-252411 | 9/2004 |
| JP | 2005-204272 | 7/2005 |
| JP | 2006-025403 | 1/2006 |

\* cited by examiner (a) COLLIMATED LIGHT AREA (b) COLLIMATED LIGHT AREA

R B G

→ PRIMARY OPTICAL AXIS

R  B  G (a) (b)

(c)

(d)

FIG.19
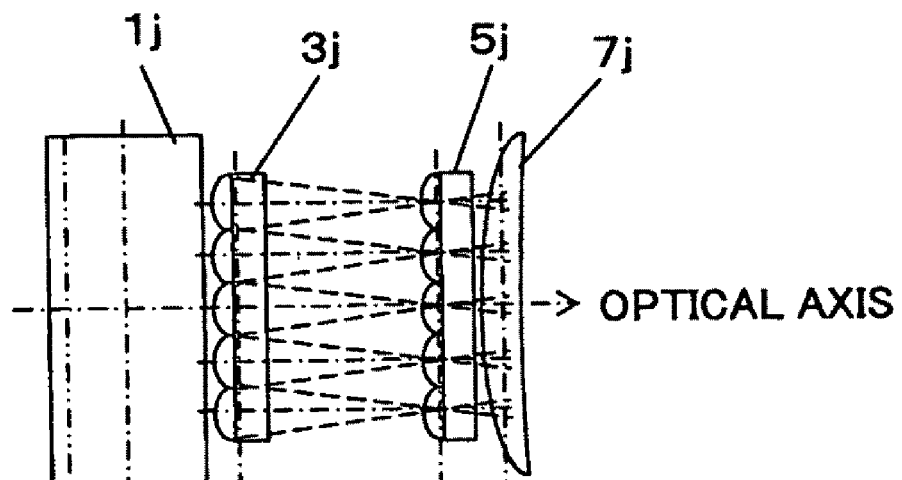
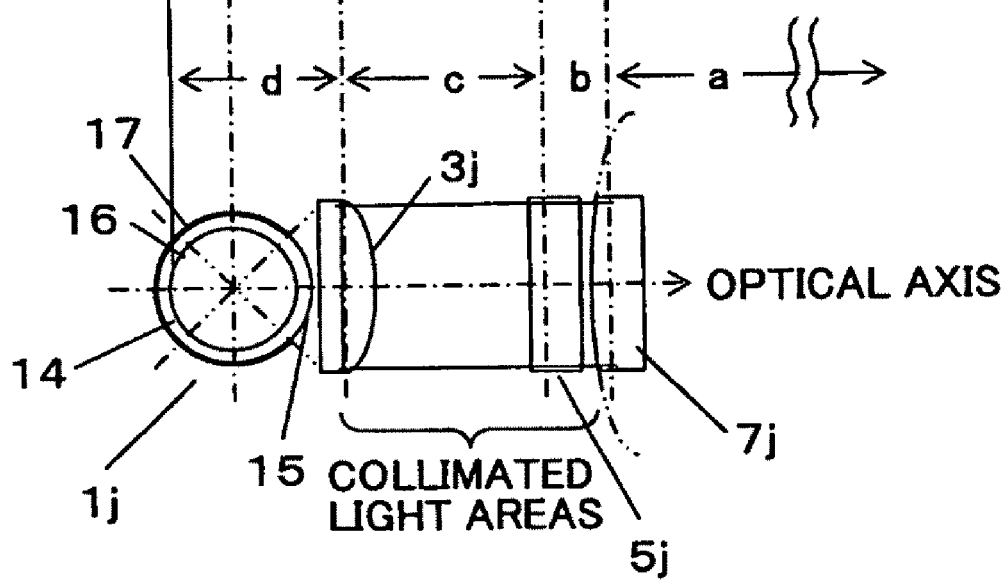

FIG.55A
FIG.55C
FIG.55B
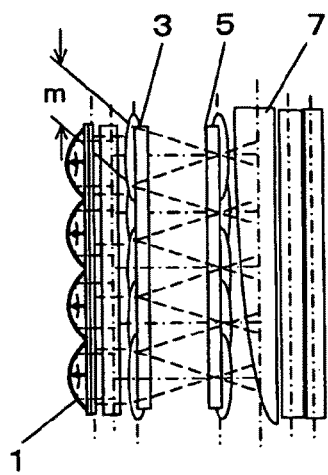
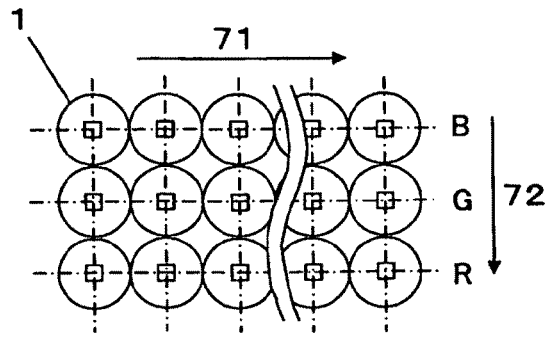
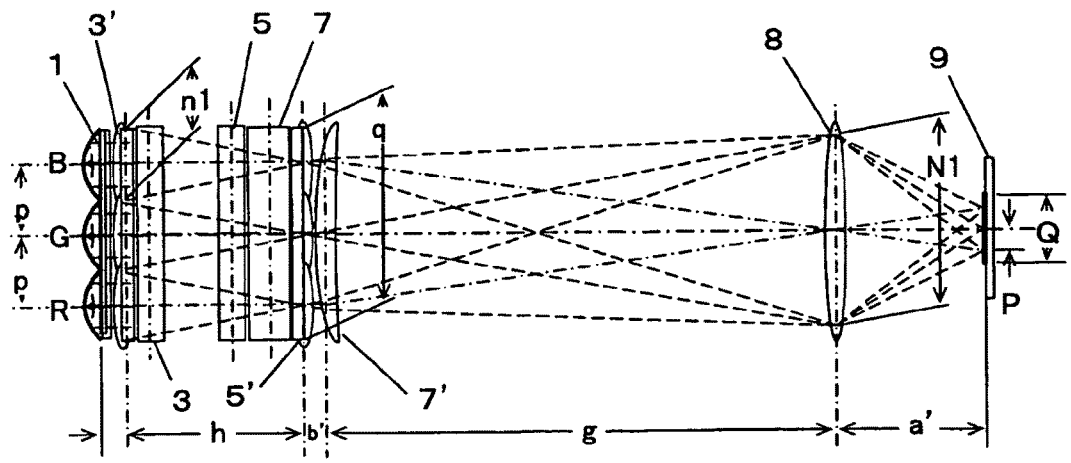

FIG.61B
(a)
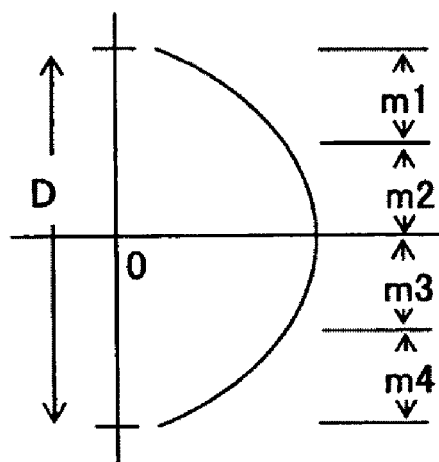
(b)
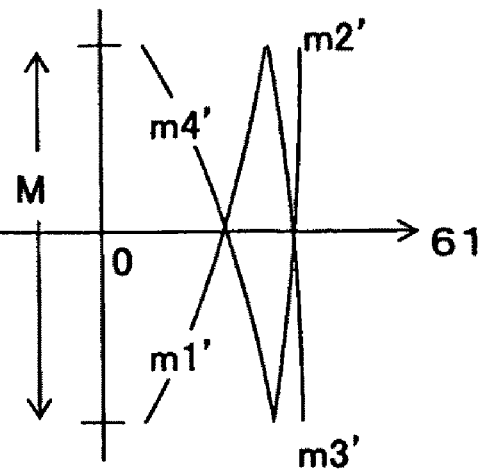

IMAGE SCANNING DEVICE AND ILLUMINATING DEVICE THAT DIVIDE A LIGHT BEAM FROM A LIGHT SOURCE INTO MULTIPLE LIGHT BEAMS AND DIRECT THE MULTIPLE LIGHT BEAMS TO A TARGET

TECHNICAL FIELD

The present invention relates to an illuminating device, an illumination method, an image scanning device, an image scanning method, an image forming apparatus, and an image forming method.

BACKGROUND ART

Image scanning devices disclosed in patent documents 1 through 4 include light sources that are disposed away from a document surface and do not include reflectors. Such a configuration makes it possible to reduce production costs, to scan high-quality images by reducing flare, and to reduce the size of an image scanning device.

Patent document 1 discloses an image scanning device in which flare is reduced by placing a light source away from a document surface and removing a reflector. However, the image scanning device disclosed in patent document 1 has the following problems (1) through (4).

Patent document 2 discloses an image scanning device in which production costs are reduced by eliminating a reflector. However, similar to the above, the image scanning device disclosed in patent document 2 has the following problems (1) through (4).

Patent document 3 discloses an image scanning device including an image sensor and light sources arranged above and below the image sensor. The light sources share an imaging optical system of the image sensor. Light emitted from the light sources is illuminated onto a scanning position on the document surface, with the use of a mirror arranged near the document surface. However, the image scanning device disclosed in patent document 3 has the following problems (1) through (4).

Patent document 4 discloses an image scanning device in which an image sensor and a light source share an imaging optical system to scan and illuminate the same position on a document surface with the use of a half mirror. However, the image scanning device disclosed in patent document 4 has the following problem (5).

The above-mentioned problems (1) through (5) are described below.

(1) The imaging optical axis and the illumination optical axis are substantially the same and perpendicular with respect to the document surface. Therefore, the reading value changes according to the luster gloss of the document. (At least, the angles of these light axes with respect to the normal line of the document surface are not specified).

(2) The light source is arranged away from the document surface. Therefore, in order to illuminate a sufficient amount of light on the document surface, it is necessary to provide an intensive light source or a condenser such as a lens, which leads to increased costs. Furthermore, an increased amount of power is required for driving the light source.

(3) If a light source is arranged beneath the imaging lens, the height of the image scanning device will be increased. This cancels out the effect of making the image scanning device compact by eliminating the reflector and the like.

(4) The illumination optical axis does not completely coincide with the imaging optical axis. This causes a shortage in the amount of illumination for scanning a lifted-up portion of the document or a portion at the center of a book document.

In particular, in the image scanning devices disclosed in patent documents 1 and 2, first and second carriages travel while scanning a two-dimensional document image. The positions of mirrors of the first and second carriages change intermittently according to the operation of scanning the document. Accordingly, the positions at which illuminated light reaches the document surface change. As a result, the brightness of the scanned image changes, and high-grade images cannot be scanned.

(5) By providing a half mirror, the cost of the image scanning device will increase. Furthermore, each time the illumination light emitted from the light source is reflected by the half mirror and when the light reflected from the document surface passes through the half mirror, the light amount decreases by one-half. As a result, the final valid illumination amount becomes a quarter of that emitted from the light source, thus increasing the power loss of the power source. Moreover, illumination light irradiated from the half mirror toward the lens is inevitably reflected from the lens surface and is then incident on the image sensor. This constantly causes flare. Consequently, it is difficult to achieve a sufficient SN ratio in image scanning.

As described above, in the image scanning devices disclosed in patent documents 1 through 4, the utilization rate of the light quantity emitted from the light source is extremely low.

Patent document 5 discloses an illuminating device for a projector. The illuminating device disclosed in patent document 5 is basically used for irradiating a surface. Hence, patent document 5 does not disclose a method for efficiently irradiating a line. Furthermore, patent document 5 does not disclose a method of applying the illuminating device to an image scanning device.

Examples of a typical image scanning device are described with reference to FIGS. 1 through 4.

FIG. 1A is a schematic diagram of a typical image scanning device and FIG. 1B is a cut-away side of the image scanning device in the sub-scanning direction.

In an image scanning device 100, a document 107 is placed on a contact glass 108. Light emitted from a lamp 109 and light reflected from a reflector 110 that received the light emitted from the lamp 109 are irradiated onto an imaging area 111 of the document 107. The light reflected from the document 107 is reflected by a deflecting mirror 113 in a first moving body 103, and also by a turn-around mirror A 112a and a turn-around mirror B 112b in a second moving body 104, and is imaged onto a one-dimensional image sensor 101 by an imaging lens 102. In this manner, the one-dimensional image sensor 101 acquires a one-dimensional image of the linear imaging area 111. The direction in which the one-dimensional image sensor 101 acquires this one-dimensional image is referred to as a main scanning direction.

In the image scanning device 100, the first moving body 103 and the second moving body 104 receive a driving force from a motor 105 through a drive transmitting unit 106. The first moving body 103 travels at a speed that is twice as high as that of the second moving body 104. As a result, the imaging position of the imaging lens 102 with respect to the surface of the contact glass 108 is maintained on the surface of the one-dimensional image sensor 101, while light travels along the surface of the contact glass 108 in a direction perpendicular to the linear imaging area 111 and parallel to the contact glass 108. In this manner, the one-dimensional image sensor 101 sequentially scans an image of the document 107 placed on the contact glass 108, so that a two-dimensional image is acquired. The direction in which the first moving body 103 and the second moving body 104 travel is referred to as a sub-scanning direction.

Generally, a one-dimensional CCD is used as the image sensor. The imaging lens 102 reduces the image on the surface of the contact glass 108, and focuses the reduced image on the one-dimensional image sensor 101.

The traveling speed ratio of the first moving body 103 and the second moving body 104 is set at 2:1, i.e., the movement distance of the second moving body 104 is half of that of the first moving body 103. The distance from the imaging area 111 to the imaging lens 102 or to the one-dimensional image sensor 101 is constant, regardless of the positions of the first moving body 103 and the second moving body 104.

Generally, the image resolution of a scanner is expressed in DPI (dots per inch). The image resolution of a scanner installed in a digital PPC often falls in a range of 400 DPI through 600 DPI. A color scanner employs three CCDs, each having a sensitivity for a light spectrum of R (red), G (green), and B (blue). The optical path lengths between each of the CCDs and the document are equal. A 3 line CCD may be employed as an image sensor, which 3 line CCD is used for R (red), G, (green), and B (blue) and is arranged in a sub scanning direction. In this case, the distance between the pixel rows is approximately 4 dots through 8 dots of the main scanning reading area of CCD pixels. Each pixel row is not necessarily integrated. Accordingly, if the 3 line CCD is used as the image sensor in the above-described image scanning device, the scanning positions on a document corresponding to CCD pixels of R, G, and B, will be different. Therefore, light for illuminating the document needs to be irradiated at scanning positions corresponding to each of the colors.

FIG. 2 is a schematic diagram of another type of image scanning device.

In this type of image scanning device shown in FIG. 2, the reducing optical system includes an image sensor 201 and an imaging lens 202. A document 204 is placed on a platen 203, and an image of the document 204 is scanned, without providing an optical system such as mirrors between the image sensor 201 or the imaging lens 202 and the document 204. The present invention can be applied to this type of image scanning device. In the image scanning device shown in FIG. 2, when a one-dimensional CCD is employed as the image sensor 201, a two-dimensional image of the document 204 can be scanned by scanning the document 204 on the platen 203 along one direction or by causing a unit including the imaging lens 202 and the image sensor 201 to travel along one direction. Generally, in such an image scanning device, natural light (room light) is used as the illumination light or a light source that uniformly illuminates the platen 203 is provided. However, if natural light is used, the light quantity of natural light will be unstable, and the illuminance of natural light on the document 204 will often become low. Therefore, this image scanning device may not be able to scan images of the document 204 with high quality.

Next, problems (1) through (5) of a typical image scanning device are described.

(1) Energy Saving in Image Scanning Device

In a scanner acting as an image scanning device, the illumination lamp is the element that consumes the largest amount of power. Particularly, as the image scanning speed increases, the charge storage time of the CCD will decrease. As a result, an illumination lamp with high brilliance will be needed and power consumption of the scanner will increase.

Conventionally, the light source provided in a scanner has changed from a halogen lamp to a xenon arc lamp, and then to an LED, in order to achieve higher luminous efficacy.

FIG. 3 illustrates the relationship between an illuminating area and a scanning area in an image scanning device. FIG. 3 illustrates the relationship between an illuminating area 305 and a scanning area 302 of a scanner 300 acting as an image scanning device. As shown in FIG. 3, under the current conditions, the illuminating area 305 that is illuminated by illumination light 304 from a light source 303 is much larger than the scanning area 302 on the surface of a document 301 scanned by a CCD. For example, in a scanner of 600 dpi, the width of illumination necessary for scanning an image of the document 301 is 42.3 µm, whereas the actual width of the illumination area is approximately 20 mm. The simple energy efficiency of light obtained by comparing these widths is only about 0.5%. This means that energy is wasted for approximately 99.5% of the remaining light.

(2) Reducing the Size (Making a Thin-model) of Image Scanning Device

Efforts have been made to reduce the size of a scanner acting as an image scanning device by reducing the thickness of the scanner. In a reducing optical system of a scanner provided with a first moving body and a second moving body, a lamp and a reflector included in the first moving body are particularly the most problematic factors, which are limiting the layout of the first moving body. These elements have been obstacles in the attempt to make thinner scanners. Particularly, in the case of a digital PPC (plain paper copier) including a scanner, if the built-in printer is large, the position of the scanner surface for placing a document will become high. This will make it troublesome for a short person to place the document on the scanner.

(3) Reducing Costs of Image Scanning Device

A CCD and an imaging lens are the most costly elements in a scanner acting as an image scanning device. The next costly elements are an illumination lamp and accessories thereof. Particularly, a xenon arc lamp requires high voltage, and thus requires a power pack. Moreover, a lamp is provided in a first moving body, and therefore, a flexible power source line is necessary.

(4) Flare

A scanner acting as an image scanning device has a built-in illuminating device. In a typical scanner, a linear image of a document is scanned, and then a moving body moves along so that a linear image can be scanned at another position. This operation is repeated so that a two-dimensional image of the document can be scanned. (This type of scanning operation is referred to as line sequential image scanning. Particularly, scanning in the direction of reading a line is referred to as main scanning, and scanning in a direction perpendicular to that of the main scanning and parallel to the document surface is referred to as sub-scanning). Flare may occur in the course of scanning an image.

FIG. 4 is a diagram for describing illumination in an image scanning device and how flare occurs in the image scanning device.

In an image scanning device 400 employing a fluorescent tube as a light source 401, an illumination light 402 from the light source (fluorescent tube) 401 is irradiated onto a document surface 403, directly or via a reflector 404. The light irradiated on the document surface 403 is reflected from the document surface 403, passes through an opening 406 of the light source 401, and reaches a fluorescent surface 407 of the light source 401. Next, the light that has reached the fluorescent surface 407 is reflected from the fluorescent surface 407, and becomes a re-illumination light 405 illuminating the document surface 403 once again, thereby generating flare. (The illumination light that reaches the document surface from the illuminating device is referred to as a primary illumination light. The light that is reflected from the document surface and illuminates the document surface once again is referred to as a secondary illumination light).

If such flare occurs, even if an image area having a uniform density in a document is scanned, the image signals scanned by the scanner will vary due to different densities in the document around the scanning area. The image signals vary because when the primary illumination light is reflected from the document surface, the reflection light quantity changes according to different densities in the image of the document. As a result, the illumination light quantity, which is the total of the primary illumination light and the secondary illumination light, changes according to the document densities. Particularly, flare occurs considerably at portions where there is a rapid difference in the densities of the image in a document.

FIG. 5 illustrates an image scanned with an image scanning device, in which flare has occurred. In FIG. 5, a boundary portion 502 between black patterns 501 is scanned as a darker area than a white pattern 503. The white pattern in the image of the original document has a uniform density, and therefore, it is apparent that the quality of the scanned image of the boundary portion 502 is low (ideally, the boundary portion 502 and the white pattern 503 should have the same brightness). The boundary portion 502 is between the black patterns 501, and both edges outside the boundary portion 502 are black. Therefore, when the scanner scans the boundary portion 502, the secondary illumination light decreases relatively compared to that of the white pattern.

Generally, a scanner scans an area of a document with a low reflectance as a dark image, and scans an area of a document with a high reflectance as a bright image. That is, when the scanner scans a document with images of black characters, the white portions of the characters become relatively dark in the scanned image. As a result, contrasts in the image decrease, and may thus make it difficult to read the characters. This occurs because the secondary illumination light basically illuminates the document surface once again around the position from which the illumination light has been reflected. Accordingly, at portions where there is a rapid difference in the density of the image (e.g., a boundary portion between black and white patterns), the light quantity of the secondary illumination light varies significantly.

Thus, at the stage of designing the scanner, optical elements are coated black and the layout of the optical elements are adjusted, so that the secondary illumination light reflected from the document surface does not illuminate the document once again. However, it is not possible to completely prevent the secondary illumination light from being illuminated once again, and therefore, flare has been a problem in improving the quality of scanned images. Particularly, if portions around characters are distinctly darker than the characters, the background of a copied image will become soiled, thus creating an image with extremely low quality.

(5) Shadow in Book Document

FIG. 6 is a diagram for describing a shadow that appears in an image scanned from a book document. When scanning an image of a book document 601 placed on a contact glass 602 as shown in FIG. 6, a center portion 603 of the book document 601 is lifted up from the surface of the contact glass 602. When an image scanning device provided with a typical illumination optical system scans the book document 601 placed in this manner, an illumination light 605 does not reach a scanning position 604 corresponding to pixels of an image sensor. As a result, the scanned image becomes dark in this portion.

Accordingly, it is necessary to appropriately design the configuration and the arrangement of an illumination system in an image scanning device, in order to increase the utilization rate of light, save energy, make the image scanning device thin and compact, reduce the cost of the image scanning device, realize high image quality by reducing flare and preventing a shadow from appearing in an image of a book document, and reduce illuminance irregularities on the target surface.

Patent document 1: Japanese Laid-Open Patent Application No. 2000-253213

Patent document 2: Japanese Laid-Open Patent Application No. 2000-250146

Patent document 3: Japanese Laid-Open Patent Application No. H10-190990

Patent document 4: Japanese Laid-Open Patent Application No. H9-51405

Patent document 5: Japanese Laid-Open Patent Application No. 2003-280094

DISCLOSURE OF INVENTION

Problems to be Solved by the Invention

An object of the present invention is to provide an illuminating device, an illumination method, an image scanning device, an image scanning method, an image forming apparatus, and an image forming method, in which the utilization rate of light is increased.

Means for Solving the Problems

A first embodiment of the present invention provides an image scanning device that illuminates a document with a light source unit, focuses light reflected from the document on an image sensor using an imaging lens to obtain one-dimensional images of the document, and obtains a two-dimensional image of the document from the one-dimensional images. The image scanning device comprises an illumination lens including multiple lenses and configured to divide a light beam emitted from the light source unit into multiple light beams, and a combining unit configured to combine the multiple light beams on the document.

A second embodiment of the present invention provides an image scanning method. The image scanning method includes the steps of illuminating a document with a light source; focusing light reflected from the document on an image sensor using an imaging lens to obtain one-dimensional images of the document; and obtaining a two-dimensional image of the document from the one-dimensional images; wherein a light beam emitted from the light source is divided into multiple light beams and the multiple light beams are combined on the document.

A third embodiment of the present invention provides an image forming apparatus including the image scanning device of the first embodiment.

A fourth embodiment of the present invention provides an illuminating device for illuminating a target with light emitted from a light source unit The illuminating device includes at least one light-beam illumination element configured to obtain multiple light beams from the light emitted from the light source unit and to direct the multiple light beams to the target in at least one plane.

A fifth embodiment of the present invention provides an illumination method of illuminating a target with light emitted from a light source. The illumination method includes the steps of obtaining multiple light beams from the light emitted from the light source in at least one plane; and directing the multiple light beams to the target.

A sixth embodiment of the present invention provides an image scanning device including the illuminating device of the fourth embodiment and configured to illuminate a document having an image formed thereon with light emitted from a light source and to scan the image by receiving light reflected from the document.

A seventh embodiment of the present invention provides an image scanning method that includes the steps of illuminating a document having an image formed thereon with light emitted from a light source and scanning the image by receiving light reflected from the document. The image scanning method uses the illumination method of the fifth embodiment to illuminate the document with the light from the light source.

An eighth embodiment of the present invention provides an image forming apparatus including the image scanning device of the sixth embodiment and configured to scan an image on a document and to form the scanned image on a recording medium.

A ninth embodiment of the present invention provides an image forming method that comprises the steps of scanning an image on a document and forming the scanned image on a recording medium. The image forming method uses the image scanning method of the seventh embodiment to scan the image on the document.

ADVANTAGEOUS EFFECT OF THE INVENTION

According to the present invention, an illuminating device, an illumination method, an image scanning device, an image scanning method, an image forming apparatus, and an image forming method are provided, in which the utilization rate of light is increased.

BRIEF DESCRIPTION OF THE DRAWINGS

FIG. 11A is a top view of the illumination system, FIG. 11B is a front view of the illumination system, and FIG. 11C is a side view of the illumination system;

FIG. 12A is a top view of the first example of the illumination system, and FIG. 12B is a front view of the first example of the illumination system;

FIG. 13A is a top view of the second example of the illumination system, and FIG. 13B is a front view of the second example of the illumination system;

FIG. 14A is a top view of the illumination system, FIG. 14B is a front view of the illumination system, and FIG. 14C is a side view of the illumination system;

FIG. 18B illustrates a luminescence intensity distribution of the fluorescent tube acting as the light source;

FIG. 19 is a diagram for describing a second illumination system of the image scanning device according to the fourth embodiment of the present invention, (a) is a top view of the second illumination system and (b) is a front view of the second illumination system;

FIGS. 55A through 55C are a top view, an elevational view, and a side view of an exemplary color illumination system with an improved utilization rate of light according to an embodiment of the present invention;

FIG. 61B is a diagram used to describe an exemplary illumination system where a cylinder lens array comprising an even number of cylinder lenses is provided for each light source, in which (a) shows the intensity distribution of a light beam emitted from a light source and (b) shows illuminance distributions on a target surface.

Figure 1A:
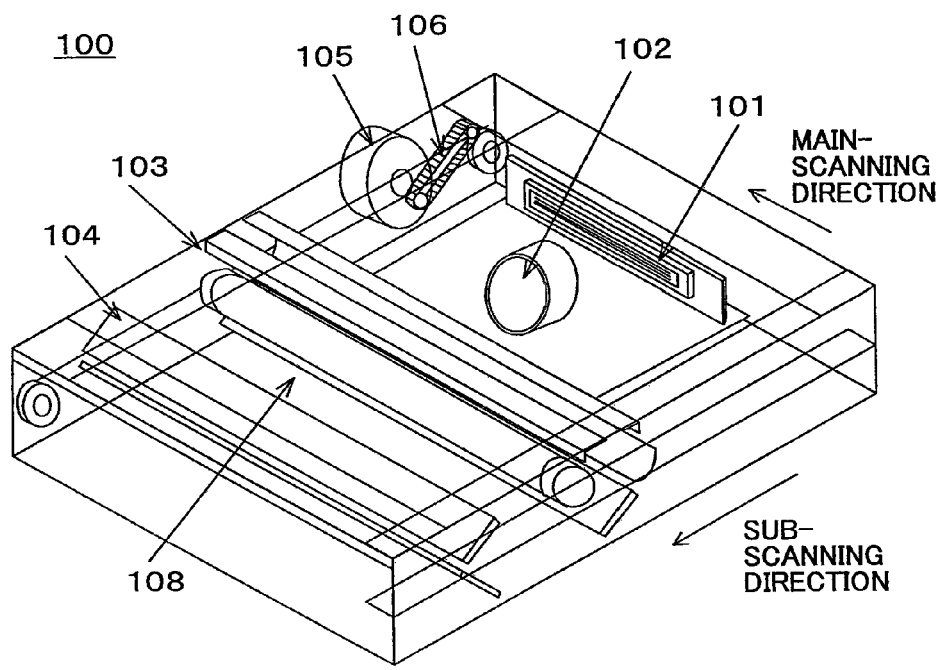
FIG. 1A is a schematic diagram of a typical image scanning device.

EXPLANATION OF REFERENCES (FIGS. 1A Through 29)
1a-1s Light source
2h, 2k, 2r, 2s Parabolic mirror
2h', 2m Ellipsoidal mirror
3a-3s Condenser lens
4k, 4m Cover
5a-5q Illumination lens
7a-7k, 7n-7q Combining lens
9a, 9d-9h, 9h', 9k-9q Target surface
14 Glass tube
15 Opening
16 fluorescent agent
17 Reflection coating
18 Electrode
20 Electric conductor
21 LED pellet
25 Document
26 Contact glass
27, 35 Image sensor
28, 36 Imaging lens
30, 30', 40 Illuminating device
31, 41 Light source
32, 42 Illumination lens
33, 43 Combining lens
37 Imaging optical axis
38 Illumination optical axis
44 Turn-around mirror
45 Document surface
46 Normal line
47 Optical axis
48 Specular reflection axis
(FIGS. 30 through 63)
1 Light source
3 Condenser lens
3' Secondary condenser lens
3" Secondary condenser lens array
5 Illumination lens
5' Secondary illumination lens
5" Secondary illumination lens array
6 Relay lens
7 Combining lens
7' Secondary Combining lens
8 Focusing lens
8' Parabolic mirror
8'a Working range of parabolic mirror
8" Correcting lens
8''' Ellipsoidal mirror 9 Target surface
37 Imaging optical axis
38 Illumination optical axis
38a Illumination optical axis (with planar mirror)
38b Illumination optical axis (without planar mirror)
38c Illumination optical axis (with prism)
38b Illumination optical axis (without prism)
40 Illuminating device
48 Specular reflection axis
49 Range of specular reflection
51 Dust
52 Scattered light
53 Light-shielding plate
54 Divergent light
55 Planar mirror
56 Reflective surface
57 Prism
57' Mirror surface
60 Scanning area
61 Primary optical axis
62 Secondary optical axis
71 Main-scanning direction
72 Sub-scanning direction

BEST MODE FOR CARRYING OUT THE INVENTION

The best mode for carrying out the invention is described based on the following embodiments with reference to the accompanying diagrams.

(1) A first embodiment of the present invention provides an image scanning device that illuminates a document with a light source unit, focuses light reflected from the document on an image sensor using an imaging lens to obtain one-dimensional images of the document, and obtains a two-dimensional image of the document from the one-dimensional images. The image scanning device comprises an illumination lens including multiple lenses and configured to divide a light beam emitted from the light source unit into multiple light beams, and a combining unit configured to combine the multiple light beams on the document.

According to the first embodiment, a light beam emitted from the light source unit is divided into multiple light beams by the illumination lens and the multiple light beams are combined by the combining unit on the document. This configuration makes it possible to efficiently use light emitted from a light source implemented by, for example, an LED, an LD, a filament, a fluorescent lamp, or a discharge lamp. Especially, the first embodiment makes it possible to improve illumination efficiency and to achieve a uniform illuminance distribution. This in turn makes it possible to reduce power consumption.

(2) The image scanning device of the first embodiment preferably further comprises a condenser lens including the same number of lenses as that of the illumination lens between the light source unit and the illumination lens. The condenser lens divides a light beam from the light source unit into multiple light beams and efficiently supplies the multiple light beams to the illumination lens.

In this configuration, the condenser lens divides a light beam from the light source unit into multiple light beams in the main-scanning direction and condenses the multiple light beams so that all of the multiple light beams pass through the lenses (cylinder lenses) of the illumination lens.

(3) The illumination lens of the image scanning device of the first embodiment is preferably configured to divide a light beam from the light source unit into multiple light beams in the main-scanning direction and not to divide the light beam in a direction that is orthogonal to the main-scanning direction.

(4) The light source unit of the image scanning device of the first embodiment preferably includes multiple light sources. The number of the light sources in a direction in which the light beam is divided is preferably different from the number into which the light beam is divided.

Making the number of the light sources different from the number of divided light beams causes the divided light beams to overlap. The overlap in turn provides uniform illuminance and makes it possible to uniformly illuminate a document surface. Thus, this configuration makes it possible to nearly eliminate illuminance irregularity even when multiple light sources such as LEDs or LDs, which function like point light sources, are used and thereby makes it possible to uniformly illuminate a document surface.

(5) The light source unit of the image scanning device of the first embodiment preferably includes multiple light sources. Some of the light sources may be arranged in a direction in which the light beam is divided, and other ones of the light sources may be arranged in a direction that is orthogonal to the direction in which the light beam is divided so as to complement distribution of light beams from the some of the light sources.

This configuration makes it possible to nearly eliminate illuminance irregularity even when multiple light sources such as LEDs or LDs, which function like point light sources, are used and thereby makes it possible to uniformly illuminate a document surface.

(6) The light source unit of the image scanning device of the first embodiment preferably includes multiple light sources. In this configuration, a light beam from each of the light sources is substantially collimated and then divided into multiple light beams by the illumination lens.

This configuration makes it possible to nearly eliminate illuminance irregularity even when multiple light sources such as LEDs or LDs, which function like point light sources, are used and thereby makes it possible to uniformly illuminate a document surface.

(7) An LED is preferably used for the light source unit of the image scanning device of the first embodiment.

This configuration makes it possible to nearly eliminate illuminance irregularity even when multiple light sources such as LEDs, which function like point light sources, are used and thereby makes it possible to uniformly illuminate a document surface.

(8) A combining lens is preferably used as the combining unit of the image scanning device of the first embodiment to combine the multiple light beams on the document.

(9) An ellipsoidal mirror is preferably used as the combining unit of the image scanning device of the first embodiment to combine the multiple light beams on the document.

(10) A line-shaped filament is preferably used for the light source unit of the image scanning device of the first embodiment.

This configuration makes it possible to nearly eliminate illuminance irregularity even when a light source having a partially-irregular emission distribution (for example, a linear light source such as a filament or a surface light source such as a fluorescent lamp) is used and thereby makes it possible to uniformly illuminate a document surface. This in turn makes it possible to use various types of light sources and thereby to reduce the production costs of the light source unit.

(11) A strip-shaped illuminant is preferably used for the light source unit of the image scanning device of the first embodiment.

This configuration makes it possible to nearly eliminate illuminance irregularity even when a light source having a partially-irregular emission distribution (for example, a linear light source such as a filament or a surface light source such as a fluorescent lamp) is used and thereby makes it possible to uniformly illuminate a document surface. This in turn makes it possible to use various types of light sources and thereby to reduce the production costs of the light source unit.

(12) A discharge lamp is preferably used for the light source unit of the image scanning device of the first embodiment.

(13) In the image scanning device of the first embodiment, the center of a target surface (contact glass) is preferably shifted from the center of an illuminating device in the main-scanning direction.

This configuration makes it possible to dispose the illuminating device in a position adjacent to the imaging lens for forming an image such that the illuminating device and the imaging lens do not overlap, and thereby prevents the illuminating device from increasing the height of the image scanning device. In other words, compared with a conventional configuration, this configuration makes it possible to make an image scanning device thinner.

(14) In the image scanning device of the first embodiment, an imaging system and an illuminating device are preferably arranged such that their primary axes become parallel to each other on a plane that is parallel to the target surface.

This configuration eliminates the need to mount an illuminating device on a moving body (first moving body) and makes it possible to dispose the illuminating device in the body of the image scanning device together with an imaging lens and an image sensor constituting an imaging system. In other words, this configuration eliminates the need to place an illuminating device near a document surface and makes it possible to dispose the illuminating device near an imaging lens and an image sensor constituting an imaging system. This in turn eliminates the need to increase the height of an image scanning device to accommodate an illuminating device and thereby makes it possible to make an image scanning device thinner.

Also, this configuration eliminates the need to mount an illuminating device (or a light source) on the first moving body and makes it possible to fix an illuminating device in the body of an image scanning device. This in turn eliminates the need of a flexible power line and thereby makes it possible to improve reliability and reduce the production costs of an image scanning device.

Also, this configuration eliminates the need to place a reflective part near a document surface. This in turn prevents illuminating light reflected from a document surface from being reflected again by the reflective part and thereby substantially eliminates flare.

Further, this configuration makes it possible to shine light onto a document at substantially right angle and thereby to eliminate a shadow in the center portion of an open book to be scanned.

(15) The image scanning device of the first embodiment is preferably configured such that illuminating light from the light source unit is incident on a document surface (contact glass) at an oblique angle.

When light is incident on a document surface at right angle, reflected light from the surface of a contact glass or from the surface of a glossy document may enter the imaging lens, cause halation, and reduce the quality of a scanned image. On the other hand, when illuminating light is incident on a document surface at an oblique angle, specular reflection components of the illuminating light do not enter the imaging lens and only diffuse reflection components of the illuminating light enter the image sensor. Therefore, this configuration makes it possible to accurately detect image density of a document without being influenced by the glossiness of the document.

Also, this configuration eliminates the need to place an illuminating device near a document surface and makes it possible to dispose an illuminating device near an imaging lens and an image sensor constituting an imaging system. This in turn eliminates the need to increase the height of an image scanning device to accommodate an illuminating device and thereby makes it possible to make an image scanning device thinner.

Also, this configuration eliminates the need to mount an illuminating device (or a light source) on the first moving body and makes it possible to fix an illuminating device in the body of an image scanning device. This in turn eliminates the need of a flexible power line and thereby makes it possible to improve reliability and reduce the production costs of an image scanning device.

Also, this configuration eliminates the need to place a reflective part near a document surface. This in turn prevents illuminating light reflected by a document surface from being reflected again by the reflective part and thereby substantially eliminates flare.

Further, this configuration makes it possible to shine light onto a document at substantially right angle and thereby to eliminate a shadow in the center portion of an open book to be scanned.

(16) In the image scanning device of the first embodiment, an illuminating device is preferably placed near the imaging lens of the imaging system.

This configuration eliminates the need to place an illuminating device near a document surface and makes it possible to dispose an illuminating device near an imaging lens and an image sensor constituting an imaging system. This in turn eliminates the need to increase the height of an image scanning device to accommodate an illuminating device and thereby makes it possible to make an image scanning device thinner.

Also, this configuration eliminates the need to mount an illuminating device (or a light source) on the first moving body and makes it possible to fix an illuminating device in the body of an image scanning device. This in turn eliminates the need of a flexible power line and thereby makes it possible to improve reliability and reduce the production costs of an image scanning device.

Also, this configuration eliminates the need to place a reflective part near a document surface. This in turn prevents illuminating light reflected from a document surface from being reflected again by the reflective part and thereby substantially eliminates flare.

Further, this configuration makes it possible to shine light onto a document at substantially right angle and thereby to eliminate a shadow in the center portion of an open book to be scanned.

(17) In the image scanning device of the first embodiment, illuminating light emitted from the light source unit to illuminate an imaging area and imaging light reflected from the imaging area are preferably reflected back by the same reflective surface.

(18) The image scanning device of the first embodiment preferably further comprises a first moving body having at least one turn-around reflective surface and a second moving body having at least two turn-around reflective surfaces. In this configuration, illuminating light for illuminating an imaging area and imaging light reflected from the imaging area are reflected back by the same reflective surfaces.

(19) A second embodiment of the present invention provides an image scanning method. The image scanning method comprises the steps of illuminating a document with a light source; focusing light reflected from the document on an image sensor using an imaging lens to obtain one-dimensional images of the document; and obtaining a two-dimensional image of the document from the one-dimensional images. In this method, a light beam emitted from the light source is divided into multiple light beams and the multiple light beams are combined on the document.

According to the second embodiment, a light beam emitted from the light source unit is divided into multiple light beams and the multiple light beams are combined on the document. This method makes it possible to efficiently use light emitted from a light source implemented by, for example, an LED, an LD, a filament, a fluorescent lamp, or a discharge lamp. Especially, the second embodiment makes it possible to improve illumination efficiency and to achieve a uniform illuminance distribution. This in turn makes it possible to reduce power consumption.

(20) A third embodiment of the present invention provides an image forming apparatus including the image scanning device of the first embodiment.

As described above, in the image scanning device of the first embodiment, a light beam emitted from the light source unit is divided into multiple light beams and the multiple light beams are combined on the document. This configuration makes it possible to improve the utilization rate of light (or the energy-saving rate) in an image scanning device, to reduce the size or height of an image scanning device, to reduce the production costs of an image scanning device, and to reduce illuminance irregularity on a target surface.

(21) A fourth embodiment of the present invention provides an illuminating device for illuminating a target with light emitted from a light source unit. The illuminating device comprises at least one light-beam illumination element configured to obtain multiple light beams from the light emitted from the light source unit and to direct the multiple light beams to the target in at least one plane.

(22) The illuminating device of the fourth embodiment preferably further comprises at least one light-beam combining element configured to combine the multiple light beams on the target in at least one plane.

(23) The illuminating device of the fourth embodiment preferably further comprises at least one light-beam focusing element configured to focus the multiple light beams on the target in at least one plane.

(24) The illuminating device of the fourth embodiment preferably further comprises at least one optical element configured to combine the multiple light beams on the target in a first plane and to focus the multiple light beams on the target in a second plane that is different from the first plane.

(25) In the illuminating device of the fourth embodiment, the at least one plane preferably includes a first plane and a second plane that is different from the first plane; and the at least one light-beam illumination element preferably includes a first light-beam illumination element configured to obtain multiple first light beams from light emitted from the light source unit in the first plane and to direct the multiple first light beams to the target, and a second light-beam illumination element configured to obtain multiple second light beams from light emitted from the light source unit in the second plane and to direct the multiple second light beams to the target.

(26) At least one of the at least one light-beam focusing element of the illuminating device of the fourth embodiment preferably has a portion configured so as not to focus at least a portion of light reflected from the target.

(27) The illuminating device of the fourth embodiment preferably further comprises at least one light-beam dividing element configured to divide the light emitted from the light source unit into the multiple light beams in at least one plane.

(28) In the illuminating device of the fourth embodiment, the distance between the light-beam dividing element and the light-beam illumination element is preferably larger than the focal length of the light-beam dividing element and the focal length of the light-beam illumination element.

(29) In the illuminating device of the fourth embodiment, the at least one plane preferably includes a first plane and a second plane that is different from the first plane; and the at least one light-beam dividing element preferably includes a first light-beam dividing element configured to divide light emitted from the light source unit into multiple first light beams in the first plane, and a second light-beam dividing element configured to divide light emitted from the light source unit into multiple second light beams in the second plane.

(30) In the illuminating device of the fourth embodiment, the light source unit preferably includes a first light source configured to emit first light with a wavelength within a first wavelength range and a second light source configured to emit second light with a wavelength within a second wavelength range; and the first light source and the second light source are preferably arranged, in at least one plane, such that a peak position of illuminance of the first light on the target becomes different from a peak position of illuminance of the second light on the target.

(31) The illuminating device of the fourth embodiment preferably further comprises a wavelength dispersing element configured to disperse the light emitted from the light source unit into light beams of different wavelengths in at least one plane.

(32) The illuminating device of the fourth embodiment preferably further comprises a reflector configured to reflect at least a portion of the light emitted from the light source unit.

(33) The illuminating device of the fourth embodiment preferably further comprises an absorber configured to absorb at least a portion of the light emitted from the light source unit or a scatterer configured to scatter at least a portion of the light emitted from the light source unit.

(34) A fifth embodiment of the present invention provides an illumination method of illuminating a target with light emitted from a light source. The illumination method comprises the steps of obtaining multiple light beams from the light emitted from the light source in at least one plane and directing the multiple light beams to the target.

(35) The illumination method of the fifth embodiment preferably further comprises the step of combining the multiple light beams on the target in at least one plane.

(36) The illumination method of the fifth embodiment preferably further comprises the step of focusing the multiple light beams on the target in at least one plane.

(37) The illumination method of the fifth embodiment preferably further comprises the steps of combining the multiple light beams on the target in a first plane and focusing the multiple light beams on the target in a second plane that is different from the first plane.

(38) In the illumination method of the fifth embodiment, the steps of obtaining multiple light beams from the light emitted from the light source in at least one plane and directing the multiple light beams to the target preferably include the sub-steps of obtaining multiple first light beams from light emitted from the light source unit in a first plane, directing the multiple first light beams to the target, obtaining multiple second light beams from light emitted from the light source unit in a second plane that is different from the first plane, and directing the multiple second light beams to the target.

(39) The illumination method of the fifth embodiment preferably further comprises the step of dividing the light emitted from the light source unit into the multiple light beams in at least one plane.

(40) In the illumination method of the fifth embodiment, the step of dividing the light emitted from the light source unit into the multiple light beams in at least one plane includes the sub-steps of dividing light emitted from the light source unit into multiple first light beams in a first plane and dividing light emitted from the light source unit into multiple second light beams in a second plane that is different from the first plane.

(41) The illumination method of the fifth embodiment preferably further comprises the step of emitting first light with a wavelength within a first wavelength range and second light with a wavelength within a second wavelength range in such a manner that a peak position of illuminance of the first light on the target becomes different from a peak position of illuminance of the second light on the target in at least one plane.

(42) The illumination method of the fifth embodiment preferably further comprises the step of dispersing the light emitted from the light source unit into light beams of different wavelengths in at least one plane.

(43) A sixth embodiment of the present invention provides an image scanning device including the illuminating device of the fourth embodiment and configured to illuminate a document having an image formed thereon with light emitted from a light source and to scan the image by receiving light reflected from the document.

(44) The image scanning device of the sixth embodiment preferably further comprises a magnification-changing optical element configured to increase or reduce the size of the scanned image.

(45) The image scanning device of the sixth embodiment preferably further comprises an imaging optical system configured to produce an optical image of the document and a reflecting optical element including a reflective surface configured to reflect the light from the light source, which reflective surface of the reflecting optical element is disposed so that an optical image of the reflective surface is not produced by the imaging optical system.

(46) The image scanning device of the sixth embodiment is preferably configured such that the optical axis of the imaging optical system and the optical axis of an illumination system configured to illuminate the document with the light from the light source intersect only on the document.

(47) A seventh embodiment of the present invention provides an image scanning method that comprises the steps of illuminating a document having an image formed thereon with light emitted from a light source and scanning the image by receiving light reflected from the document. The image scanning method uses the illumination method of the fifth embodiment to illuminate the document with the light from the light source.

(48) The image scanning method of the seventh embodiment preferably further comprises the step of increasing or reducing the size of the scanned image.

(49) An eighth embodiment of the present invention provides an image forming apparatus including the image scanning device of the sixth embodiment and configured to scan an image on a document and to form the scanned image on a recording medium.

(50) A ninth embodiment of the present invention provides an image forming method that comprises the steps of scanning an image on a document and forming the scanned image on a recording medium. The image forming method uses the image scanning method of the seventh embodiment to scan the image on the document.

The configurations described in (21), (34), (43), (47), (49), and (50) make it possible to efficiently use light emitted from a light source implemented by, for example, an LED, an LD, a filament, a fluorescent lamp, or a discharge lamp and thereby to reduce power consumption of an illuminating device.

In the configurations described in (30), (31), (41), and (42), using a monochromatic light source makes it possible to further improve illumination efficiency and thereby to reduce power consumption of an illuminating device.

The configuration described in (46) makes it possible to shine light onto a document surface at substantially right angle and to prevent specular reflection components of light reflected by the document surface from entering the imaging lens. This in turn makes it possible to eliminate a shadow in the center portion of an open book to be scanned.

The configurations described in (26), (44), and (48) improve illumination efficiency and the quality of a scanned image.

The embodiment described in (45) provides an image scanning device that can scan an image with high quality even after long-term use.

The configurations described in (22) through (25), (27) through (29), (32), (33), and (35) through (40) make it possible to further improve illumination efficiency.

<First Embodiment>

A description is given of an illumination system of an illuminating device in an image scanning device according to a first embodiment of the present invention, with reference to FIGS. 7 through 11C.

Figure 7:
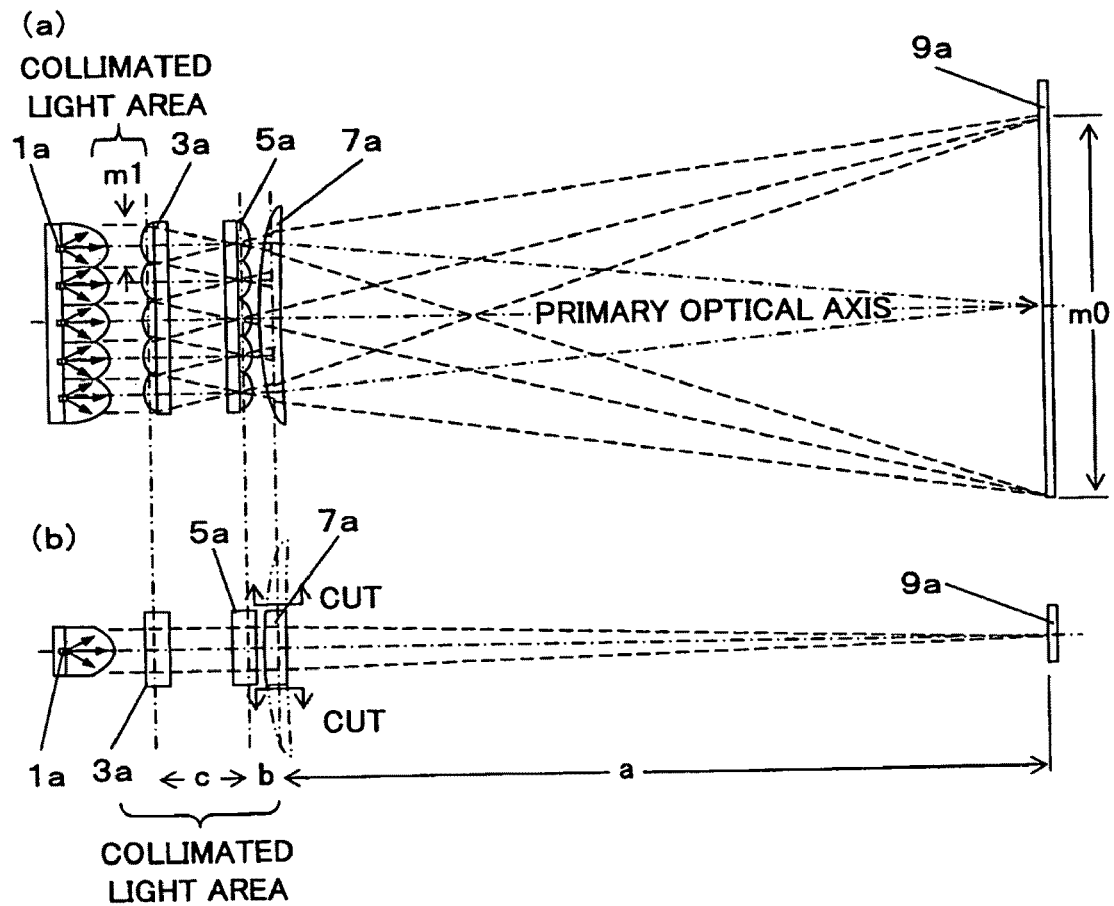
FIG. 7 is a diagram illustrating a basic concept of an illumination system in the image scanning device according to the first embodiment of the present invention, (a) is a top view of the illumination system, and (b) is a front view of the illumination system.
Figure 8A:
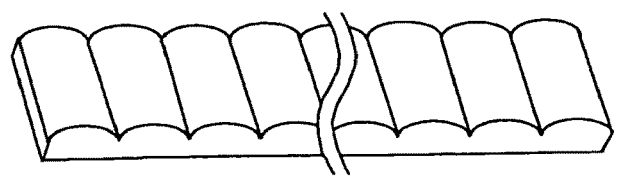
FIG. 8A is a diagram illustrating a configuration of a cylinder lens array.
Figure 8B:
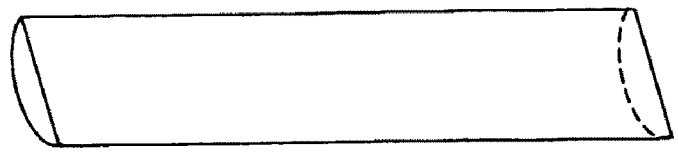
FIG. 8B is a diagram illustrating an example of a cylinder lens.
Figure 8C:
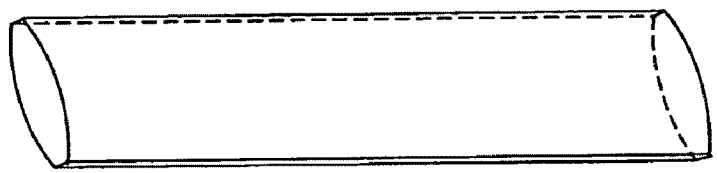
FIG. 8C is a diagram illustrating another example of the cylinder lens.

FIG. 7 illustrates a basic concept of an illumination system in the image scanning device according to the first embodiment of the present invention. In FIG. 7, (a) is a top view of the illumination system, and (b) is a front view of the illumination system. FIGS. 8A through 8C are diagrams for describing configurations of a condenser lens and an illumination lens that can be employed in the illumination system in the image scanning device according to the present invention. FIG. 8A illustrates a configuration of a cylinder lens array, FIG. 8B illustrates an example of a cylinder lens, and FIG. 8C illustrates another example of the cylinder lens.

As shown in (a) of FIG. 7, the illumination system of the first embodiment employs linearly arranged LEDs (light-emitting diodes) as a light source 1a. At the tip of each LED is provided a lens hood made of transparent resin, so that the light beams emitted from each of the LEDs are output as collimated light beams. A focal length f3 of this lens made of transparent resin corresponds to the distance from the tip of the lens to the position of the LED.

A condenser lens 3a is a cylinder lens array having a configuration as shown in FIG. 8A, in which cylinder lenses as shown in FIG. 8B are arranged in an array. The cylinder lens array of the condenser lens 3a can be configured with cylinder lenses as shown in FIG. 8C. A focal length f1 of each cylinder lens included in the cylinder lens array of the condenser lens 3a corresponds to a distance c shown in FIG. 1 (f1=c is satisfied). The distance c is the distance between the condenser lens 3a and an illumination lens 5a. In the plane shown in (a) of FIG. 7, the condenser lens 3a divides light beams emitted from the light source 1a, and then condenses the divided light beams in such a manner that all of the divided light beams pass through the individual cylinder lenses of the illumination lens 5a.

The illumination lens 5a is for illuminating a document surface that is a target surface 9a in the plane shown in (a) of FIG. 7. Similar to the condenser lens 3a, the illumination lens 5a is configured with a cylinder lens array. A focal length f2 of the cylinder lens included in the cylinder lens array of the illumination lens 5a can be substantially expressed by f2=1/(1/(a+b)+1/c), where a, b, and c are distances indicated in FIG. 7. The distance a is the distance between a combining lens 7a and the target surface and the distance b is the distance between the illumination lens 5a and the combining lens 7a. The illumination lens 5a can be designed in such a manner as to satisfy f1=f2. Both the condenser lens 3a and the illumination lens 5a can be made of a material of the same specification.

The combining lens 7a is a typical lens that is axially symmetrical around its optical axis. The light beams divided by the condenser lens 3a and irradiated by the illumination lens 5a are combined on the target surface 9a by the combining lens 7a. A focal length f0 of the combining lens 7a is equal to a shown in FIG. 7 (f0=a). The optical axis (referred to as a secondary optical axis) of each light beam divided by the condenser lens 3a and irradiated by the illumination lens 5a coincides with the optical axis (referred to as a primary optical axis) of the combining lens 7a, on the target surface 9a. The light beams divided by the condenser lens 3a and irradiated by the illumination lens 5a can be combined on the target surface 9a (as a matter of simplification, FIG. 7 only illustrates light beams passing through three pairs of cylinders included in the cylinder array).

In describing the magnification of an image magnified by the illumination lens 5a, a combined focal length of the focal length f2 of the illumination lens 5a and the focal length f0 of the combining lens 7a should be used in normal circumstances. However, in the illumination system according to the first embodiment, f2<f0 is satisfied. Therefore, as a matter of simplification, it is assumed that b=0, and the focal length f0 of the combining lens 7a is disregarded.

Assuming that the width of each cylinder lens in the cylinder lens array of the condenser lens 3a is m1 and the width of light irradiated on the target surface 9a in the plane shown in (a) of FIG. 7 is m0, the relationship expressed by m1/m0=c/a is satisfied (in a practical situation, this relationship is determined before determining f0 and f1). By configuring the illumination system in this manner, an image having the size m1 corresponding to each cylinder lens in the condenser lens 3a is projected on the target surface 9a to have the size m0, and all of the light beams that have passed through the area having the size m1 reach the target surface 9a. Each light beam from one of the cylinders has a different level of illuminance, and therefore, these light beams are illuminated onto the target surface 9a with considerable illuminance irregularities. However, by combining all of the light beams from the cylinder lens array, the illumination distribution on the target surface 9a becomes even.

Figure 9A:
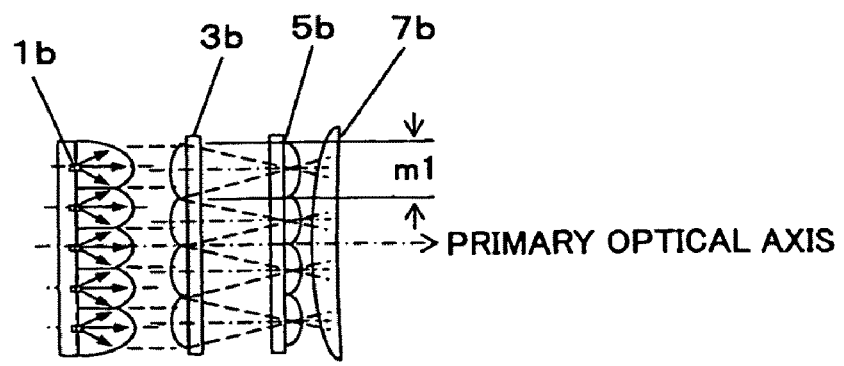
FIG. 9A is a diagram illustrating an example of the first embodiment in which the number of cylinder lenses is one less than the number of LEDs acting as the light source.
Figure 9B:
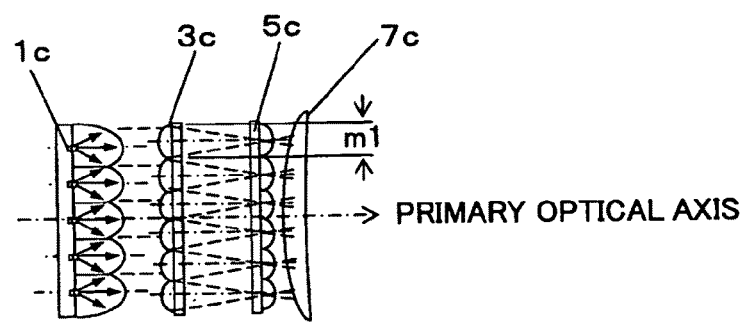
FIG. 9B is a diagram illustrating an example of the first embodiment in which the number of cylinder lenses is one more than the number of LEDs acting as the light source.
Figure 10:
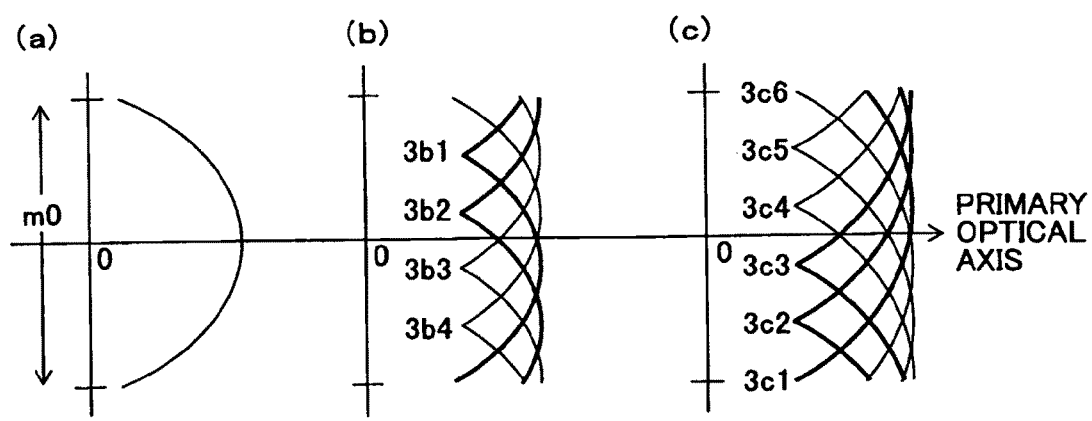
FIG. 10 is a diagram for describing the illumination distribution on a target surface according to the first embodiment, (a) illustrates a case where the number of cylinder lenses is the same as the number of LEDs acting as the light source, (b) illustrates a case where the number of cylinder lenses is one less than the number of LEDs acting as the light source, and (c) illustrates a case where the number of cylinder lenses is one more than the number of LEDs acting as the light source.

FIG. 9A illustrates an example of the first embodiment in which the number of cylinder lenses is one less than the number of LEDs acting as the light source. FIG. 9B illustrates an example of the first embodiment in which the number of cylinder lenses is one more than the number of LEDs acting as the light source. FIG. 10 is a diagram for describing the illumination distribution on a target surface according to the first embodiment. In FIG. 10, (a) illustrates a case where the number of cylinder lenses is the same as the number of LEDs acting as the light source. In FIG. 10, (b) illustrates a case where the number of cylinder lenses is one less than the number of LEDs acting as the light source; more specifically, (b) illustrates an illumination system including five LEDs and four cylinder lenses. In FIG. 10, (c) illustrates a case where the number of cylinder lenses is one more than the number of LEDs acting as the light source; more specifically, (c) illustrates an illumination system including five LEDs and six cylinder lenses.

In the illumination system shown in FIG. 7, in the plane shown in (a) of FIG. 7, the number of LEDs arranged equidistantly acting as the light source 1a is the same as the number of cylinder lenses in the condenser lens 3a and the number of cylinder lenses in the illumination lens 5a. Furthermore, the optical axes of the LEDs coincide with those of the cylinder lenses of the condenser lens 3a and the illumination lens 5a. Moreover, the cylinder lens arrays of the condenser lens 3a and the illumination lens 5a include the same cylinder lenses. Accordingly, the distributions of the light beams emitted from the individual LEDs simply overlap each other, and the illumination distribution on the target surface becomes proportional to the light beam distributions of the individual LEDs, so that the illuminance distribution becomes as that shown in (a) of FIG. 10.

In order to make the illuminance distribution on the target surface even more uniform, the number of LEDs acting as the light source is preferably different from the number of cylinder lenses. Particularly, in a case where the number of LEDs is smaller than the number of cylinder lenses, if the number of LEDs acting as the light source is one less than the number of cylinder lenses, the illuminance distribution will be most uniform and the utilization rate of light will be maximized.

For example, if a target surface is illuminated by the illumination systems with configurations as shown in FIGS. 9A, 9B, the illuminance distributions on the target surface will be as shown in (b) and (c) of FIG. 10, respectively. Accordingly, the illuminance distribution on the target surface is a combination of the illuminance distributions of each of the divided light beams superposed on the target surface, and is thus made uniform. In (b) of FIG. 10, the curves denoted by 3b1 through 3b4 represent illuminance distributions on the target surface illuminated by light beams divided by the cylinder lenses of a condenser lens 3b and an illumination lens 5b shown in FIG. 9A. In (c) of FIG. 10, the curves denoted by 3c1 through 3c6 represent illuminance distributions on the target surface illuminated by light beams divided by the cylinder lenses of a condenser lens 3c and an illumination lens 5c shown in FIG. 9B.

By using an illumination system in which the number of LEDs of a light source 1b, 1c is different from the numbers of cylinder lenses in the condenser lens 3b, 3c and the illumination lens 5b, 5c, the illumination will have minimum illuminance irregularities (illuminance irregularities can be reduced to several %), without decreasing the illumination efficiency.

In the example shown in FIG. 7, the illuminance irregularities can be reduced by adjusting the width m1 of each cylinder lens in the condenser lens 3a and the illumination lens 5a. In this case, the illumination system will have plural types of cylinder lenses having different widths m1. Therefore, the ratio (enlargement ratio) of the illumination width m0 (width of irradiated light) on the target surface with respect to the width m1 of each cylinder lens will vary according to the type of cylinder lens. Hence, in order to equalize the widths of illumination light illuminated on the target surface with the use of the cylinder lenses through which the light beams pass, it is necessary to adjust the focal lengths of the cylinder lenses of the illumination lens 5a. For example, assuming that the total width of each of the cylinder lens arrays of the condenser lens 3a and the illumination lens 5a is five, and the number of the cylinder lenses in each cylinder lens array is five, the width of each cylinder lens array is divided by a ratio of (0.7):(0.8):(0.95):(1.15):(1.4). The enlargement ratio required of the cylinder lens with the smallest width 0.7 is two times the enlargement ratio required of the cylinder lens with the largest width 1.4. Therefore, the cylinder lens with the smallest width 0.7 is to be designed to have a focal length that is half the focal length of the cylinder lens with the smallest width 1.4. Accordingly, the illumination will have minimum illuminance irregularities, without decreasing the illumination efficiency.

The concept of illumination in the main scanning direction of the image scanning device is described in the above with reference to the top view of the illumination system shown in (a) of FIG. 7. Next, the concept of illumination in the sub-scanning direction of the image scanning device perpendicular to the main scanning direction is described with reference to the front view of the illumination system shown in (b) of FIG. 7. More specifically, descriptions are given of a concept of reducing illuminance irregularities in the main scanning direction of the image scanning device and a concept of efficiently illuminating a target surface in a sub-scanning direction of the image scanning device.

In the plane shown in (b) of FIG. 7, the number of LEDs acting as the light source 1a is one. The light beams emitted from the LED are converted into substantially collimated light beams by a lens made of transparent resin provided on the tip of the LED before being output. In the plane shown in (b) of FIG. 7, the condenser lens 3a and the illumination lens 5a are regarded as plane parallel plates orthogonal to the primary optical axis. Therefore, the light beams that are converted into substantially collimated light beams pass through the condenser lens 3a and the illumination lens 5a as collimated light beams without being affected much by the condenser lens 3a or the illumination lens 5a. The focal length f0 of the combining lens 7a satisfies f0=a, and therefore, the combining lens 7a focuses the light beams on the target surface 9a.

As described above, the light beams emitted from the LEDs of the light source 1a are linearly combined on the target surface 9a in an efficient manner, and high quality illumination can be performed with minimum illuminance irregularities. Only a portion of the combining lens 7a through which the light beams pass is required, and therefore, the combining lens 7a need not be circular. Hence, as shown in (b) of FIG. 7, the unnecessary portions of the combining lens 7a can be cut off, so that the illumination system can be considerably reduced in thickness.

Figure 11C:
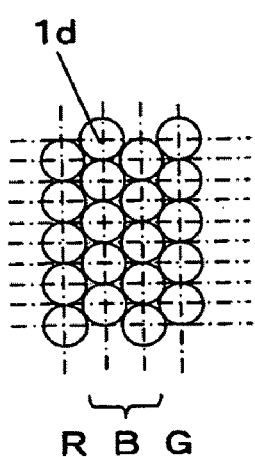
FIGS. 11A through 11C are diagrams for describing a more practical illumination system according to the first embodiment, employing LEDs of three colors.
Figure 11A:
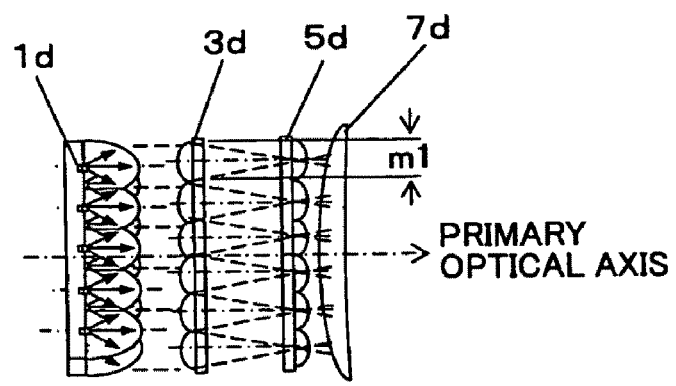
Figure 11B:
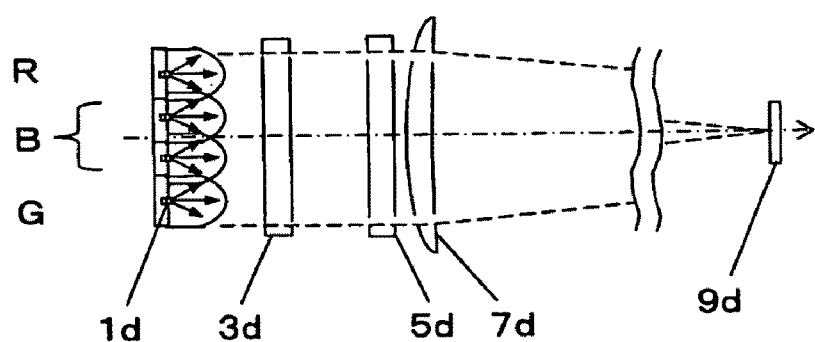

FIGS. 11A through 11C are diagrams for describing a more practical illumination system according to the first embodiment, employing LEDs of three colors. FIG. 11A is a top view of the illumination system, FIG. 11B is a front view of the illumination system, and FIG. 11C is a side view of the illumination system.

As shown in FIGS. 11A through 11C, a light source 1d includes a plurality of rows of LEDs (light-emitting diodes), with each row including a plurality of linearly arranged LEDs. As shown in FIGS. 11B and 11C, the light source 1d includes one row of red (R) LEDs, two rows of blue (B) LEDs, and one row of green (G) LEDs. The number of blue (B) LEDs, which have relatively low luminance efficiencies, is larger than the number of red (R) LEDs or green (G) LEDs. Therefore, it is possible to reduce the difference between the illuminance of the illumination light of blue (B) and the illuminance of the illumination light of red (R) or green (G), on a target surface.

In the plane shown in FIG. 11A, there are 6 cylinder lenses in a condenser lens 3d and an illumination lens 5d, corresponding to 5.5 LEDs in the light source 1d. In the plane shown in FIG. 11B, there are four LEDs arranged; however, the functions of the illumination system shown in FIG. 11B are the same as the functions of the illumination system shown in (b) of FIG. 7.

The plural rows of LEDs shown in FIG. 11C are arranged in a staggered pattern; however, the arrangement of the plural rows of LEDs is not limited to a staggered pattern. Nonetheless, by arranging the plural rows of LEDs in a staggered pattern, the illumination distribution on a target surface 9d can be made more uniform.

FIGS. 11A through 11C illustrate an example of an illumination system for obtaining a high-quality color image; however, according to the objective of illumination, it is possible to employ only white LEDs in the light source 1d (as for products that are presently commercially available, the intensity of a blue spectrum is highest, and the intensity decreases for a green spectrum and a red spectrum, in this order). Alternatively, it is possible to employ a monochrome LED such as only red (R) LEDs, only G (green) LEDs, or only B (blue) LEDs, or a two-color LED including a combination of two of these colors.

As described above, in the illuminating device in the image scanning device according the first embodiment, the illumination lens divides a light beam emitted from a light source into plural light beams, and the combining lens combines the divided plural light beams onto a document surface. Therefore, light emitted from a light source can be effectively used regardless of the type of light source employed, such as an LED, an LD, a filament, a fluorescent light, a discharge lamp, or the like. With this illuminating device, the illumination efficiency can be improved, the illuminance distribution can be made uniform, and the input power can be reduced.

<Second Embodiment>

A description is given of an illumination system of an illuminating device in an image scanning device according to a second embodiment of the present invention, with reference to FIGS. 12A through 14C.

Figure 12A:
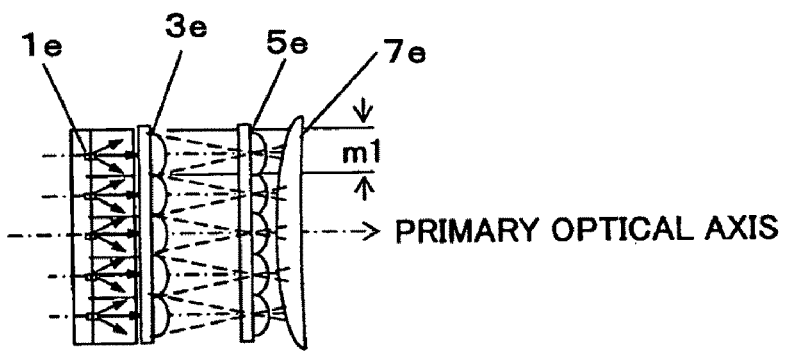
FIGS. 12A and 12B are diagrams illustrating a first example of the illumination system in the image scanning device according to the second embodiment of the present invention.
Figure 12B:
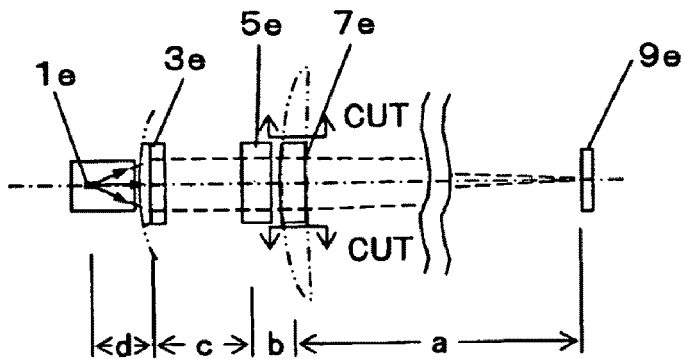
Figure 13A:
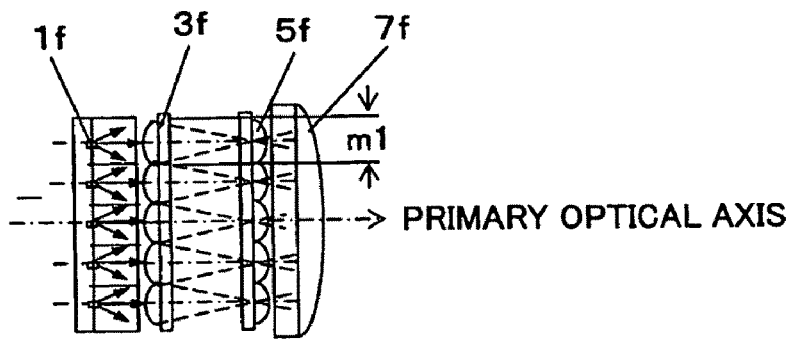
FIGS. 13A and 13B are diagrams illustrating a second example of the illumination system in the image scanning device according to the second embodiment of the present invention.
Figure 13B:
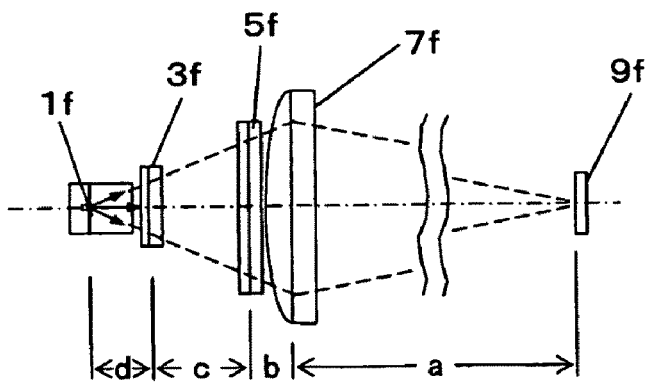

FIGS. 12A, 12B illustrate a first example of the illumination system in the image scanning device according to the second embodiment of the present invention. FIG. 12A is a top view of the first example of the illumination system, and FIG. 12B is a front view of the first example of the illumination system. FIGS. 13A, 13B illustrate a second example of the illumination system in the image scanning device according to the second embodiment of the present invention. FIG. 13A is a top view of the second example of the illumination system, and FIG. 13B is a front view of the second example of the illumination system.

In the first embodiment, light beams emitted from the individual LEDs are turned into substantially collimated light beams by lenses provided on the tips of the individual LEDs. In the second embodiment, a hood with a flat tip is provided on each LED.

In FIGS. 12A, 12B, a condenser lens 3e is employed, in which the cylinder lens array shown in FIG. 8A is joined with the cylinder lens shown in FIG. 8B, in such a manner that the individual cylinder lenses of the cylinder lens array shown in FIG. 8A are orthogonal with respect to the cylinder lens shown in FIG. 8B. The focal length f1 of each cylinder lens in the cylinder lens array shown in FIG. 8A is specified as $f1=1/(1/d+1/c)$, and a focal length f1' of the cylinder lens shown in FIG. 8B is specified as f1'=d. The focal lengths of an illumination lens 5e and a combining lens 7e are the same as those described with reference to FIG. 7.

As shown in FIG. 12A, light beams emitted from LEDs of a light source 1e reach the condenser lens 3e as divergent light, and then the divergent light is focused by the condenser lens 3e onto the position of the illumination lens 5e. Otherwise, the illumination system shown in FIGS. 12A, 12B is the same as the illumination system shown in FIG. 7. That is, the condenser lens 3e shown in FIGS. 12A, 12B functions as both the hood lenses for the LEDs in the light source 1a and the condenser lens 3a shown in FIG. 7.

In the plane shown in FIG. 12B, the focal length f1' of each cylinder lens of the condenser lens 3e satisfies f1'=d, and therefore, the light beams diverged from the LEDs of the light source 1e are converted into collimated light by the condenser lens 3e. Otherwise, the illumination system shown in FIGS. 12A, 12B is the same as the illumination system shown in FIG. 7.

In FIGS. 13A, 13B, a condenser lens 3f is the cylinder lens array as shown in FIG. 8A, and a combining lens 7f is formed by joining together two of the cylinder lenses shown in FIG. 8B in such a manner as to be orthogonal with respect to each other. In the plane shown in FIG. 13A, a focal length f1 of the condenser lens 3f satisfies f1=1/(1/d+1/c), similar to the first example of the illumination system shown in FIG. 12A. In the plane shown in FIG. 13B, the focal length f1' of the condenser lens 3f satisfies f1'=∞, which means that the condenser lens 3f is a plate, similar to example shown in FIG. 7. The illumination lens 5f is the same as that shown in FIG. 7. The focal length f0 of the combining lens (orthogonal cylinder lenses) 7f satisfies f0=a in the plane shown in FIG. 13A. In the plane shown in FIG. 13B, a focal length f0' of the combining lens (orthogonal cylinder lenses) 7f satisfies f0'=1/(1/(d+c+b)+1/a). The focal lengths of the cylinder lenses in two directions orthogonal with respect to each other are specified in this manner.

As a result, the functions of the illumination system in the plane shown in FIG. 13A is the same as the functions of the illumination system in the plane shown in FIG. 12A. Meanwhile, in the plane shown in FIG. 13B, the light beams diverged from the LEDs of a light source 1f pass through the condenser lens 3f and an illumination lens 5f, and are turned into focused light beams and focused onto a target surface 9f by the combining lens 7f.

A description is given of an intermediate concept of an illumination system between the example shown in FIGS. 12A, 12B and the example shown in FIGS. 13A, 13B. That is, either one of the focal lengths f1' or f0' can be applied to the illumination lenses 5e and 5f, instead of applying the focal length f1' to the condenser lens 3e shown in FIG. 12B and applying the focal length f0' to the combining lens 7e shown in FIG. 13B. Specifically, a focal length f2' of the illumination lenses 5e and 5f satisfies f2'=d+c, and the other elements of the illumination system are the same as those shown in FIG. 7. With such a configuration, the same illumination system as those shown in FIGS. 12A, 12B and FIGS. 13A, 13B can be achieved.

Similar to the illumination system shown in FIG. 7, in both of the illumination systems according to the second embodiment, the light beams emitted from the LEDs of the light source are linearly combined on the target surface in an efficient manner, and high quality illumination can be performed with minimum illuminance irregularities.

Figure 14C:
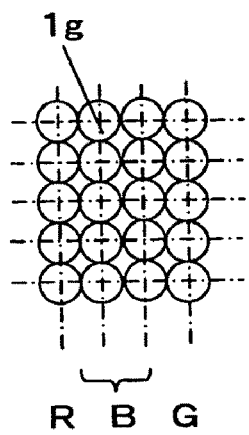
FIGS. 14A through 14C are diagrams for describing the illumination system according to the second embodiment, employing LEDs of three colors.
Figure 14A:
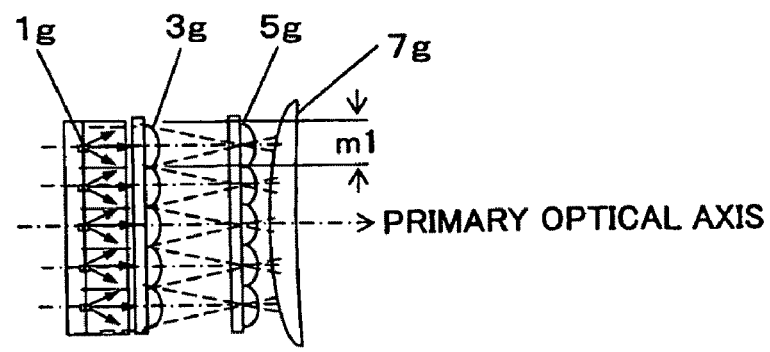
Figure 14B:
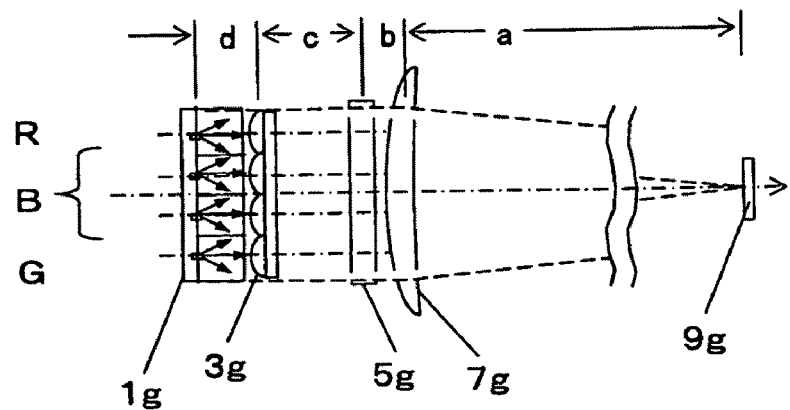

FIGS. 14A through 14C are diagrams for describing the illumination system according to the second embodiment, employing LEDs of three colors. FIG. 14A is a top view of the illumination system, FIG. 14B is a front view of the illumination system, and FIG. 14C is a side view of the illumination system.

As shown in FIGS. 14A through 14C, a light source 1g includes a plurality of rows of LEDs (light-emitting diodes), with each row including a plurality of linearly arranged LEDs. Each LED is provided with a hood with a flat tip. The illumination system has a configuration similar to those shown in FIGS. 12A, 12B, and a condenser lens 3g is formed by joining together two of the cylinder lens arrays shown in FIG. 8A in such a manner as to be orthogonal with respect to each other.

Plural LEDs in the light source 1g are arranged in both the vertical direction and the horizontal direction of the light source 1g. As shown in FIGS. 14A, 14B, the condenser lens 3g is formed by joining together two of the cylinder lens arrays shown in FIG. 8A in such a manner as to be orthogonal with respect to each other. In the plane shown in FIG. 14B, the focal length f1' of each cylinder lens in the condenser lens 3g satisfies f1'=d, and therefore, the light beams diverged from the individual LEDs are converted into collimated light beams by the condenser lens 3g. Otherwise, the illumination system shown in FIGS. 14A through 14C is the same as the illumination system shown in FIGS. 11A through 11C. In the plane shown in FIG. 14A, diverged light emitted from the individual LEDs is focused by the condenser lens 3g onto a position on an illumination lens 5g. Otherwise, the illumination system shown in FIGS. 14A through 14C is the same as the illumination system shown in 11A through 11C.

In this case, the optical axes of the LEDs of the light source 1g need to coincide with the optical axes of the LEDs of the condenser lens 3g, and therefore, the illuminance distribution on a target surface 9g is that shown in (a) of FIG. 10.

In order to make the illuminance distribution on the target surface 9g uniform as shown in (b) or (c) of FIG. 10, a cylinder lens array is inserted between the condenser lens 3g and the LED array of the light source 1g. The number of cylinder lenses included in the cylinder lens array is the same as the number of LEDs, and the optical axis of each cylinder lens included in the cylinder lens array coincides with the optical axis of each LED of the light source 1g. Accordingly, the light beams emitted from the LEDs can be converted into collimated light beams by the cylinder lens array. As shown in FIG. 9A or 9B, by making the number of cylinder lenses in the condenser lens 3g different from the number of LEDs, it is possible to achieve an illuminance distribution on the target surface 9g as that shown in (b) or (c) of FIG. 10.

In the above descriptions, the illumination system employs an LED (light-emitting diode) array as the light source; however, the same effects can be achieved even if the LEDs are replaced by LDs (laser diodes) in an illumination system of the same configuration. However, the radiation angle of a light-emitting diode is several tens degrees, whereas the radiation angle of a laser diode is several degrees. For this reason, the illumination system will need to be designed appropriately for laser diodes.

<Third Embodiment>

Figure 15:
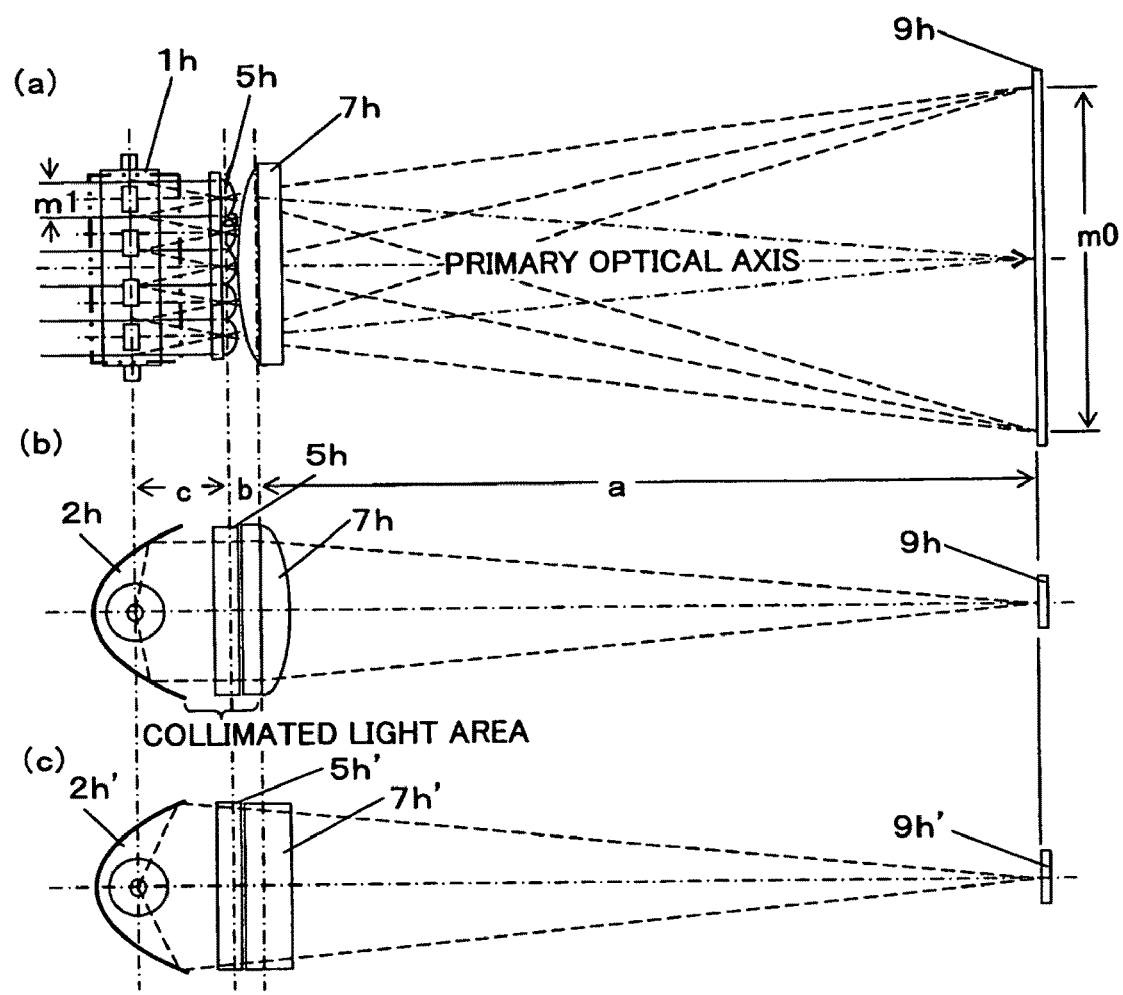
FIG. 15 is a diagram illustrating the illumination system in the image scanning device according to the third embodiment of the present invention, (a) is a top view of the illumination system, (b) is a front view of the illumination system employing a parabolic mirror as a light source, and (c) is a front view of the illumination system employing an ellipsoidal mirror.
Figure 16A:
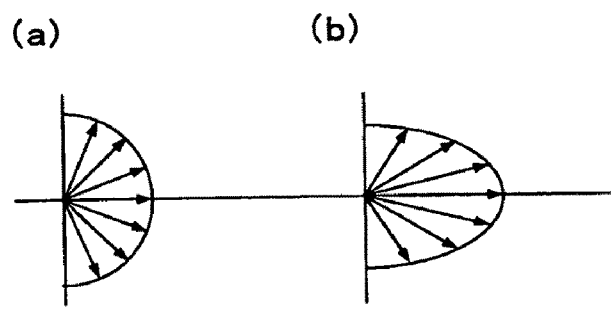
FIGS. 16A and 16B are diagrams for describing how radial vectors of light beams emitted from the linear illuminant and radial vectors of light beams from a lens are captured, in FIG. 16A, (a) illustrates an intensity distribution of radial vectors of light beams emitted from the illuminant in a uniform manner, and (b) illustrates an intensity distribution of radial vectors of light beams emitted from the illuminant, where the light beams are more intensely emitted in the optical axial direction than in the other directions, and in FIG. 16B, (c) is a diagram for describing radial vectors being captured by an illumination lens, and (d) is a diagram for describing radial vectors being captured by a condenser lens.
Figure 16B:
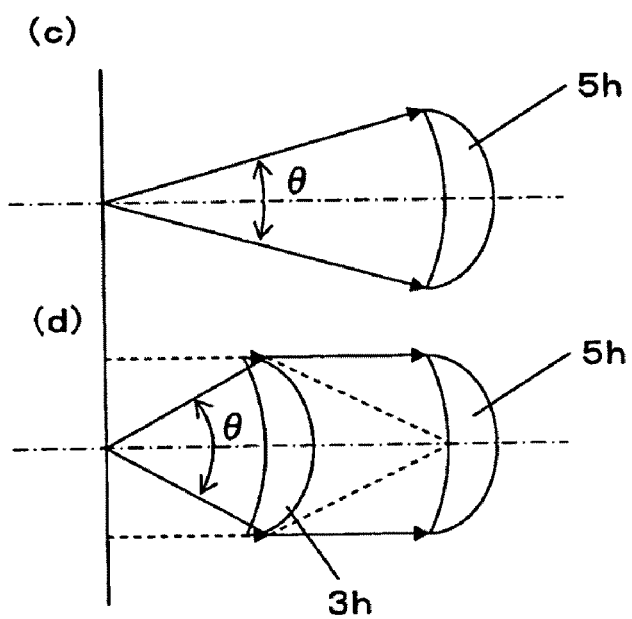

A description is given of an illumination system of an illuminating device in an image scanning device according to a third embodiment of the present invention, with reference to FIGS. 15, 16A, and 16B.

FIG. 15 illustrates the illumination system in the image scanning device according to the third embodiment of the present invention. In FIG. 15, (a) is a top view of the illumination system, (b) is a front view of the illumination system employing a parabolic mirror as a light source, and (c) is a front view of the illumination system employing an ellipsoidal mirror.

In the first and second embodiments, the illumination system employs an LED array as the light source; however, the illumination system according to the third embodiment employs a linear illuminant as the light source.

The illumination system shown in (a) of FIG. 15 employs a filament lamp as a light source 1h. In order to improve the luminous efficacy of the light source, a double coil filament is partially used (the double coil is used to improve the luminous efficacy of the light source; however, if the part of the double coil is long, the part of the double coil will be weighted down by gravity; therefore, supporting members are inserted between a plurality of short double coils). The filament of the filament lamp is not limited to a double coil; the filament can be a nichrome line stretched linearly or a coil stretched linearly.

In this case, light beams are emitted in directions of 360 degrees centering about the linear illuminant. Therefore, a reflector for turning the light beams toward a target surface 9h is employed. In order to effectively condense the light toward the target surface 9h, the reflector is preferably a parabolic mirror or an ellipsoidal mirror with a focal point at the position of the linear illuminant.

FIGS. 16A, 16B are diagrams for describing how radial vectors of light beams emitted from the linear illuminant and radial vectors of light beams from a lens are captured. In FIG. 16A, (a) illustrates an intensity distribution of radial vectors of light beams emitted from the illuminant in a uniform manner, and (b) illustrates an intensity distribution of radial vectors of light beams emitted from the illuminant, where the light beams are more intensely emitted in the optical axial direction than in the other directions. In FIG. 16B, (c) is a diagram for describing radial vectors being captured by an illumination lens, and (d) is a diagram for describing radial vectors being captured by a condenser lens.

As shown in (a) and (b) of FIG. 16A, the light source 1h including a linear illuminant emits light in substantially all directions from all parts of the linear illuminant. Thus, it is difficult to convert the light emitted from the linear illuminant into collimated light in the plane shown in (a) of FIG. 15 (in the main scanning direction). Particularly, in a case where the intensity (size of radial vector) of light beams emitted from a certain part of the linear illuminant is uniform as shown in (a) of FIG. 16A, even if a condenser lens is omitted as shown in (a) of FIG. 15, the illumination effects of the illumination system will not change much.

In the plane shown in (a) of FIG. 15, the focal length f2 of each cylinder lens included in an illumination lens 5h satisfies f2=1/(1/(b+a)+(1/c)). That is, the center of the filament of the illuminant is placed at the position corresponding to the condenser lens in the illumination system shown in FIG. 7. A combining lens 7h can be formed by joining together two of the cylinder lenses shown in FIG. 8B in such a manner as to be orthogonal with respect to each other, as long as the focal length f0 of each of the two cylinder lenses satisfies f0=a.

Furthermore, in a intensity distribution of light beams emitted from a certain part of the linear illuminant, if the intensity is highest in the direction of the optical axis compared to other directions as shown in (b) of FIG. 16A, or if the illumination lens 5h cannot be placed near the illuminant depending on the specified focal length of the illumination lens 5h, a condenser lens 3h is preferably inserted between the light source 1h and the illumination lens 5h in order to improve the illumination efficiency of the illumination system.

Specifically, as shown in (d) of FIG. 16B, a cylinder lens included in the condenser lens 3h is placed at a position away from the illuminant by the focal length of the cylinder lens included in the condenser lens 3h, and the illumination lens 5h is placed at a position away from the condenser lens 3h by the opposite focal length of the cylinder lens included in the condenser lens 3h. In this case, the illumination system can capture the radial vector corresponding to a relatively high intensity of the illuminant in the optical axial direction. Moreover, the angle θ of the light captured from the illuminant can be increased, compared to that of the illumination system that does not include a condenser lens as shown in (c) of FIG. 16B. Accordingly, the light from the illuminant can be guided to the target surface more efficiently.

If a parabolic mirror 2h is employed as the reflector, in the plane shown in (b) of FIG. 15, most of the light emitted from the illuminant is output as collimated light, and passes through the illumination lens 5h as collimated light, and is focused on a target surface 9h by the combining lens 7h. If the parabolic mirror 2h is employed as the reflector, the combining lens 7h can be a typical lens that is axially symmetrical around its optical axis, similar to the combining lens 7a shown in FIG. 7.

Furthermore, if an ellipsoidal mirror 2h' is employed as the reflector, in the plane shown in (c) of FIG. 15, the center of the linear illuminant is positioned at a first focal point of the ellipsoidal mirror 2h', and a second focal point of the ellipsoidal mirror 2h' is placed on a target surface 9h'. In the plane shown in (c) of FIG. 15, the focal length of an illumination lens 5h' and the focal length of a combining lens 7h' are infinite. That is, both the illumination lens 5h' and the combining lens 7h' are regarded as plane parallel plates. In this case, the illumination lens 5h' is a cylinder lens array as shown in FIG. 8A, and the combining lens 7h' is a cylinder lens as shown in FIG. 8B.

In this manner, it is possible to reduce illuminance irregularities on the target surface 9h in the plane shown in (a) of FIG. 15 (with respect to the main scanning direction).

As described above, with the illuminating device of the image scanning device according to the third embodiment, light can be uniformly irradiated on a target surface such as a document surface with substantially no illuminance irregularities, even by employing a non-uniform light source having partial irregularities in its emission distribution, e.g., a linear light source such as a filament. Accordingly, various types of light sources can be employed, making it possible to reduce the cost of the light source.

<Fourth Embodiment>

Figure 17:
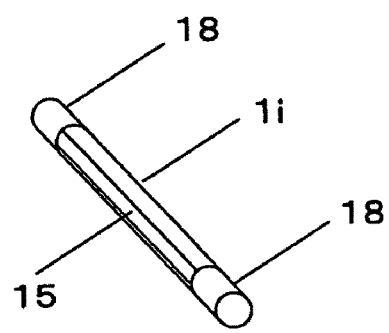
FIG. 17 is a diagram illustrating a fluorescent tube acting as a light source in the image scanning device according to the fourth embodiment of the present invention.

A description is given of an illumination system of an illuminating device in an image scanning device according to a fourth embodiment of the present invention, with reference to FIGS. 17 through 19.

Figure 18A:
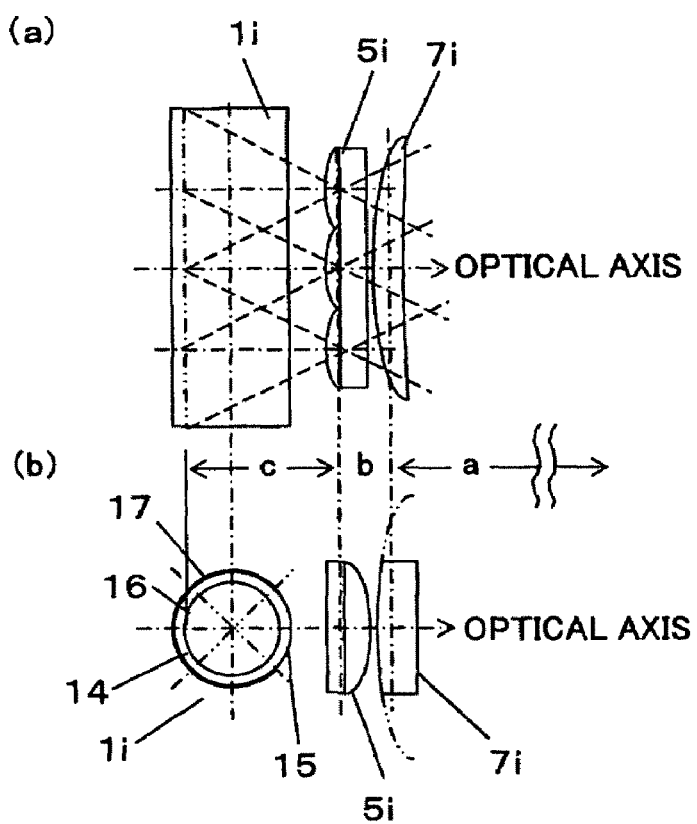
FIGS. 18A and 18B are diagrams for describing a first illumination system of the image scanning device according to the fourth embodiment of the present invention, in FIG. 18A, (a) is a top view of the first illumination system and (b) is a front view of the first illumination system.
Figure 18B:
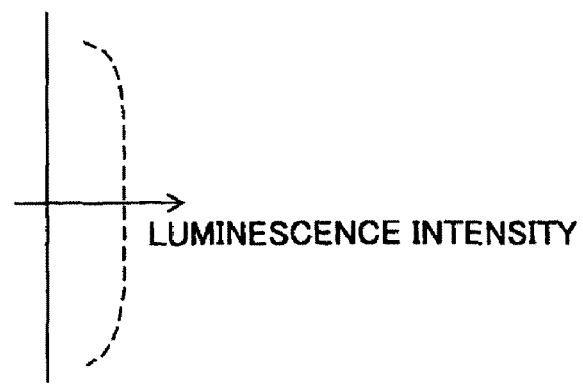

FIG. 17 illustrates a fluorescent tube acting as a light source in the image scanning device according to the fourth embodiment of the present invention. FIGS. 18A, 18B are diagrams for describing a first illumination system of the image scanning device according to the fourth embodiment of the present invention. In FIG. 18A, (a) is a top view of the first illumination system and (b) is a front view of the first illumination system. FIG. 18B illustrates a luminescence intensity distribution of the fluorescent tube acting as the light source. FIG. 19 is a diagram for describing a second illumination system of the image scanning device according to the fourth embodiment of the present invention. In FIG. 19, (a) is a top view of the second illumination system and (b) is a front view of the second illumination system.

The illumination system according to the fourth embodiment employs a strip-like illuminant (specifically, a surface-emitting illuminant such as a fluorescent lamp) as a light source. In a fluorescent tube 1*i* acting as the illuminant, as shown in FIG. 17 and (*b*) of FIG. 18, a fluorescent agent 16 is applied inside a glass tube 14 (the fluorescent agent is not applied to an opening part of the fluorescent tube), and on the outside wall of the glass tube 14 excluding the opening 15, a reflective coating 17 is formed. (If a thick layer of fluorescent agent is applied, a reflective coating will be unnecessary. Moreover, the light emission principle of the fluorescent tube 1*i* is the same as a typical fluorescent lamp, and therefore, a description thereof is omitted.) Light beams emitted from the fluorescent agent 16 are directly emitted through the opening 15 or, alternatively, the light beams are reflected a several times by the reflective coating 17 and then emitted through the opening 15. As shown in FIG. 17, an electrode 18 is provided on both ends of the fluorescent tube 1*i*.

As shown in (*a*) or (*b*) of FIG. 16A, the light emitting surface of the fluorescent tube 1*i* emits light in substantially all directions. Therefore, it is difficult to convert the light emitted from the light emitting surface of the fluorescent tube into collimated light in the main scanning direction. Particularly, in a case where the intensity of light beams emitted from the light emitting surface is uniform as shown in (*a*) of FIG. 16A, even if the condenser lens is omitted as shown in (*a*) of FIG. 15, the illumination effects of the illumination system including the fluorescent tube will not change much. In the plane shown in (*a*) of FIG. 18A, the focal length f2 of the cylinder lens included in an illumination lens 5*i* satisfies f2=1/(1/(b+a)+(1/c)), similar to the illumination lens 5*h* shown in FIG. 15. In the plane shown in (*b*) of FIG. 18A, if the focal length of the cylinder lens included in the illumination lens 5*i* is equal to c, the focal length of a combining lens 7*i* will be equal to a. A typical lens can be used as the combining lens 7*i*.

Furthermore, in a case where the intensity distribution of light beams emitted from the light emitting surface of the fluorescent tube 1*i* appears to be as shown in (*b*) of FIG. 16A, i.e., the light beams are more intensely emitted in the optical axial direction than in the other directions, a condenser lens 3*j* is preferably inserted between a fluorescent tube 1*j* and an illumination lens 5*j*, as shown in (*a*) and (*b*) of FIG. 19, in order to improve the illumination efficiency of the illumination system.

In the plane shown in (*a*) of FIG. 19, the focal length f1 of each cylinder lens included in the condenser lens 3*j* corresponds to a distance c shown in (*a*) of FIG. 19 (f1=c is satisfied). The focal length f2 of each cylinder lens included in the illumination lens 5*j* is substantially specified as f2=1/(1/(a+b)+(1/c)). In the plane shown in (*b*) of FIG. 19, the focal length f1' of the condenser lens 3*j* satisfies f1'=d, and the focal length f2' of the illumination lens 5*j* satisfies f2'=∞. Accordingly, the focal length f0 of a combining lens 7*j* satisfies f0=a, and a typical lens can be used as the combining lens 7*j*.

As shown in (*a*) of FIG. 15, even when the light source is an illuminant such as a filament, the condenser lens 3*j* is preferably inserted between the light source and the illumination lens 5*j*, if the light beams are more intensely emitted in the optical axial direction than in the other directions in the intensity distribution of light beams emitted from the light source as shown in (*b*) of FIG. 16A, in order to improve the illumination efficiency of the illumination system.

As described above, even in a case of employing a light source that uniformly emits light in the main scanning direction in principle, luminescence irregularities occur due to various factors in reality. As shown in (*a*) of FIG. 15, it is difficult to partially change the shape of the filament or uniformly apply the fluorescent agent onto the fluorescent tube. Therefore, as shown in FIG. 18B, the luminescence intensity changes near the electrode of the fluorescent tube. Even if such a light source that emits light in a non-uniform manner is employed, the target surface can be uniformly illuminated by dividing the light beams in the main scanning direction and then combining the divided light beams on the target surface. Hence, it is possible to employ a lamp that has been manufactured without considering luminescence irregularities, and therefore, costs can be reduced. Furthermore, optical elements can be placed near the filament, and therefore, the size of the image scanning device can be reduced.

As described above, in the illuminating device of the image scanning device according to the fourth embodiment, even by employing a non-uniform light source having partial irregularities in its emission distribution, including a surface light source such as a fluorescent lamp, illumination irregularities can be substantially eliminated and a target surface such as a document surface can be uniformly irradiated. Hence, various types of light sources can be employed, and costs of the light source can be reduced.

<Fifth Embodiment>

An illumination system, such as an illuminating device, of an image scanning device according to a fifth embodiment of the present invention is described with reference to FIG. 20.

Figure 20:
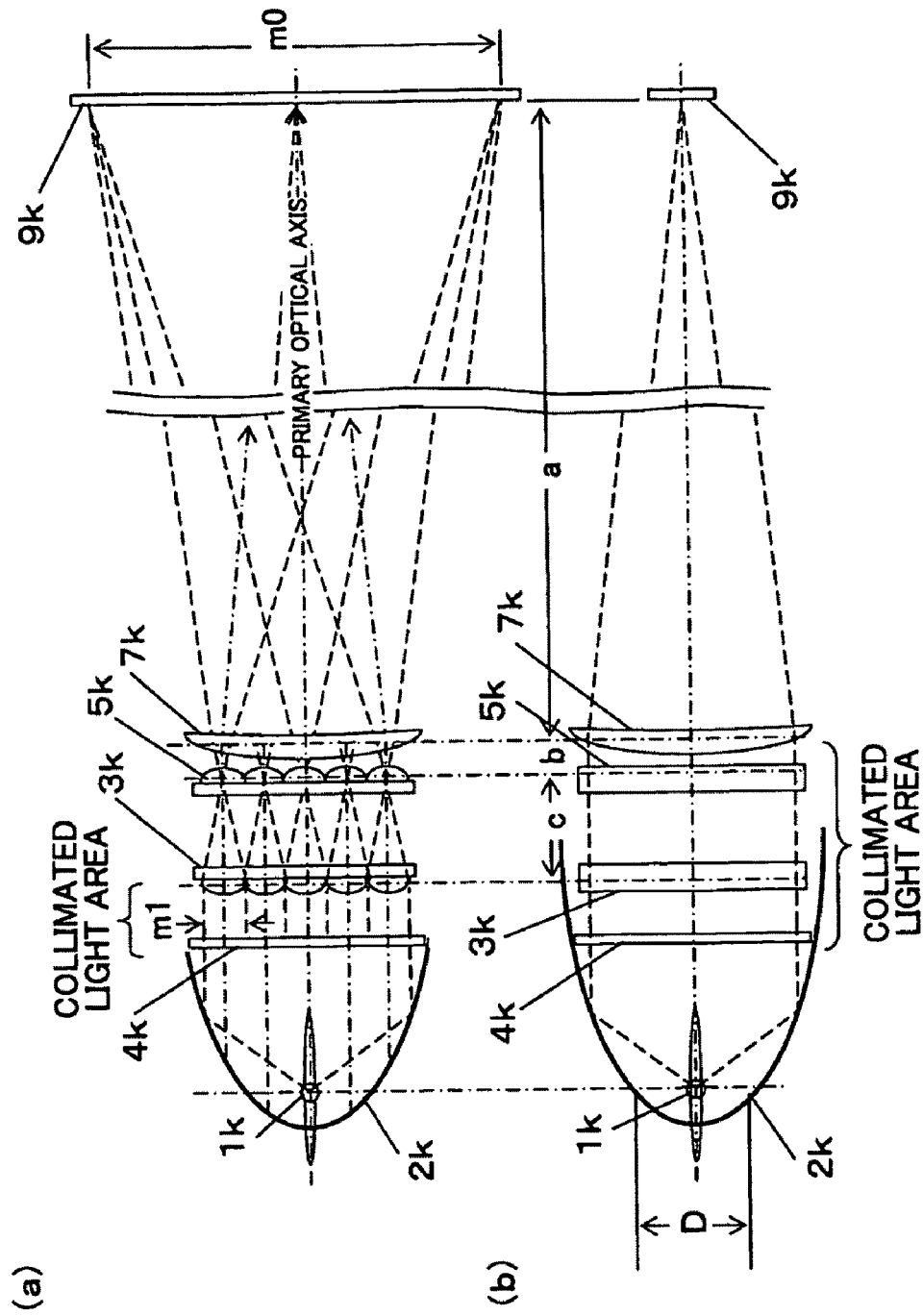
FIG. 20 is a diagram for describing a first example of an illumination system of an image scanning device according to a fifth embodiment of the present invention, wherein (a) is a top view of the first example of the illumination system, and (b) is a front view of the first example of the illumination system.
Figure 21:
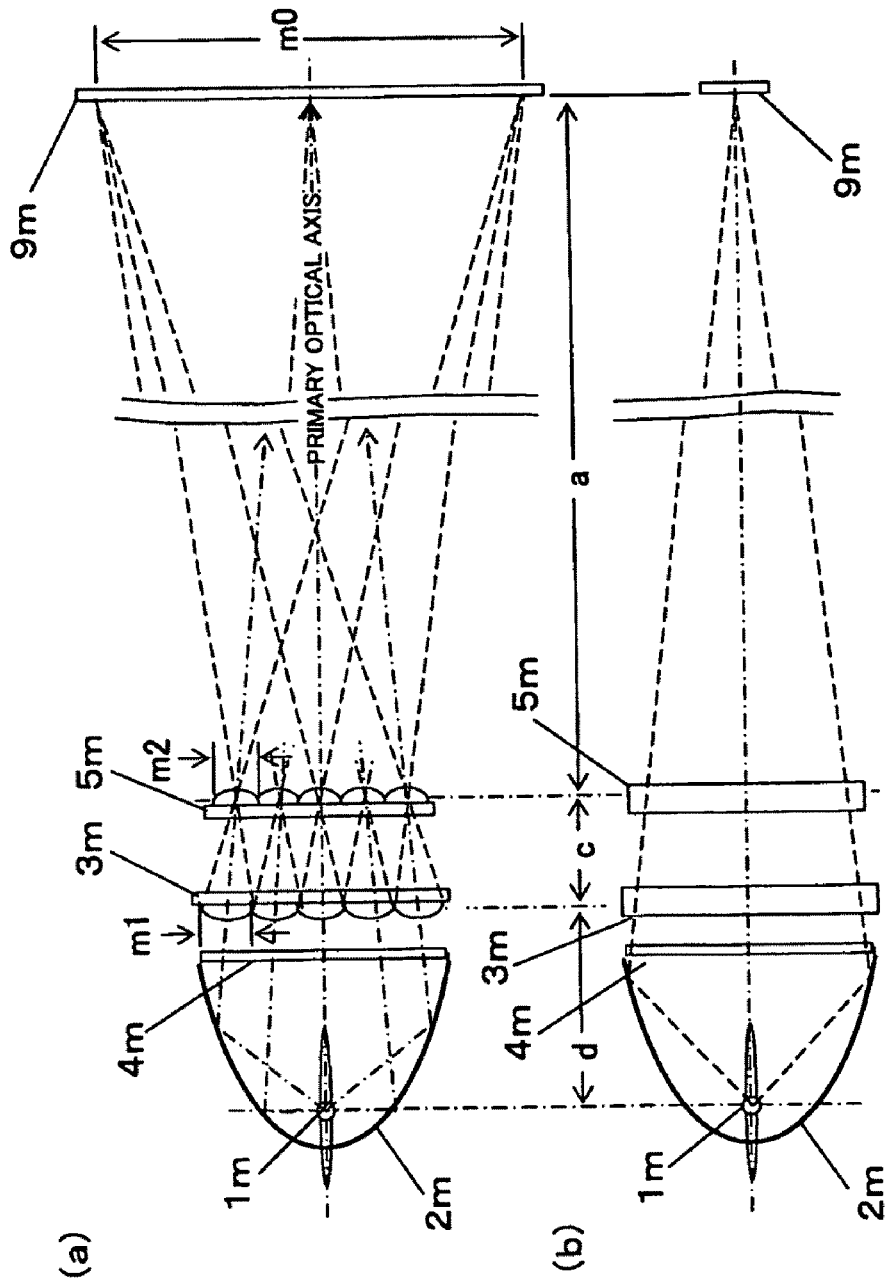
FIG. 21 is a diagram for describing a second example of an illumination system of an image scanning device according to the fifth embodiment of the present invention, wherein (a) is a top view of the second example of the illumination system, and (b) is a front view of the second example of the illumination system.

FIG. 20 is a diagram for describing a first example of an illumination system of an image scanning device according to the fifth embodiment of the present invention. FIG. 20 (*a*) is a top view of the first example of the illumination system, and FIG. 20 (*b*) is a front view of the first example of the illumination system. FIG. 21 is a diagram for describing a second example of an illumination system of an image scanning device according to the fifth embodiment. FIG. 21 (*a*) is a top view of the second example of the illumination system, and FIG. 21 (*b*) is a front view of the second example of the illumination system.

The fifth embodiment illustrates an illumination system that uses, as a light source 1*k*, a discharge lamp (arc lamp) such as a mercury lamp, a xenon lamp and a metal halide lamp.

The illumination system shown in FIG. 20 uses a parabolic mirror 2*k* as a reflector. A light emitting portion of the arc lamp of the light source 1*k* is disposed in the focal position of the paraboloid, and therefore a collimated light is emitted from the entire surface of the parabolic-mirror 2*k*. In the illumination system shown in FIG. 20, a light beam is divided and combined through a condenser lens 3*k*, an illumination lens 5*k*, and a combining lens 7*k*, and it is therefore possible to uniformly and highly efficiently illuminate a target surface 9*k*. The focal lengths of each of the condenser lens 3*k*, the illumination lens 5*k*, and the combining lens 7*k* may be set as in FIG. 7. The front face of the parabolic mirror 2*k* is covered with a cover 4*k*.

The illumination system shown in FIG. 21 uses an ellipsoidal mirror 2*m* as a reflector. A light emitting portion of an arc lamp of a light source 1*m* is disposed in a first focal position of the ellipsoidal mirror 2*m*, and the center of a target surface 9*m* is disposed in a second focal position of the ellipsoidal mirror 2*m*. With this configuration, a combining lens can be omitted. A focal length c of a condenser lens 3*m* and a focal length a of an illumination lens 5*m* satisfy c<<a and therefore can be set as in FIG. 7 (more specifically, f1=c, f2=1/((1/c)+(1/a)). However, to improve illumination efficiency of the illumination system, as shown in FIG. 21, the size of a cylinder lens of the condenser lens 3*m* needs to be proportional to a cylinder lens of the illumination lens 5*m*

(more specifically, m1/m2=(c+a)/a). The front face of the ellipsoidal mirror 2m is covered with a cover 4m.

The illumination systems shown in FIGS. 20 and 21 are designed based on using a discharge lamp as the light source. The arc length of the arc lamp is in a range of 1 mm through 2 mm, and therefore the arc lamp can emit a light from a very small area, resulting in the illumination system having high illumination efficiency. If it is acceptable that the illumination system has slightly lower illumination efficiency, a filament lamp or a halogen lamp having a filament as small as a few millimeters may be used as the light source. Illumination efficiency of such an illumination system using a filament lamp or a halogen lamp is lower than that of an illumination system using a discharge lamp but is significantly higher than illumination efficiency of a conventional illuminating device.

In the fifth embodiment shown in FIGS. 20 and 21, an LED may be used as the light source in place of the discharge lamp. With regard to the position of the LED, as shown in FIG. 25B, in the case where a parabolic mirror is used as a reflector, the light emitting surface of an LED pellet is placed in the focal position of the parabolic mirror (although not shown, in the case where an ellipsoidal mirror is used, the light emitting surface of an LED pellet is placed in a first focal position of the ellipsoidal mirror). In these cases, even if a relatively large LED is used, it is still possible to reduce the whole size of the illuminating device. The light emission amount of the LED is proportional to the area of the pellet. Accordingly, if the length of the side of the pellet is doubled or tripled, the light emission amount of the LED is increased in proportion to square of the side of the pellet. That is, the light emission amount is increased three fold or nine fold, respectively. The collimation performance of the parabolic mirror of FIG. 20 is substantially proportional to the length of the side of the LED pellet if the F value of the paraboloid is constant. The light collecting performance of the ellipsoidal mirror of FIG. 21 is substantially proportional to the length of the side of the LED pellet if the ellipticity of the ellipsoid is constant. For instance, in the case where a parabolic mirror is used as a reflector, parallelism of a collimated light and illumination efficiency obtained by an illumination system using a combination of an LED pellet with the side of 0.3 mm and a parabolic mirror of F=1.8 are the same as those obtained by an illumination system using a combination of an LED pellet with the side of 1.0 mm and a parabolic mirror of F=6. The diameter of the parabolic mirror, denoted by D in FIG. 20 (b), at the focal point of the paraboloid is four times the F value. Accordingly, in the above illuminating systems, the diameters of the paraboloids are 7.2 mm and 24 mm, respectively. The ratio between the diameters of the paraboloids matches the ratio between the lengths of the sides of the LED pellets, which is about 1:3.3, and the ratio between the light amounts of the illumination systems is about 1:11.

<Sixth Embodiment>

An illumination system, such as an illuminating device, of an image scanning device according to a sixth embodiment of the present invention is described with reference to FIG. 22.

Figure 22:
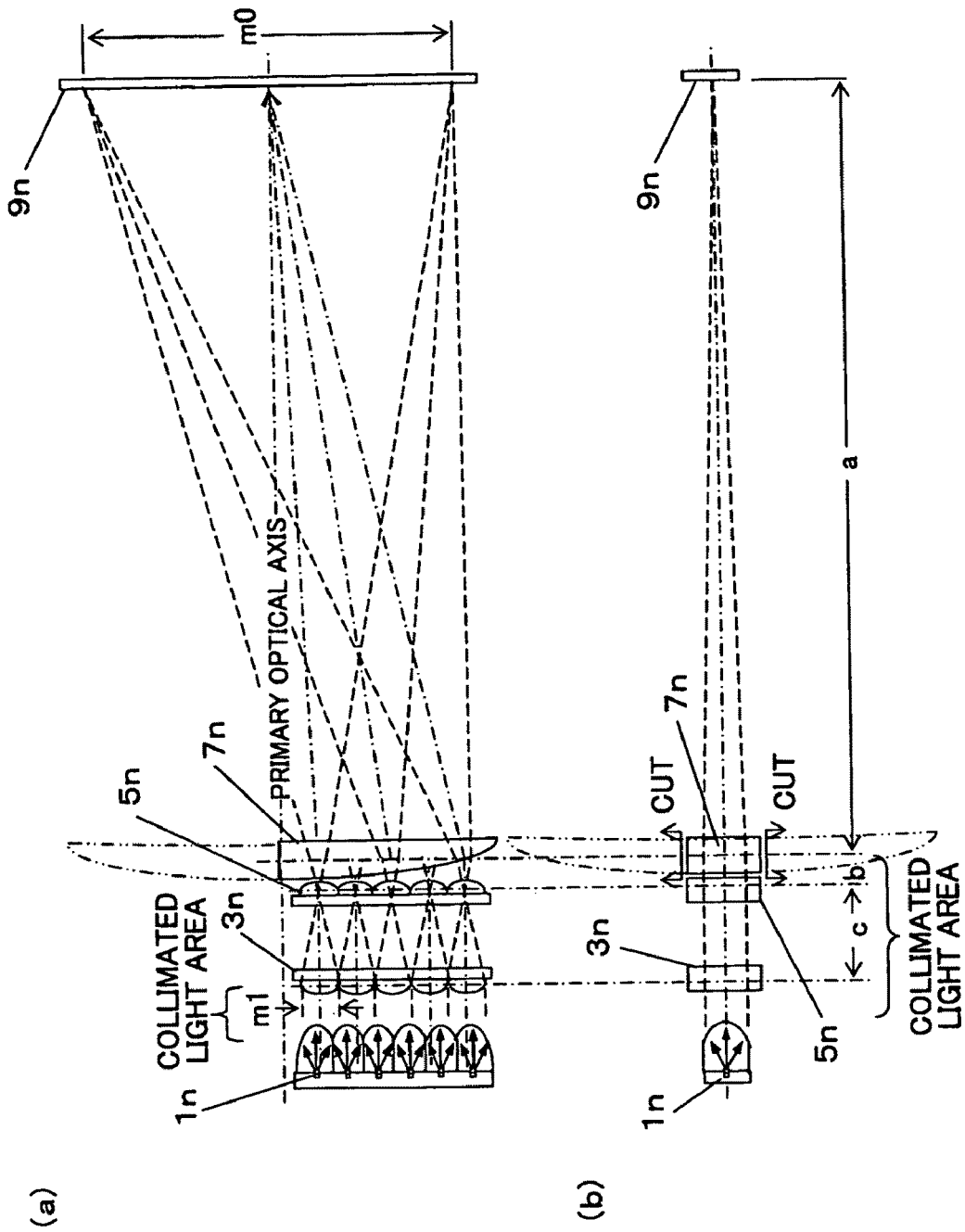
FIG. 22 is a diagram for describing an example of an illumination system of an image scanning device according to a sixth embodiment of the present invention, wherein (a) is a top view of the example of the illumination system, and (b) is a front view of the example of the illumination system.

FIG. 22 is a diagram for describing an example of an illumination system of an image scanning device according to the sixth embodiment of the present invention. FIG. 22 (a) is a top view of the example of the illumination system, and FIG. 22 (b) is a front view of the example of the illumination system.

In the example shown in the sixth embodiment, the centers of a light source 1n, a condenser lens 3n and an illumination lens 5n are shifted from the center of a target surface.

As shown in FIG. 15, an illuminating device of this embodiment includes the light source 1n, the condenser lens 3n, the illumination lens 5n, and a combining lens 7n. The primary optical axis of the combining lens 7n shifts the centers of the light source 1n, the condenser lens 3n and the illumination lens 5n from the center of the target surface. The center of the combining lens 7n matches the center of the target surface 9n. In other words, the portion out of the center of the combining lens 9n is used for illumination. The portion of the combining lens where the light beam emitted from the light source does not pass through may be cut off.

In the case of mounting the illumination system having the configuration as shown in FIGS. 22 (a) and (b) in an image scanning device (describe below), the illumination system can be disposed adjacent to (next to) an imaging lens for scanning images. These arrangements of the illumination system and the image scanning device can reduced the entire thickness of the image scanning device. In other words, the arrangement as shown in the sixth embodiment does not require the configuration of an illuminating device using a conventional illumination method, and therefore can reduce the entire thickness of the image scanning device.

<Seventh Embodiment>

An illumination system, such as an illuminating device, of an image scanning device according to a seventh embodiment of the present invention is described with reference to FIGS. 23 and 24.

Figure 23:
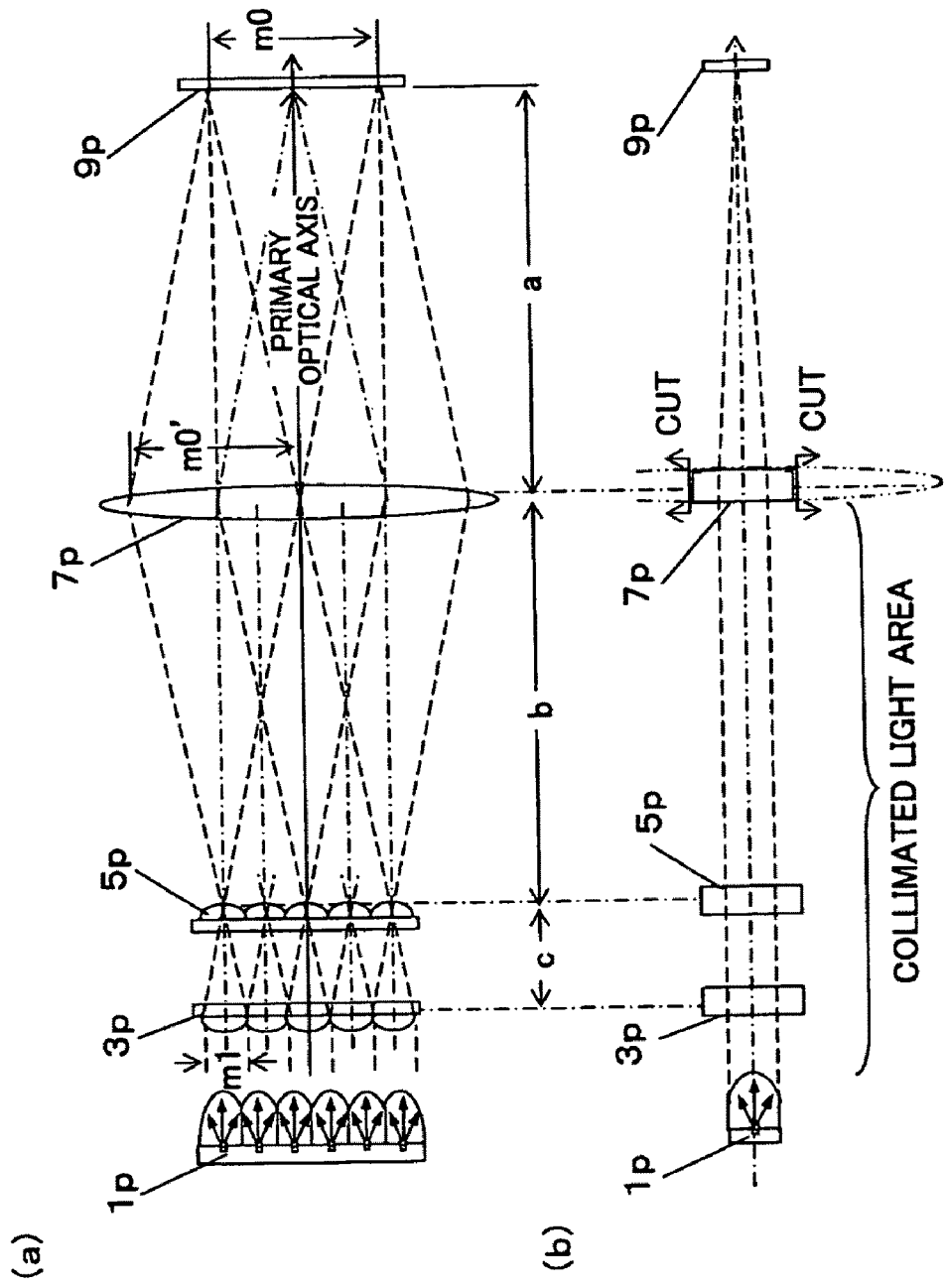
FIG. 23 is a diagram for describing a first illumination system of an image scanning device according to a seventh embodiment of the present invention, wherein (a) is a top view of the first illumination system, and (b) is a front view of the first illumination system.

FIG. 23 is a diagram for describing a first illumination system of an image scanning device according to the seventh embodiment of the present invention. FIG. 23 (a) is a top view of the first illumination system, and FIG. 23 (b) is a front view of the first illumination system. FIG. 24 is a diagram for describing a second illumination system of an image scanning device according to the seventh embodiment of the present invention. FIG. 24 (a) is a top view of the second illumination system, and FIG. 24 (b) is a front view of the second illumination system.

Although in the first through sixth embodiments the combining lens 7 is placed in the close proximity of the illumination lens 5, as long as the optical axes (secondary optical axes) of the light beams divided by the condenser lens 3 or the illumination lens 5 can meet at the center of the target surface 9, the combining lens 7 may be placed anywhere between the target surface 9 and the illumination lens 5.

For example, as shown in FIG. 23, a combining lens $7p$ is placed halfway between a target surface $9p$ and an illumination lens $5p$. In this case, a focal length f1 of a condenser lens $3p$ satisfies f1=c; a focal length f2 of the illumination lens $5p$ satisfies f2=1/((1/b)+(1/c)); and a focal length f0 of the combining lens $7p$ satisfies f0=a=b.

A light beam having a width m1 divided by the condenser lens $3p$ is expanded to have a width m0' at the position of the combining lens $7p$. The light beam having the width m0' is collimated by the combining lens $7p$ and is incident on the target surface $9p$. Secondary optical axes of the light beams divided by cylinder lenses of the condenser lens $3p$ extend parallel to one another to reach the combining lens $7p$, where the axes are made to meet at the center of the target surface $9p$. As the width m1 of each cylinder lens of the condenser lens $3p$ corresponds to a width m0 of the target surface $9p$, and the light beams divided by the cylinder lenses of the condenser lens $3p$ are combined at and incident on the target surface $9p$.

Figure 24:
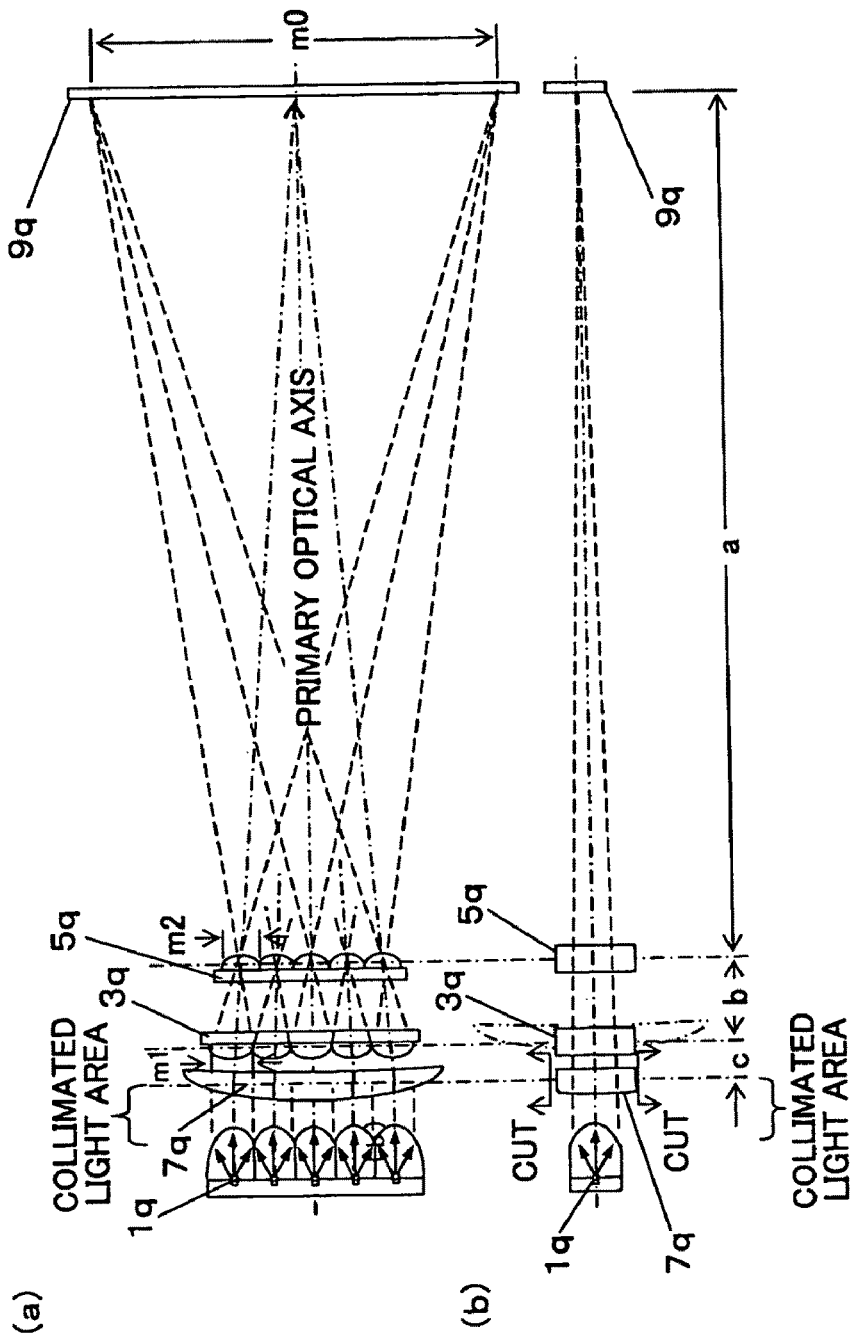
FIG. 24 is a diagram for describing a second illumination system of an image scanning device according to the seventh embodiment of the present invention, wherein (a) is a top view of the second illumination system, and (b) is a front view of the second illumination system.

Alternatively, as shown in FIG. 24, a combining lens $7q$ may be placed between a light source $1q$ and a condenser lens (light dividing lens) $3q$. In this case, a focal length f0 of the combining lens $7q$ satisfies f0=a+b+c; a focal length f1 of the condenser lens $3q$ satisfies f1=b; and a focal length f2 of an illumination lens $5q$ satisfies f2=1/((1/a)+(1/b)). When the ratio between the size of the cylinder lens of the condenser lens 3*q* and the size of the cylinder lens of the illumination lens 5*q* satisfies m1/m2=(a+b)/a, it is possible to achieve performance at the same level as that of the illumination system shown in FIG. 7.

Further alternatively, the combining lens may be placed between the condenser lens and the illumination lens. That is, the illumination system can be configured such that the optical axes (secondary axes) of the light beams divided by the condenser lens (the light dividing lens) are aligned with the optical axis of the illumination lens and are made to meet on the target surface by the condensing lens.

<Eighth Embodiment>

An illumination system, such as an illuminating device, of an image scanning device according to an eighth embodiment of the present invention is described with reference to FIGS. 25A, 25B, and 26.

Figure 25A:
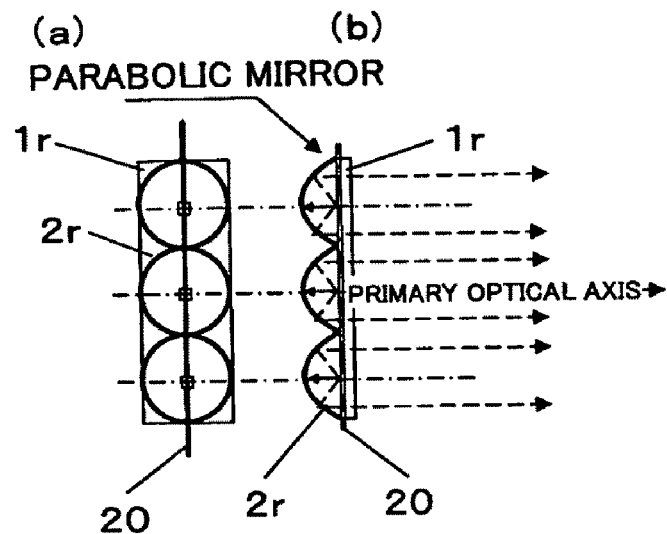
FIG. 25A is a diagram for describing a light source having linearly disposed LEDs and a reflecting mirror that converts a divergent light emitted from the LEDs into a collimated light, wherein (a) is a side view of the light source, and (b) is a top view of the light source.
Figure 25B:
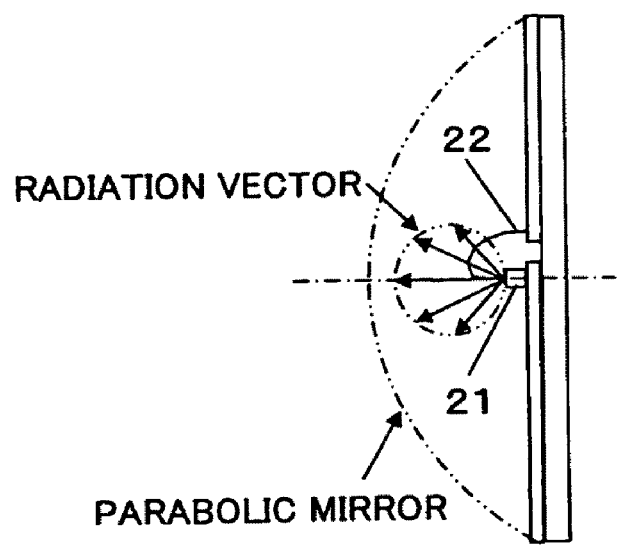
FIG. 25B is a diagram for describing a position of an LED pellet with respect to a parabolic mirror and a radiation vector of a light beam emitted from the LED pellet.

FIG. 25A is a diagram for describing a light source having linearly disposed LEDs and a reflecting mirror that converts a divergent light emitted from the LEDs into a collimated light. FIG. 25A (*a*) is a side view of the light source, and FIG. 25A (*b*) is a top view of the light source. FIG. 25B is a diagram for describing a position of an LED pellet with respect to a parabolic mirror and a radiation vector of a light beam emitted from the LED pellet.

Figure 26:
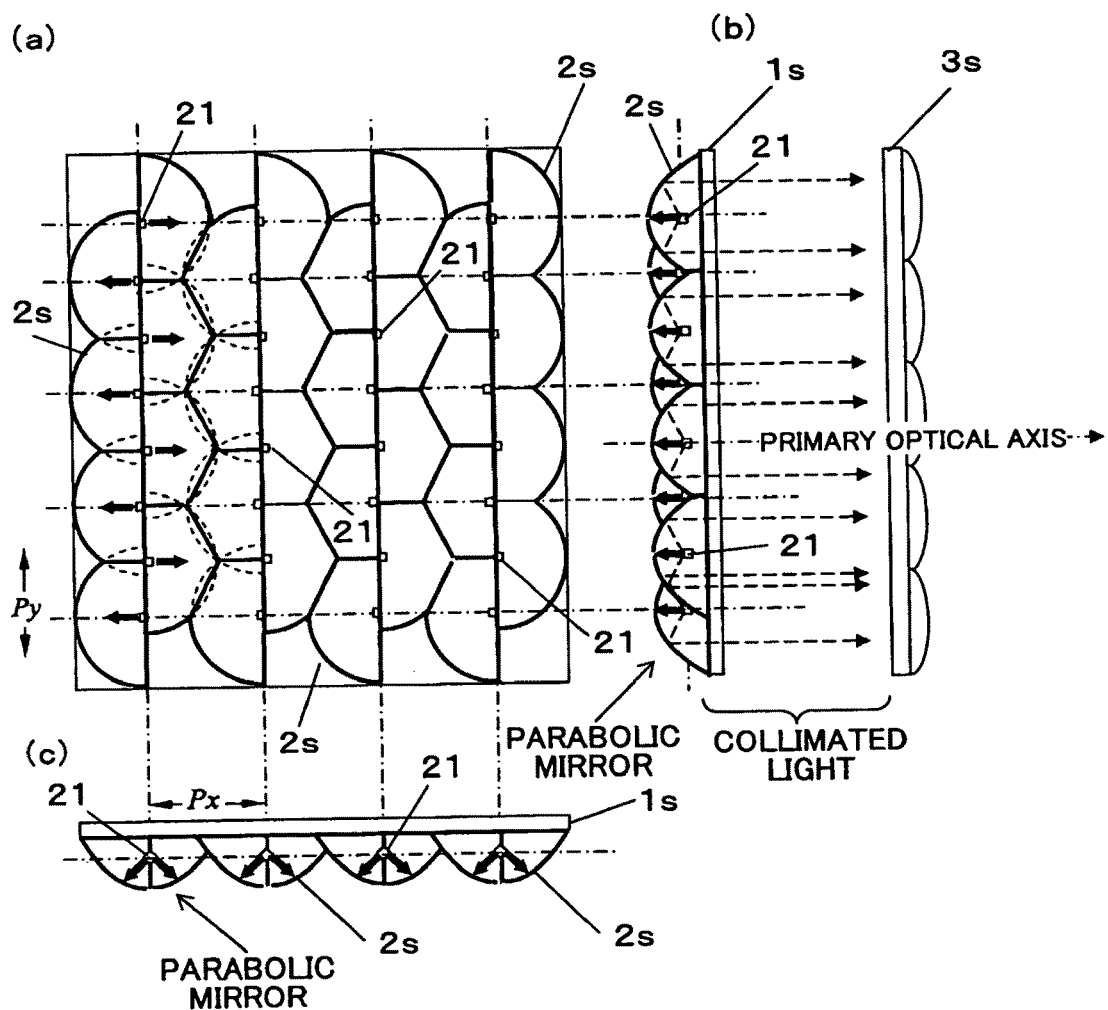
FIG. 26 is a diagram for describing a light source having two-dimensionally disposed LEDs and a reflecting mirror that converts a divergent light emitted from the LEDs into a collimated light, wherein (a) is a side view of the light source, and (b) is a top view of the light source.

FIG. 26 is a diagram for describing a light source having two-dimensionally disposed LEDs and a reflecting mirror that converts a divergent light emitted from the LEDs into a collimated light. FIG. 26 (*a*) is a side view of the light source, and FIG. 26 (*b*) is a top view of the light source.

In the above-described first, second and sixth embodiments, the light emitted from the light emitting surface of the LED is converted into a collimated light by using a lens. On the other hand, in the eighth embodiment, the light emitted from the light emitting surface of the LED is converted into a collimated light by using a reflecting mirror as described below.

A reflecting mirror that can be easily manufactured is a spherical mirror is used. When the light emitting portion of the LED is spaced apart by a distance r/2 from the center of the spherical surface, wherein r represents the diameter of the spherical surface, a substantially collimated light can be obtained. However, as shown in FIGS. 25A and 26, using parabolic mirrors 2*r* and 2*s* is the best way.

In the light source shown in FIGS. 25A and 25B, the plural parabolic mirrors 2*r* are linearly disposed, and the light emitting surface of the LED pellet 21 is perpendicular to the optical axis of the LED and is placed in the focal position of the parabolic mirror 2*r*. The main body of the parabolic mirror 2*r* is formed of transparent resin (e.g. acrylic resin). Aluminum is deposited on the paraboloid of the parabolic mirror 2*r*, thereby obtaining a total reflecting mirror on the paraboloid. With this configuration, a high quality collimated light can be obtained. However, in the light source of FIG. 25A having such a simple configuration, as shown in FIG. 25B, although the light beam emitted in the direction perpendicular to the light emitting surface of the LED pellet 21 has the greatest light amount, this light beam is reflected by the parabolic mirror and then is blocked by the LED pellet 21, an electric conductor 20, and a lead 22. As a result, the output of the light source is reduced, and therefore illumination efficiency of the illumination system is reduced.

The light source shown in FIGS. 26 (*a*), (*b*) and (*c*) is designed to improve utilization ratio of the light beam emitted from the light source by overcoming the disadvantage of the simple light source having the linearly disposed LEDs. More specifically, arrays of plural LEDs are disposed side by side, thereby improving efficiency of collecting a light emitted from the light source.

In the light source shown in FIGS. 26 (*a*), (*b*) and (*c*), a parabolic mirror 2*s* as a reflecting mirror has a mirror surface, which is obtained through aluminum evaporation, on the paraboloid in the main body made of a transparent resin material. An LED pellet 21 is disposed on the focal position of the parabolic mirror 2*s*. The parabolic mirror 2*s* and the LED pellet 21 are the same as those in the light source shown in FIGS. 25A and 25B. However, unlike the light source shown in FIGS. 25A and 25B, the LED pellet 21 is tilted at an angle of +450 with respect to the optical axis of the parabolic mirror such that the light emitted from the light emitting surface of the LED pellet 21 is divided into two directions. In this light source, a high intensity light emitted in the direction perpendicular to the light emitting surface of the LED pellet 21 and reflected by the parabolic mirror is not substantially blocked by the LED pellet 21, an electric conductor 20 and a lead 22, but a relatively low intensity light emitted in the direction oblique to the light emitting surface of the LED pellet 21 and reflected by the parabolic mirror is blocked. Accordingly, it is possible to increase the output of the light source and the illumination efficiency of the illumination system. Moreover, when plural LED arrays are provided, a honeycomb structure of staggered parabolic mirrors as shown in FIGS. 26 (*a*) and (*b*) may be used to improve utilization ratio of the area of the light-source.

<Ninth Embodiment>

An image scanning device according to a ninth embodiment of the present invention is described with reference to FIGS. 27, 28 and 29.

Figure 27:
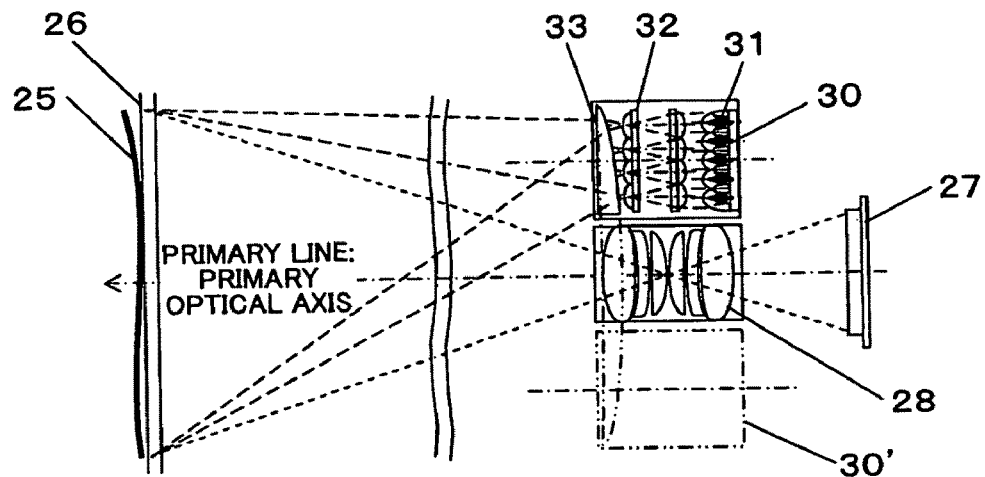
FIG. 27 is a top view of an image scanning device using integrally formed illumination system and reading unit according to a ninth embodiment.

FIG. 27 is a top view of an image scanning device of the ninth embodiment using integrally formed illumination system and reading unit. FIG. 28 is a front view of an image scanning device of the ninth embodiment using integrally formed illumination system and reading unit integrated. In FIGS. 27 and 28, first and second traveling bodies are not omitted. In FIG. 27, a turn-around mirror and a deflecting mirror are omitted, and a document 25 surface and a contact glass 26 are shown expanded, at 90 degrees. In FIG. 28, a mirror mounted on the first moving body is shown. The diagrams of FIGS. 27 and 28 are for describing scanning operations in a main-scanning direction.

While the first through eighth embodiments mainly discuss the illumination system (illuminating device), the ninth embodiment discusses an image scanning device having the above described illumination system and an imaging system that are formed integrally. The ninth embodiment not only applies the concept of the illumination systems of the first through eighth embodiments to the image scanning device, but also improves performance of scanning images on the document surface.

Figure 1B:
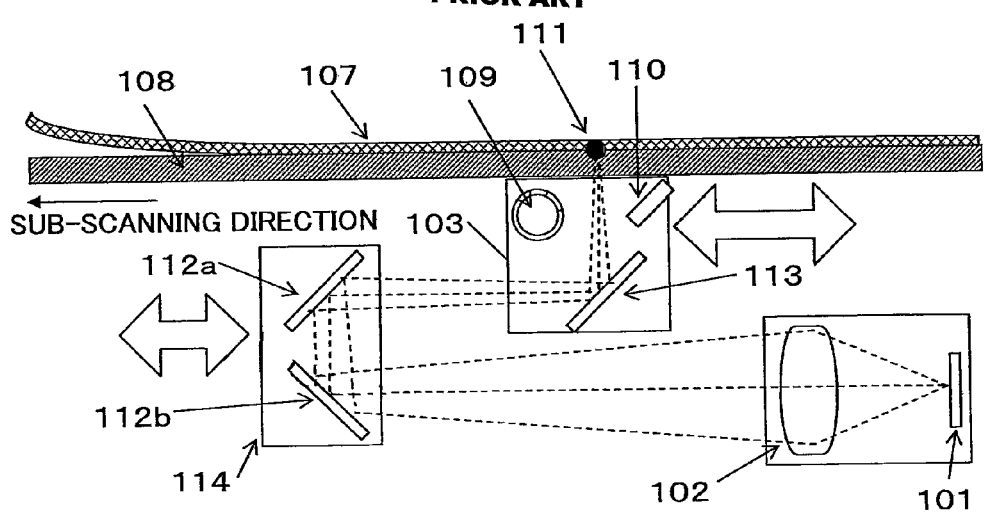
FIG. 1B is a cut-away side view of the image scanning device in the sub-scanning direction.
Figure 2:
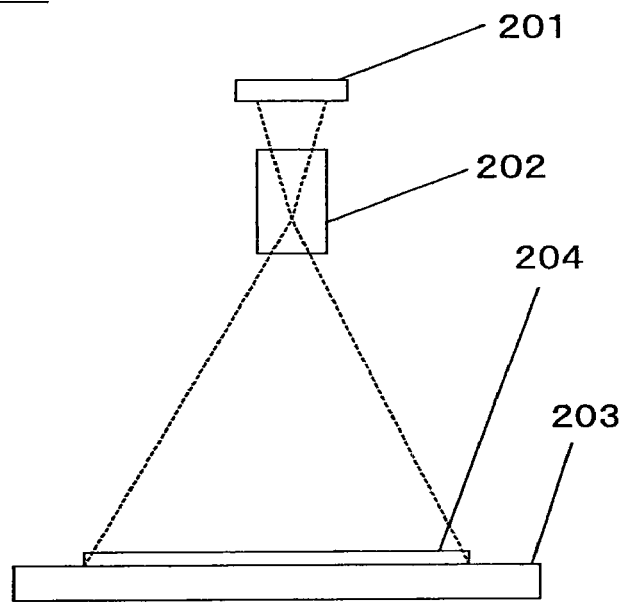
FIG. 2 is a schematic diagram of another type of image scanning device.
Figure 3:
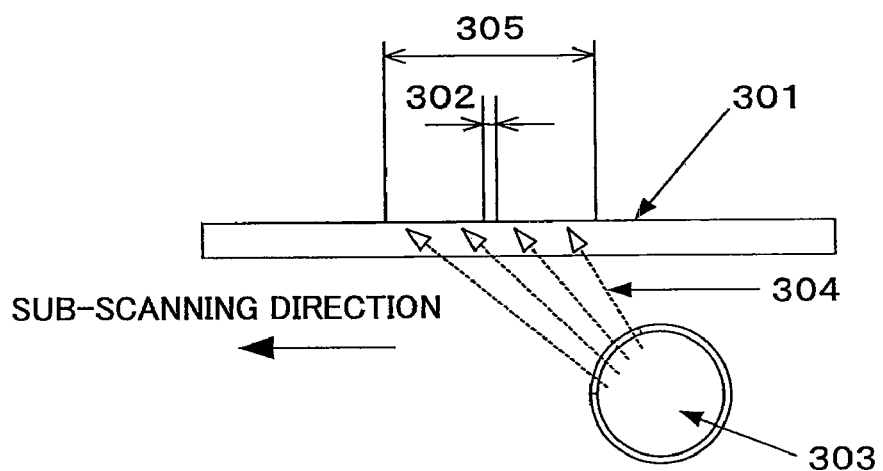
FIG. 3 is a diagram illustrating the relationship between an illuminating area and a scanning area in an image scanning device.
Figure 4:
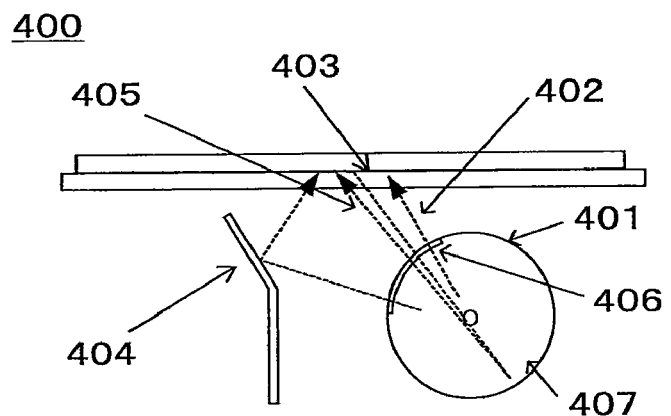
FIG. 4 is a diagram for describing illumination in an image scanning device and how flare occurs in the image scanning device.
Figure 5:
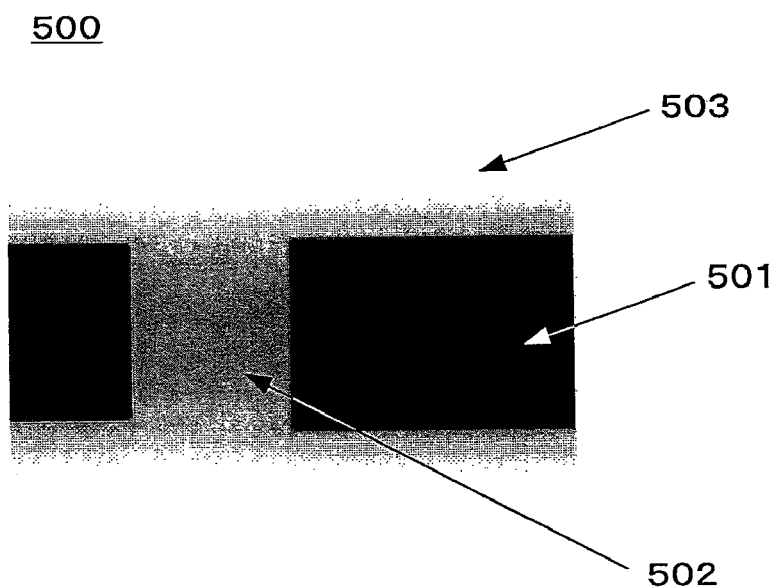
FIG. 5 is an exemplary image scanned by an image scanning device in which flare has occurred.
Figure 6:
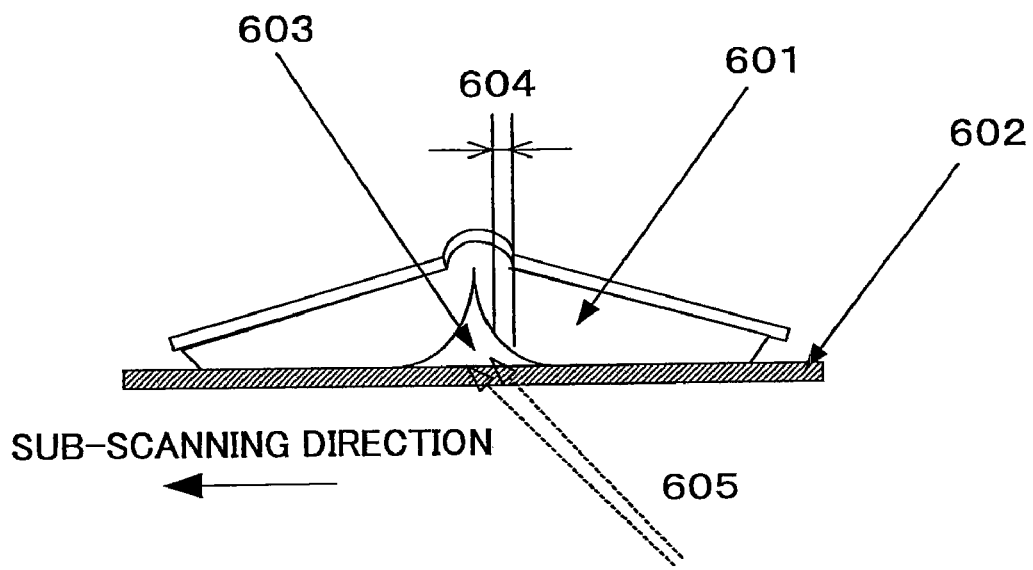
FIG. 6 is a diagram for describing a shadow that appears in an image scanned from a book document.

For example, if the illumination system shown in FIG. 7 is mounted in the image scanning device shown in FIGS. 1A and 1B, the image scanning device includes a contact glass on which the document 25 is placed, an imaging lens 28 as an imaging unit for focusing images of the document 25 surface onto an image sensor 27, and an illuminating device 30 disposed parallel to a primary line (primary optical axis) of the imaging lens 28. The illuminating device 30 includes at least a light source 31, an illumination lens 32 for illuminating the document 25 surface, and a combining lens 33 for combining illumination lights on the document surface. The illuminating device 30 is disposed out of the center of the combining lens 9*n*. In this case, the light source 31, the condenser lens, the illumination lens 32, the combining lens 33 can be disposed as a unit (constituting the illuminating device) next to an imaging lens. The imaging lens 28 and the image sensor 27 constituting the imaging system and the illuminating device 30 constituting the illumination system are disposed in a fixed portion of the main body of the image scanning device having the fixed contact glass 26.

The illumination light emitted from the light source 31 passes through the illumination lens 32 and the combining lens 33 to illuminate the document 25 surface in the main-scanning direction (this illumination system uses the method described with reference to FIG. 22).

The light beams emitted from the light source 31 are combined on the document 25 surface by the combining lens 33. The layout of the imaging lens 28 and other components is determined such that the image on the document 25 surface illuminated by the combined light is scanned by the image sensor 27.

In the image scanning device shown in FIG. 27, the imaging lens 28 is disposed such that the primary line (primary optical axis) of the imaging lens 28 passes through the center of the document 25 surface. The image sensor 27 is disposed such that the center of the image sensor 27 is aligned with the primary line of the imaging lens 28. With this configuration, it is possible to focus images onto the image sensor 27 with minimized distortion due to the imaging lens 28. The primary optical axis of the combining lens 33 is accurately aligned with the primary line (primary optical axis) of the imaging lens 28. If the primary line of the imaging lens 28 is shifted, the primary line of the imaging lens 28 is not aligned with but is parallel to the primary optical axis of the combining lens 33.

To double the amount of illumination light, for example, a second illuminating device 30' is provided in a position symmetric to the first illumination device 30 with respect to the primary optical axis of the imaging lens 33. The roles of the first illuminating device and the second illuminating device may be determined in terms of color of the illumination light. For example, the first illuminating device provides R (red) and G (green) illumination lights, while the second illuminating device provides a B (blue) illumination light. The assignment of responsible colors and combination of colors are not particularly limited.

Although in FIG. 27 the imaging system having the imaging lens 28 is disposed to face the center of the document (25) surface, the illuminating device 30 may be disposed to face the center of the document (25) surface in place of the imaging system. The imaging system and the illumination system may be disposed to face each other over the line (the primary line (primary optical axis) in FIG. 27) passing through the center of the document 25 surface.

In the case of the image scanning device as shown in FIG. 18, if the document surface is illuminated in the direction perpendicular to the document surface, surface reflection of the contact glass 26 or reflection from the glossy surface of the document 25 surface are incident on the imaging lens 28. This causes halation and might result in low-quality scanned images.

An image scanning device which overcomes such a problem is described below with reference to FIG. 28. In the image scanning device shown in FIG. 28, an imaging optical axis 37 of an imaging lens 36 for an image sensor 35 and an illumination optical axis 38 of a combining lens 43 of an illumination device 40 extend through a turn-around mirror 44 and other components to reach a document surface 45. As mentioned above, the imaging optical axis 37 is accurately aligned with the illumination optical axis 38. On the other hand, an optical axis 47 extending to the document surface 45 is not aligned with a normal line 46 of the document surface 45 but has a predetermined angle with respect to the normal line 46 of the document surface 45.

The illumination light aligned with the optical axis 47 reaches and is reflected by the document surface 45, so that specular reflection components of the reflected light are reflected in the direction of a specular reflection axis 48. Since the direction of the specular reflection axis is different from the direction of the optical axis 47 as an imaging optical axis, the specular reflection components of the light reflected by the document surface 45 are not incident on the image sensor 35. That is, only diffuse reflection components of the illumination light that has reached the document surface 45 are incident on the image sensor 35. Accordingly, image scanning by the image sensor is not affected by variation of gloss of the document surface 45. (If the specular reflection components are incident on the image sensor 35, the amount of light incident on the image sensor 35 varies depending on the gloss of the document, making it difficult to accurately read the image density of the document).

The optical axis 47 extending to the document surface 45 is made to have a predetermined angle with respect to the normal line 46 of the document surface 45 by, for example, adjusting the inclination angle of the turn-around mirror 44. For instance, in an image scanning device using two traveling bodies, the angles of an imaging optical axis and an illumination optical axis with respect to the document surface can be adjusted by changing the angle of a turn-around mirror of the first moving body.

Figure 28:
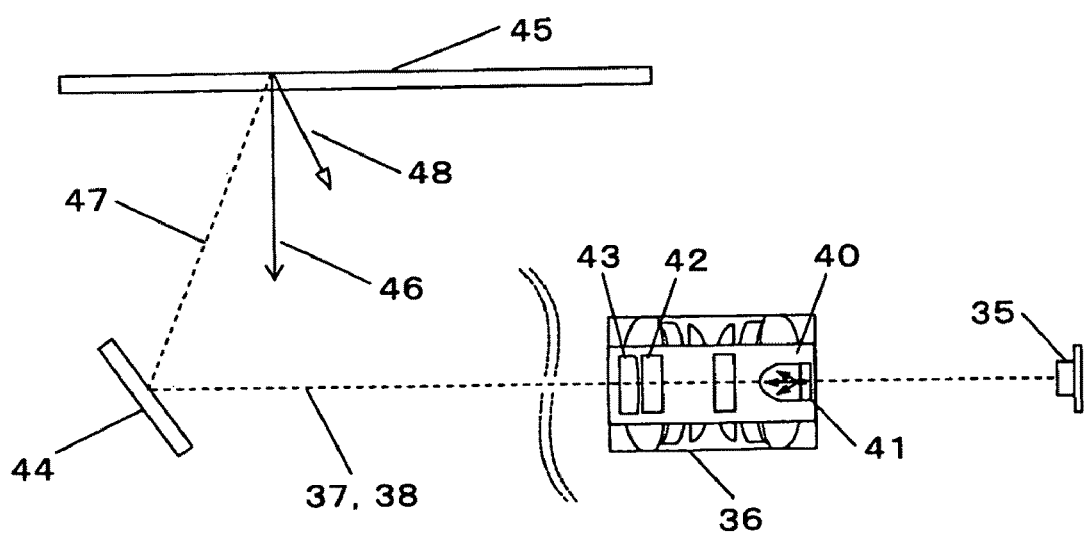
FIG. 28 is a top view of an image scanning device using integrally formed illumination system and reading unit according to the ninth embodiment.
Figure 29:
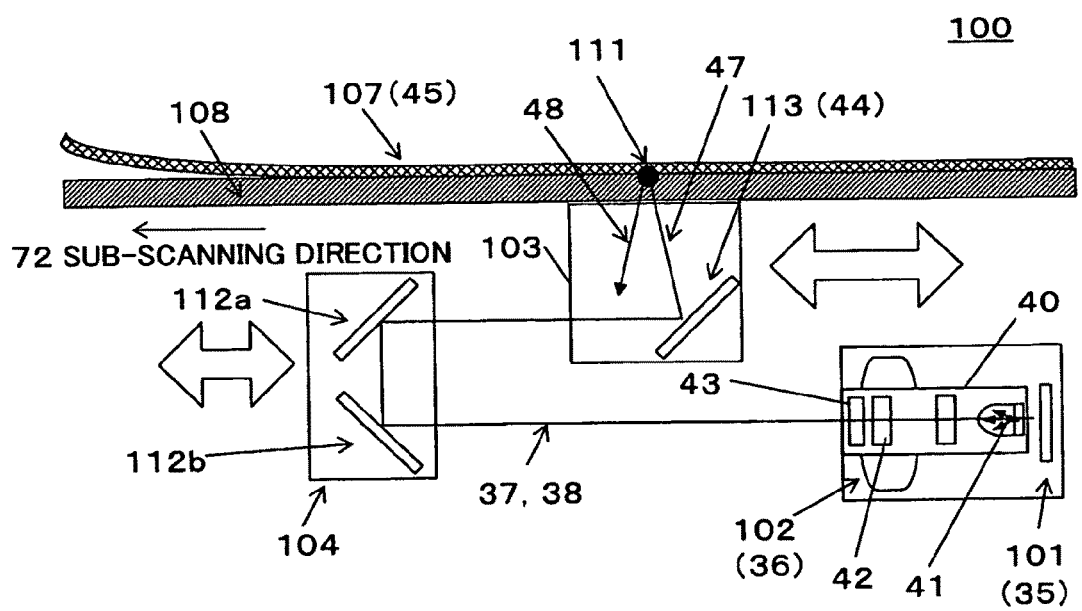
FIG. 29 is a diagram for describing the image scanning devices shown in FIGS. 27 and 28 corresponding to the image scanning device shown in FIGS. 1A and 1B.

FIG. 29 is a diagram for describing the image scanning devices shown in FIGS. 27 and 28 corresponding to the image scanning device shown in FIGS. 1A and 1B. In FIG. 29, the reference numerals shown in FIGS. 1A and 1B are shown along the corresponding reference numerals shown in FIGS. 27 and 28.

When an image scanning device 100 using an illuminating device of an embodiment of the present invention is viewed from the front, an illumination optical axis 38 of an illuminating device 40 is aligned with reading optical axes 37 of an imaging lens 102 (36) and a one-dimensional image sensor 101 (35).

A light beam emitted from the light source 41 of the illuminating device 40 passes through a combining lens 43, is bent by two turn-around mirrors 112a and 112b of a second moving body 104, is reflected by a deflecting mirror 113 (44) of a first moving body 103, and thus illuminates a document 107 (45) on a contact glass 108. Since the light is bent at a right angle by each of the two turn-around mirrors 112a and 112b of the second moving body 104, the light beam emitted from the light source is reflected in a direction opposite to the direction in which light is incident on the second moving body. The light beam reflected by the turn-around mirrors 112a and 112b is bent at an angle slightly greater than a right angle by the deflecting mirror 113 of the first moving body 103 so as to be incident on the contact glass 108 and the document 107 (45) surface at an angle slightly tilted with respect to the direction perpendicular to the contact glass 108 and the document 107 (45) surface. Therefore, a direct reflection light 48 reflected by each of the contact glass 108 and the document 107 (45) surface travels in a direction different from the direction of the incident light 47 and does not return to the deflecting mirror 113. On the other hand, the document surface 107 (45) is typically a paper surface, the most part of the incident light 47 is reflected and scattered. A component (vector) of the light reflected onto a primary line aligned with the incident light 47 (in the front view) travels to the deflecting mirror 113 as an image light and then to the turn-around mirrors 112a and 112b of the second moving body 104. The image light is then bent at a right angle by each of the two turn-around mirrors 112a and 112b of the second moving body 104, so that the image light from the document 107 (45) surface is reflected in a direction opposite to the direction in which light is incident on the second moving body. The image light then passes through the imaging lens 102 (36) and is focused onto the one-dimensional image sensor 101 (35).

In other words, the illumination light from the illuminating device 40 illuminates a linear imaging area 111 on the contact glass 108, so that the image of the document 107 (45) surface in the imaging area 111 is focused onto the one-dimensional image sensor 101 (35). The focused image light is photoelectrically converted into an electric signal, thereby obtaining image information in one dimension (in the main-scanning direction).

In this image scanning device 100, the first moving body 103 and the second moving body 104 receive driving force of a motor 105 via a driving force transmission unit 106. The first moving body 103 travels at twice the speed of the second moving body 104. That is, while the imaging position of the imaging lens 102 (36) with respect to the contact glass 108 is maintained on the one-dimensional image sensor 101 (35) surface, the light travels on the contact glass 108 surface in the direction perpendicular to the linear imaging area 111 and parallel to the contact glass 108. In this way, images of the document 107 placed on the contact glass 108 are sequentially scanned by the one-dimensional image sensor 101 (35) and thus obtained in two dimensions. Since the ratio between the traveling speeds of the first moving body 103 and the second moving body 104 is 2:1, the travel distance of the second moving body 104 is a half of the travel distance of the first moving body 103. The distance from the imaging area 111 to the imaging lens 102 (36) or the one-dimensional image sensor 101 (35) is constant regardless of the positions of the first moving body 103 and the second moving body 104. In this way, while the image of the document 107 (45) on the contact glass 108 is focused onto the one-dimensional image sensor 101 (35) so as to sequentially obtain one-dimensional image information, the first moving body 103 and the second moving body 104 travel a the sub-scanning direction. Thus, when travel of the first moving body 103 and the second moving body 104 completes, two-dimensional image information is obtained.

While the turn-around mirrors 112a and 112b and the deflecting mirror 113 are shown as reflector plates, any of these mirrors may be replaced with other reflectors such as a total reflecting prism. Especially, replacing the turn-around mirrors 112a and 112b of the second moving body with prisms can easily improve reflection accuracy and facilitate assembly of the second moving body.

As described above, the image scanning device of the ninth embodiment has the following advantages.

Since the illuminating device does not need to be mounted in the first moving body and can be disposed near the imaging lens and the image sensor constituting the imaging system, a space for the illuminating device is not required in the height direction of the image scanning device. As a result, thickness of the image scanning device can be reduced.

Since the imaging device (light source) does not need to be mounted in the first moving body and can be disposed in a fixed portion in the image scanning device, there is no need to use a flexible line. This improves reliability of the image scanning device and reduces production cost of the image scanning device.

Since there is no need to provide a reflective member near the document surface, the illumination light reflected by the document surface is prevented from being reflected again, resulting in removing almost all flare.

Since the illumination light is obliquely incident on the document surface, the specular reflection components from the document surface are prevented from being incident on the imaging lens. Thus, only diffuse reflection components of the illumination light for illuminating the document surface are incident on the image sensor. As a result, image density of the document can be accurately read without being affected by variation of gloss of the document surface.

Since the light can be emitted from the direction close to the direction perpendicular to the document surface, in the case of scanning a book, almost all the shadow between opened pages of the book can be removed.

Mounting this image scanning device into an image forming apparatus such as a copy machine is as easy as mounting a conventional image scanning device into a copy machine.

In the image scanning device shown in FIG. 29, the optical axis of the illumination light and the imaging optical axis are aligned with each other in the sub-scanning direction 72, and both the illumination light and the image light are reflected by the deflecting mirror and the two turn-around mirrors.

Figure 30:
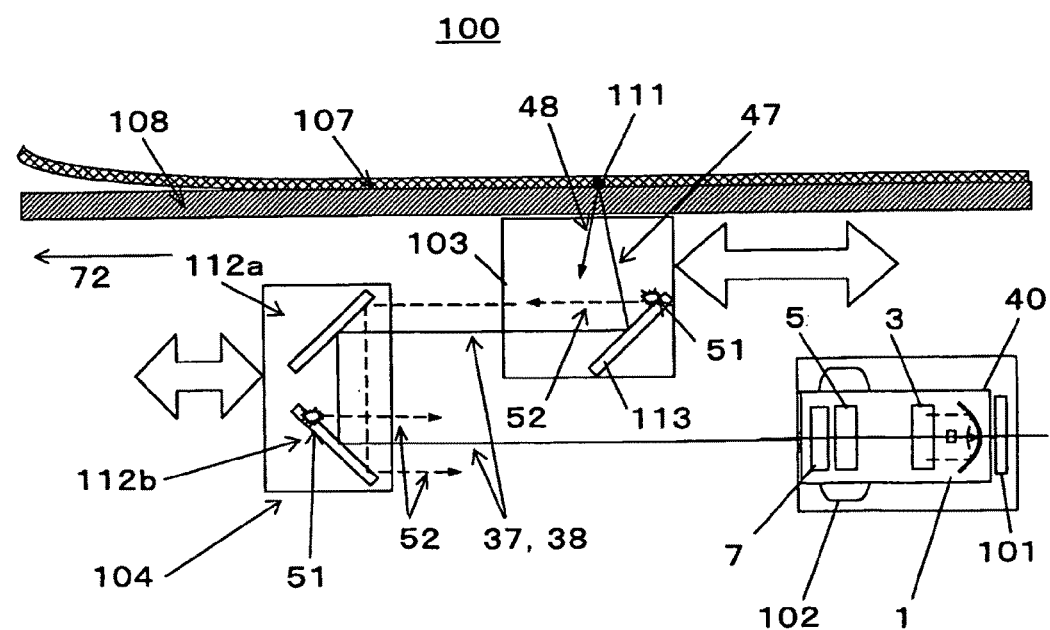
FIG. 30 is a diagram for describing generation of flare in an image scanning device.

FIG. 30 is a diagram for describing generation of flare in an image scanning device. As shown in FIG. 30, mirror surfaces of the deflecting mirror 113 and the lower turn-around mirror 112b face upward. Therefore, dust 51 easily accumulates on the surfaces of the deflection mirror 113 and the lower turn-around mirror 112b. The dust 51 on these mirror surfaces scatters the illumination light, resulting in producing flare light 52. The flare light is directly incident on the imaging lens 102, is combined with the image light from the document surface, and is detected on the one-dimensional image sensor 101 (e.g. CCD). As a result, fogging might be produced in the resultant image.

If the above-described illumination system using an LED as the light source is mounted in the image scanning device, among the light beams emitted from the LED of the light source, a light beam emitted from the focal position of a collimation lens attached to the LED generally reaches an imaging area of a target surface. However, the LED has a certain volume, and the number of light beams emitted from the area out of the focal position of the collimation lens is greater than the number of the light beams emitted from the focal position of the collimation lens. That is, the illuminating device emits many divergent light beams other than collimated light beams, so that many light beams of the illumination light are scattered around the imaging area to be illuminated. Accordingly, utilization ratio of the illumination light is lowered. If the light source having a certain volume is disposed near the focal point of the collimation lens, the image of the light source is projected onto the imaging area on the target surface at a magnification ratio of f0/f3, wherein f/0 represents a focal length of the combining lens and f3 represents a focal length f3 of the collimation lens attached to the LED. This is not a problem with regard to the surface in the main-scanning direction because the surface is illuminated at 100-fold magnification or greater, which is sufficiently greater than f0/f3 rate of in the main-scanning direction. However, on the surface in the sub-scanning direction, the magnification rate is significantly greater than the f0/f3. That is, the combining lens cannot sufficiently focus the light beams onto the target surface in the sub-scanning direction, so that the light beams irradiated onto the imaging area 111 are reduced.

<Tenth Embodiment>

In a tenth embodiment, an image scanning device that has high light utilization ratio and is capable of easily reducing illuminance variation on a target surface is described with reference to FIG. 31.

Figure 31:
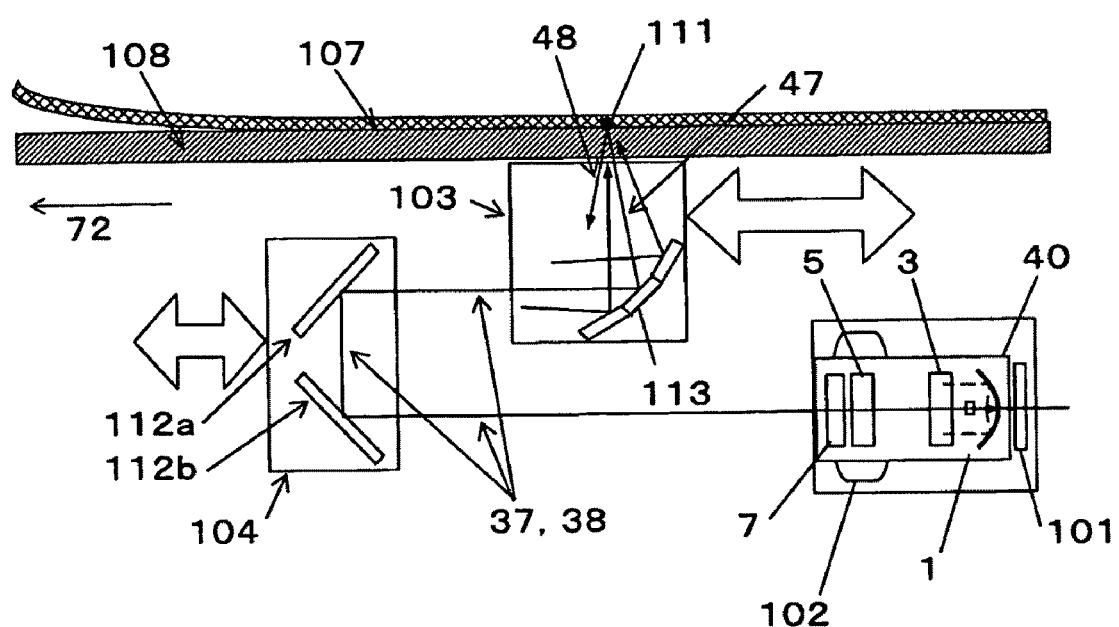
FIG. 31 is a diagram showing an example of an image scanning device using a deflecting mirror having a bent portion around a reading light reflecting area.

FIG. 31 is a diagram showing an example of an image scanning device using a deflecting mirror having a bent portion around a reading light reflecting area.

As shown in FIG. 31, a portion of a deflecting mirror 113 around the area that reflects a reading light (image light of a document surface) is bent. (In a conventional image scanning device, to secure mechanical strength of a deflecting mirror, a deflecting mirror having a size several times the size of the reading light reflecting area is used). As shown in FIG. 31, the deflecting mirror 113 bends optical axes of light beams emitted from an LED having a certain volume and diverged by the illuminating device 40, and thus can collect the light beams onto a reading area 111 of a document surface 107. More specifically, the deflecting mirror 113 shown in FIG. 31 can collect the collimated light beams and divergent light beams emitted from the illuminating device 40 onto the reading area 111 of the document surface 107, and thus can increase utilization ratio of illumination light up to about 3 times. In a sub-scanning direction 72, based on the width (about 3 mm in an actual color scanning device) of the reading area 111 on the document surface 107, if the number of bent portions of the deflecting mirror 113 is increased (e.g. 2 through 6 portions), the utilization ratio of the illumination light emitted from the illuminating device can be increased substantially in proportion with the number of the bent portions of the deflecting mirror 113.

<Eleventh Embodiment>

In an eleventh embodiment, an image scanning device having higher light utilization ratio is described with reference to FIGS. 32A and 32B.

Figure 32A:
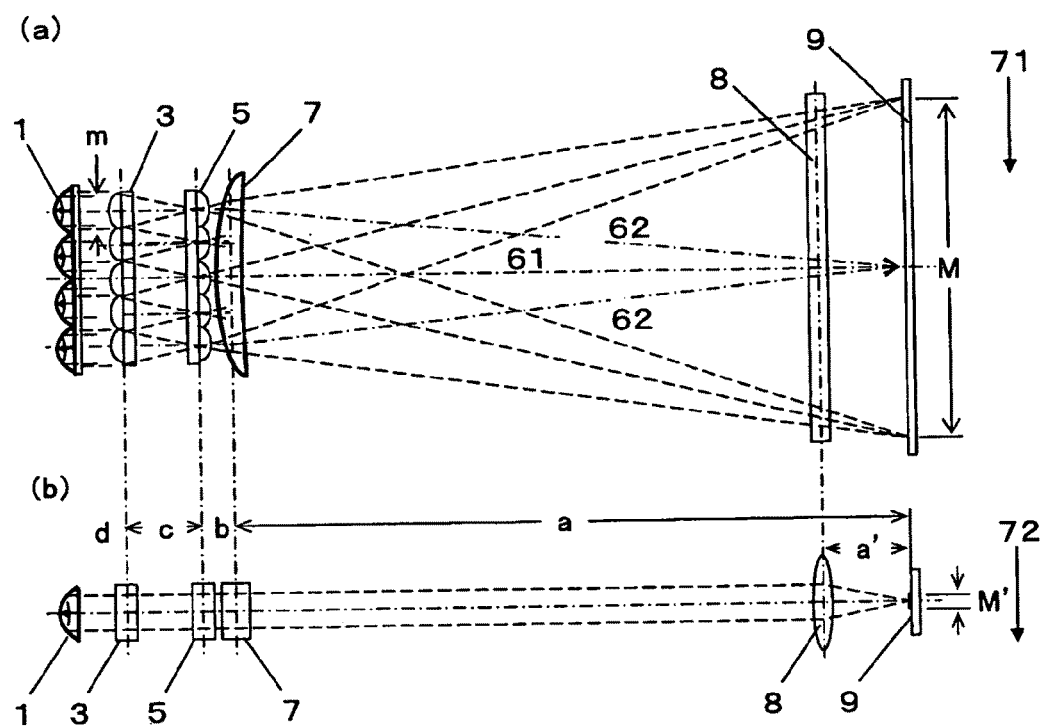
FIG. 32A is a diagram for describing an example of an illumination system having higher light utilization ratio according to an eleventh embodiment of the present invention, wherein (a) is a top view of a first or second illumination system of the eleventh embodiment, and (b) is a front view of the first or second illumination system of the eleventh embodiment.
Figure 32B:
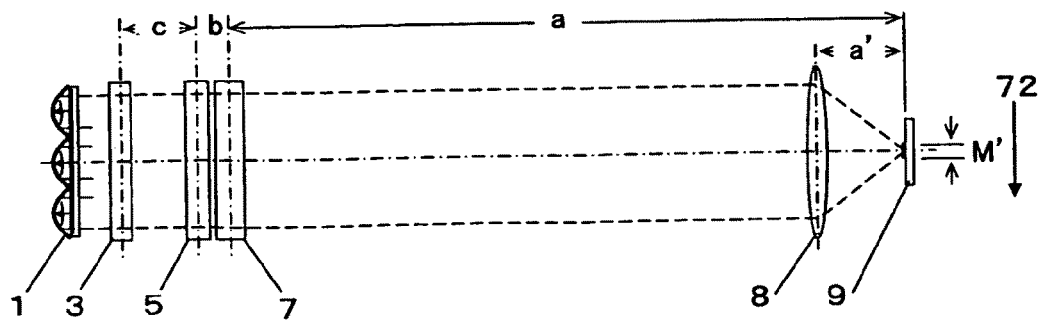
FIG. 32B is a front view of the second illumination system of the eleventh embodiment.

FIGS. 32A and 32B are diagrams each showing an example of an illumination system having higher light utilization ratio according to the eleventh embodiment of the present invention. FIG. 32A (a) is a top view of a first or second illumination system of the eleventh embodiment, and FIG. 32A (b) is a front view of the first or second illumination system of the eleventh embodiment. FIG. 32B is a front view of the second illumination system of the eleventh embodiment.

Each of the first and second illumination systems shown in FIGS. 32A and 32B includes plural light sources 1 each including an LED and a reflector for converting a divergent light into a collimated light, a condenser lens 3 for dividing a light beam emitted from the light sources, an illumination lens 5 for illuminating a target surface 9 with the divided light beams, a combining lens 7 for combining the divided light beams (in a main-scanning direction 71 of the image scanning device) onto the target surface within a plane shown in FIG. 32A (a), and a focusing lens 8 for focusing the divided light beams onto the target surface 9 within a plane shown in FIG. 32A (b) or 32B (in a sub-scanning direction 72 of the image scanning device).

Compared to the first or second illumination system shown in FIGS. 32A and 32B to the illumination system shown in FIG. 7, the first or second illumination system shown in FIGS. 32A and 32B uses the same condenser lens 3 and illumination lens 5 as the illumination system of FIG. 7 but uses a cylinder lens as the combining lens 7 in place of a normal lens shown in FIG. 7. In the first and second illumination systems shown in FIGS. 32A and 32B, a cylinder lens in the direction orthogonal to the cylinder lens as the combining lens 7 is provided as the focusing lens 8 in the vicinity of a target surface. In the first and second illumination systems shown in FIGS. 32A and 32B, a focal length of the cylinder lens constituting the combining lens 7 is a, which is equal to the focal length a of the combining lens of FIG. 7; and a focal length of the cylinder lens constituting the focusing lens 8 is a'. The length a is the distance from the combining lens 7 to the target surface 9 (imaging area), and the length a' is a distance from the focusing lens 8 to the target surface 9 (imaging area). The combining lens 7 is, for example, a cylinder lens having a shape as shown in FIG. 8B. The focusing lens 8 is, for example, a cylinder lens having a shape as shown in FIG. 8C. (In FIGS. 32A and 32B, the reflector for converting the divergent light emitted from the LED into the collimated light has a paraboloid having a focal point at the position of the LED, and the focal length of the paraboloid is a distance from the LED to the end of the reflector.

In the first or second illumination system shown in FIGS. 32A and 32B, in the plane shown in FIG. 32A (a), a light beam emitted from the LED is converted into a collimated light by a parabolic mirror, is divided into plural light beams by a cylinder lens array 3 as the focusing lens, and then is projected onto the target surface 9 by a cylinder lens array 5 as the illumination lens. While the divided light beams pass through the combining lens 7 and the focusing lens 8, the cylinder lens as the combining lens 7 combines the divided beams on the target surface 9. The focusing lens 8 can be considered as a plane parallel plate within the plane shown in FIG. 32A (a).

On the other hand, within the plane shown in FIG. 32A (b) or 32B, a light beam emitted from the LED is converted into a collimated light, extends parallel to pass through the condenser lens 3, the illumination lens and the combining lens 7, and is focused onto the target surface by the cylinder lens as the focusing lens 8.

In the first or second illumination system shown in FIGS. 32A and 32B, the image of the light source LED is projected onto the target surface at a magnification of $M/m=(a+b)/c$ in the plane shown in FIG. 32A (a), wherein b represents the distance between the illumination lens 5 and the combining lens 7; and c represents the distance between the condenser lens 3 and the illumination lens 5. In the plane shown in FIG. 32A (b) or FIG. 32B, the image of the light source LED is projected onto the target surface 9 at a ratio of the focal length a' of the cylinder lens as the focusing lens 8 with respect to a focal length of the paraboloid of the light source 1. The focal length a' of the cylinder lens as the focusing lens 8 can be about 1/10 of the focal length of the combining lens of the illumination system of FIG. 7, and therefore the magnification ratio of the image of the illumination in the illumination system shown in FIGS. 32A and 32B can be reduced to a tithe of the magnification ratio of the image of the LED of the illumination system shown in FIG. 7. That is, the illumination system shown in FIGS. 32A and 32B can focus light ten times brighter than the illumination system of FIG. 7 onto the target surface 9 within the plane shown in FIG. 32A (b) or 32B.

The plural light source 1 may be arranged in a single array as shown in FIG. 32A (b), or may be arranged in multiple arrays as shown in FIG. 32B. Although the first illumination system shown in FIG. 32A (a) and (b) includes four LEDs and the second illumination system shown in FIG. 32B includes twelve LEDs, the number of LEDs of the light sources 1 is not so limited. The LEDs may include only white LEDs or may include red (R) LEDs, green (G) LEDs, and blue (B) LEDs. Based on color balance, the number of red (R) LEDs, green (G) LEDs, green (G) LEDs and blue (B) LEDs in the light source 1 may be equal to each other. The number of LEDs of low luminance may be greater than the number of LEDs of high luminance.

In FIG. 32A (a), the ratio of the number of cylinder lenses constituting the cylinder lens array as the condenser lens 3 (and/or the illumination lens 5) with respect to the number of light sources 1 may be increased (In FIG. 32A (a), the ratio is 5/4). If so, luminance distribution on the target surface is made uniform more easily. For instance, the ratio of the number of cylinder lenses constituting the condenser lens 3 (and/or the illumination lens 5) with respect to the number of light sources 1 may be 2 or greater. Although described below in detail, this configuration is advantageous in making luminance distribution of the light on the target surface in the case where the number of LEDs is small.

In the illumination system shown in FIGS. 32A and 32B, the light source 1, each of the condenser lens 3 and the illumination lens 5 is disposed symmetric with respect to the optical axis of the combining lens 7 (the primary optical axis 61 of the illumination optical axis) in the plane shown in FIG. 32A (a) (in the main-scanning direction 71 of the image scanning device).

Figure 33:
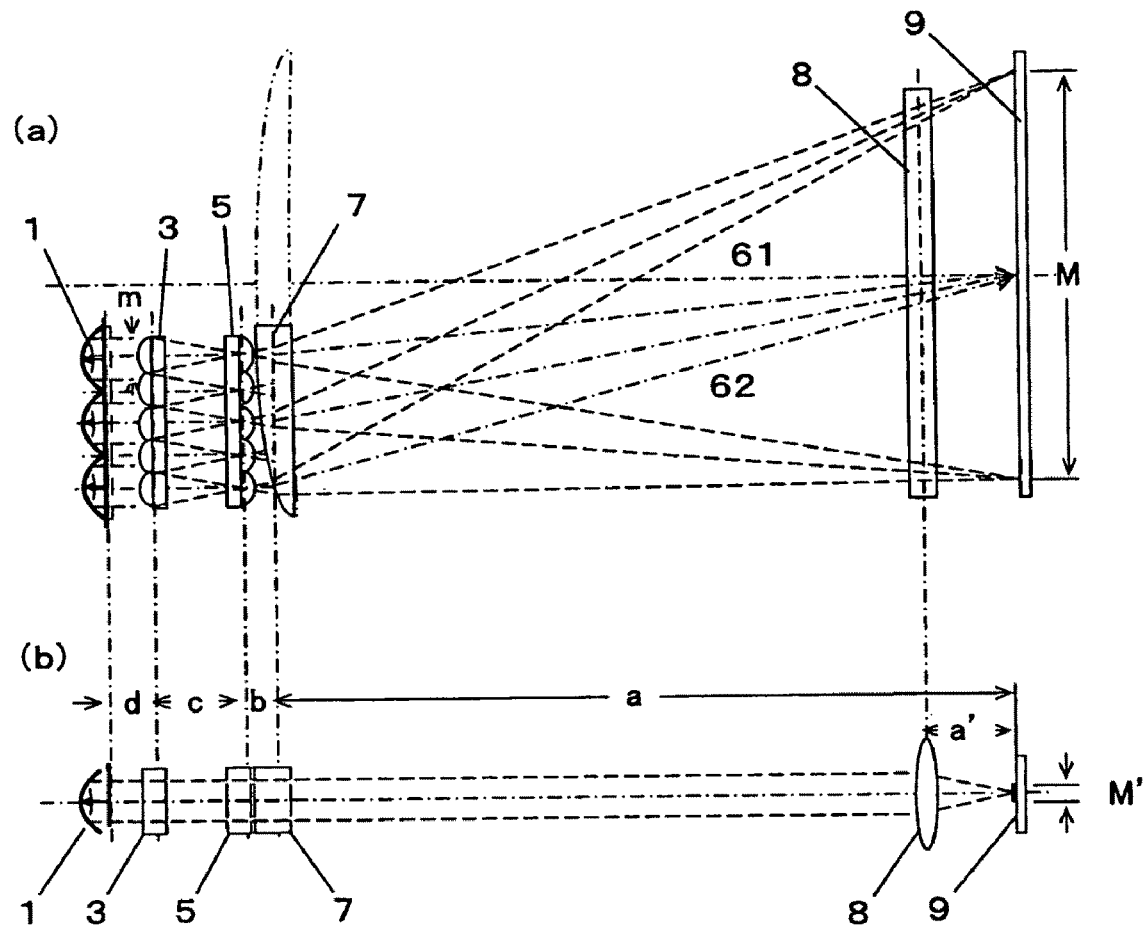
FIG. 33 is a diagram for describing an example of an illumination system using a peripheral portion of a combining lens, wherein (a) is a top view of the illumination system, and (b) is a front view of the illumination system.

FIG. 33 is a diagram for describing an example of an illumination system using a peripheral portion of a combining lens. FIG. 33 (a) is a top view of the illumination system, and FIG. 33 (b) is a front view of the illumination system. In the illumination system shown in FIG. 33, a light source 1, a condenser lens 3 and an illumination lens 5 are disposed in positions corresponding to not the center portion but the peripheral portion of a combining lens 7 in the plane shown in FIG. 33 (a).

Figure 34:
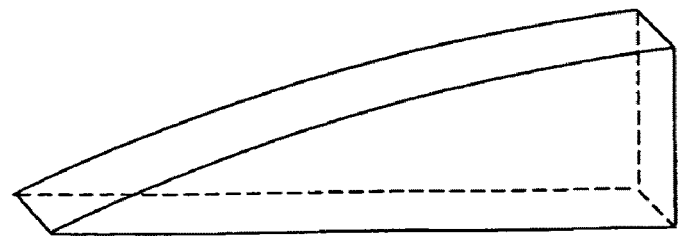
FIG. 34 is a diagram illustrating a shape of a cylinder lens applicable to an illumination system of an embodiment of the present invention.

FIG. 34 is a diagram illustrating a shape of a cylinder lens applicable to an illumination system of an embodiment of the present invention. A cylinder lens as a combining lens 7 is applicable to an illumination system, such as one shown in FIG. 33, having a focusing lens 8 and utilizing a peripheral portion of a combining lens 7.

In the case of the illumination system shown in FIG. 33, an imaging system of an image scanning device can be disposed in a position corresponding to a center portion of a combining lens. That is, the illumination system can be disposed around (or side-by-side) the imaging system of the image scanning device. Using the illumination system as shown in FIG. 33 makes it possible to integrate the illumination system and the imaging system with each other.

Figure 35:
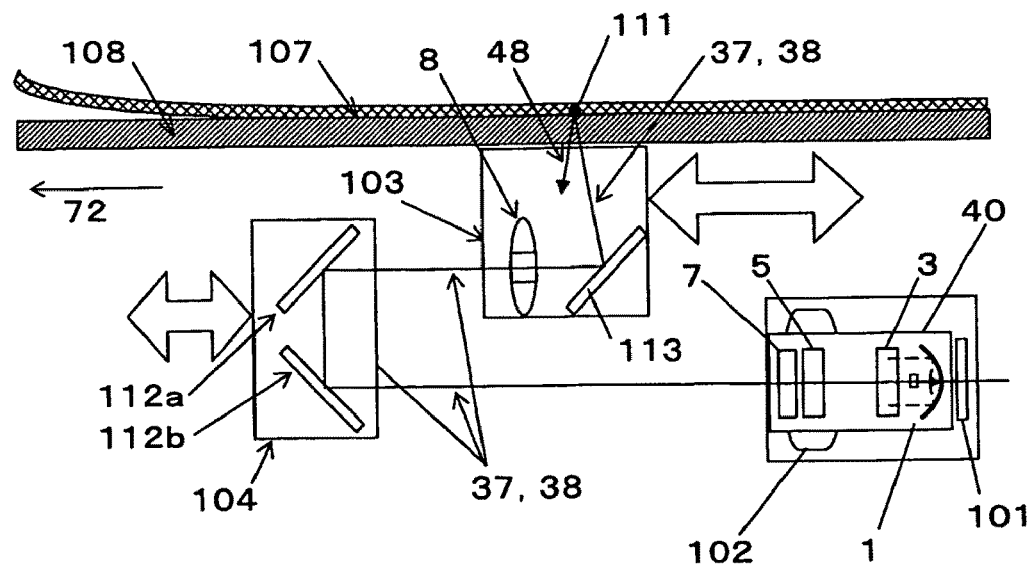
FIG. 35 is a diagram for describing an example of an image scanning device using an illumination system, including a focusing lens, and an imaging system that are integrated with each other.

FIG. 35 is a diagram for describing an example of an image scanning device using an illumination system, including a focusing lens, and an imaging system that are integrated with each other. The image scanning device shown in FIG. 35 includes an illuminating device 40 as shown in FIG. 33. The illumination system of the image scanning device of FIG. 35 includes the illuminating device 40 including a light source 1, a condenser lens 3, an illumination lens 5 and a combining lens 7; and a focusing lens 8. The focusing lens 8 may be disposed at the illuminating device side of a deflecting mirror 113 as shown in FIG. 35, or may be disposed at a document surface 107 side of the deflecting mirror 113. In the image scanning device shown in FIG. 35, an imaging optical axis 37 of the imaging system and an illumination optical axis 38 of the illumination system are aligned with each other in a main-scanning direction 71. Therefore, if the focusing lens 8 is a simple cylinder lens, the image on the document 107 surface is enlarged or reduced by the focusing lens 8, so that the enlarged or reduced image is read by a one-dimensional image sensor 101. That is, a portion of the focusing lens 8 through which the image light that has been incident on an imaging lens passes should not have a function of the focusing lens 8. To remove the focusing lens function from the portion of the focusing lens 8 through which the imaging light that has been incident on an imaging lens passes, as shown in FIG. 35, the portion of the focusing lens 8 is formed to be a plane parallel plate (i.e. a flat portion is formed in the focusing lens 8). Alternatively, the portion of the focusing lens 8 may be cut off (so as to obtain two focusing lens not having a center portion of the lens).

The focusing lens 8 may be replaced with a light beam focusing element having a focal point in an imaging area 111 of the document 107 surface.

Figure 36:
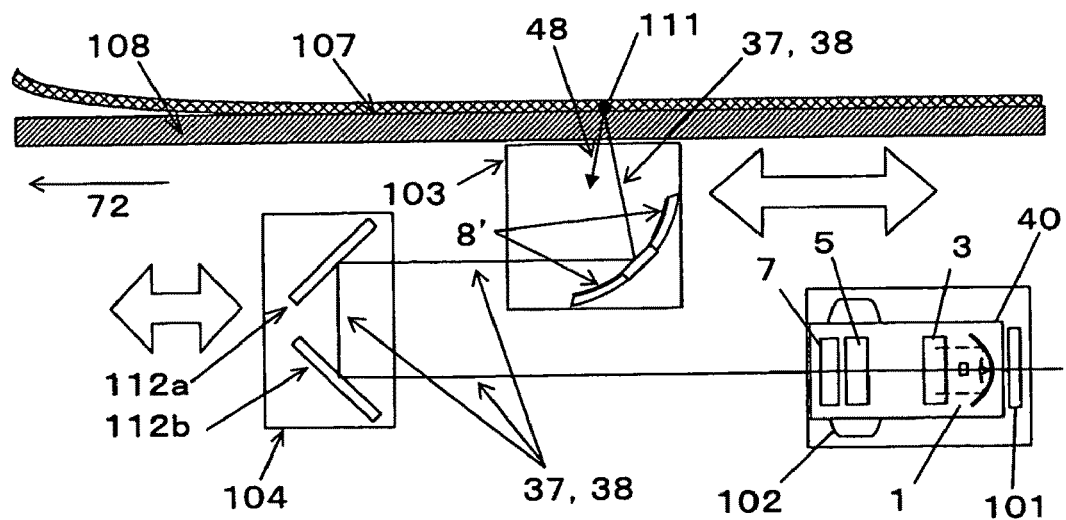
FIG. 36 is a diagram for describing an example of an image scanning device that uses an imaging system and an illumination system having a parabolic mirror as a light beam focusing element and utilizing a peripheral portion of a combining lens.
Figure 37:
FIG. 37 is a diagram illustrating a shape of a parabolic mirror that can be used as a light beam focusing element.

FIG. 36 is a diagram for describing an example of an image scanning device that uses an imaging system and an illumination system having a parabolic mirror as a light beam focusing element and utilizing a peripheral portion of a combining lens. FIG. 37 is a diagram illustrating a shape of a parabolic mirror that can be used as a light beam focusing element.

As shown in FIG. 36, in the image scanning device shown in FIG. 35, a parabolic mirror 8' having a focal point in an imaging area 111 of a document 107 surface or a target surface 9 may be used in place of the focusing lens 8. The parabolic mirror 8' is one that shown in FIG. 37. If the parabolic mirror 8' having the focal point in the imaging area 111 of the document 107 surface or the target surface 9 is used, the parabolic mirror 7 has a function as the deflecting mirror 113 in addition to a function as a light beam focusing element. Accordingly, the deflecting mirror 113 can be omitted, so that the number of components of the image scanning device is reduced. In the image scanning device shown in FIG. 36, an imaging optical axis 37 of the imaging system and an illumination optical axis 38 of the illumination system are aligned with each other in a main-scanning direction 71. Therefore, if the parabolic mirror 8' is a simple parabolic mirror, the image on the document 107 surface is enlarged or reduced by the parabolic mirror 8', so that the enlarged or reduced image is read by a one-dimensional image sensor 101. That is, a portion of the parabolic mirror 8' which reflects the image light that has been incident on an imaging lens should not have a function of the parabolic mirror 8'. To remove the parabolic mirror function from the portion of the parabolic mirror 8' which reflects the imaging light that has been incident on an imaging lens, as shown in FIG. 36, the portion of the parabolic mirror 8' is formed to be a planar mirror (i.e. a deflecting mirror portion is formed in the parabolic mirror 8').

Figure 38:
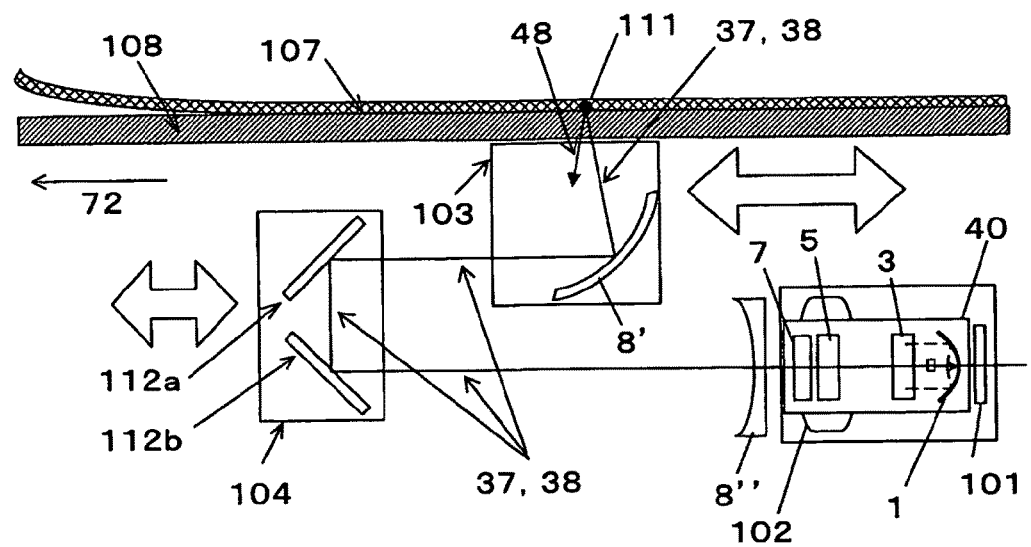
FIG. 38 is a diagram for describing an example of an image scanning device that uses an imaging system and an illumination system having a parabolic mirror as a light beam focusing element and a correcting lens and utilizing a peripheral portion of a combining lens.

FIG. 38 is a diagram for describing an example of an image scanning device that uses an imaging system and an illumination system having a parabolic mirror as a light beam focusing element and a correcting lens and utilizing a peripheral portion of a combining lens. Although the parabolic mirror 8' as a light beam focusing element is used in the image scanning device shown in FIG. 38, a planar mirror is not formed in the parabolic mirror 8'. The image scanning device shown in FIG. 38 includes the correction lens 8''' for reducing an image enlarged by or enlarging an image reduced by the parabolic mirror 8'. That is, since an image light from an imaging area 111 is collimated by the parabolic mirror 8' (focal length=a'), a concave cylinder lens having a focal length of opposite sign ($=1/(1/a+1/a')$) is disposed as the correcting lens 8''' immediately before an imaging lens of the imaging system. Thus, the image in the imaging area Ill can be accurately focused onto a one-dimensional imaging device (CCD). The correcting lens 8''' is disposed only in the imaging system and not in the illumination system.

In the image scanning device as shown in FIG. 35, the focusing lens 8 and the correcting lens 8''' may be used in place of the convex cylinder lens as the focusing lens 8 having a flat portion or a cut-off portion corresponding to the imaging system. That is, since an image light from an imaging area 111 is collimated by the focusing lens 8 (focal length=a'), a concave cylinder lens having a focal length of opposite sign (=1/(1/a+1/a')) is disposed as the correcting lens 8" immediately before an imaging lens of the imaging system. Thus, the image in the imaging area 111 can be accurately focused onto a one-dimensional imaging device (CCD). The correcting lens 8" is disposed only in the imaging system and not in the illumination system.

<Twelfth Embodiment>

In a twelfth embodiment, an example of an image scanning device in which an image in an imaging area 111 is not enlarged or reduced by a light beam focusing element is described with reference to FIGS. 39A, 39B, and 40A-40D. To prevent the light beam focusing element from enlarging or reducing the image in the imaging area 111, an imaging optical axis and an illumination optical axis are separated from each other in a direction orthogonal to a main-scanning direction 71 of the image scanning device.

Figure 39A:
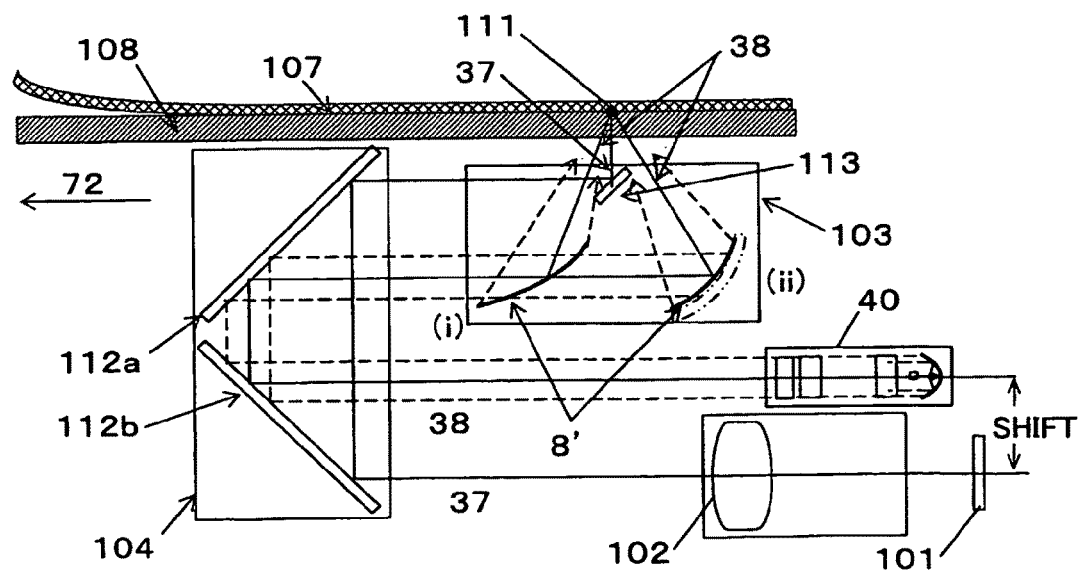
FIG. 39A is a diagram for describing an example of an image scanning device in which an illuminating device is disposed at the upper side of an imaging lens.
Figure 39B:
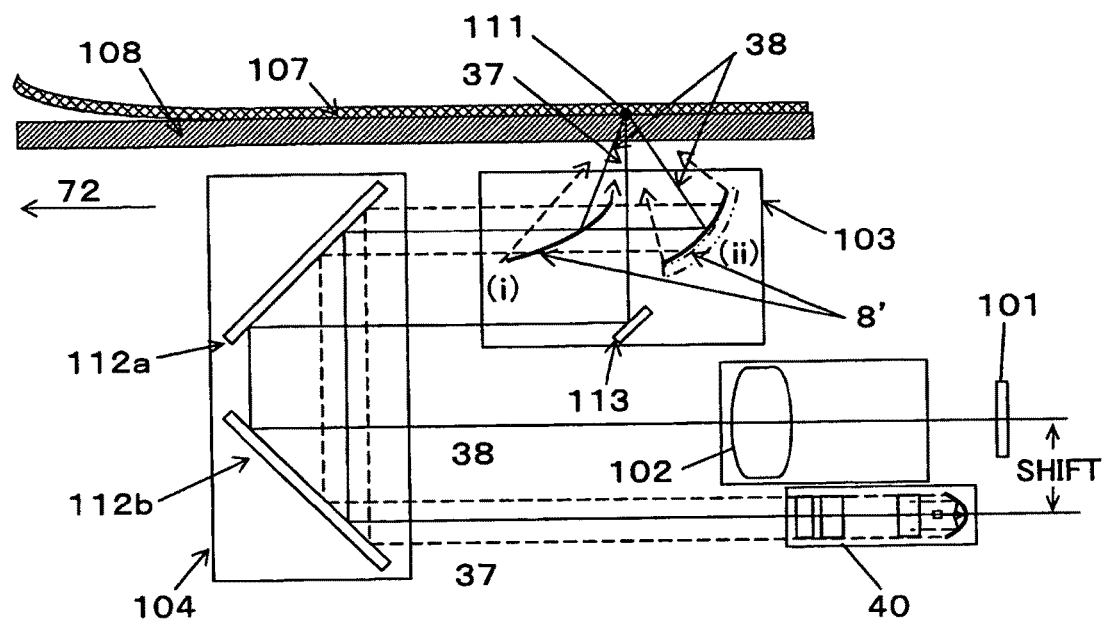
FIG. 39B is a diagram for describing an example of an image scanning device in which an illuminating device is disposed at the lower side of an imaging lens.

FIG. 39A is a diagram for describing an example of an image scanning device in which an illuminating device is disposed at the upper side of an imaging lens. FIG. 39B is a diagram for describing an example of an image scanning device in which an illuminating device is disposed at the lower side of an imaging lens.

As shown in FIGS. 39A and 39B, an imaging optical axis 37 and an illumination optical axis 38 are separated parallel to each other in the direction orthogonal to a main-scanning direction 71 of the image scanning device and are parallelly bent by two turn-around mirrors 112a and 112b. Each of the turn-around mirrors 112a and 112b has an area capable of reflecting both the parallelly separated illumination light and the reading light. The imaging optical axis 37 is bent by a deflecting mirror 113 so as to cross an imaging area 111 of a document 107 surface. With regard to the illumination optical axis, a parabolic mirror 8' as a light beam focusing element is disposed in the vicinity of the deflecting mirror. The focal point of the parabolic mirror 8' is positioned in the imaging area 111. In other words, the imaging optical axis 37 and the illumination optical axis 38 meet in the imaging area 111.

As shown in FIG. 39A, if the illuminating device 40 is disposed at the upper side of an imaging lens, the illumination optical axis 38 is at the upper side of the imaging optical axis 37 until the illumination optical axis 38 and the imaging optical axis 37 are bent by the turn-around mirror 112b. After the illumination optical axis 38 and the imaging optical axis 37 are bent by the turn-around mirror 112a, the illumination optical axis 38 is at the lower side of the imaging optical axis 37. Accordingly, the parabolic mirror 8' is disposed at the lower side of the deflecting mirror 113, and the illumination light is reflected toward the imaging area 111 by the parabolic mirror 8' disposed at the lower side of the deflecting mirror 113. The parabolic mirror 8' may be disposed at the front side (i) or the rear side (ii) of the deflecting mirror 113.

As shown in FIG. 39B, if the illuminating device 40 is disposed at the lower side of the imaging lens, the illumination optical axis 38 is at the lower side of the imaging optical axis 37 until the illumination optical axis 38 and the imaging optical axis 37 are bent by the turn-around mirror 112b. After the illumination optical axis 38 and the imaging optical axis 37 are bent by the turn-around mirror 112a, the illumination optical axis 38 is at the upper side of the imaging optical axis 37. Accordingly, the parabolic mirror 8' is disposed at the upper side of the deflecting mirror 113, and the illumination light is reflected toward the imaging area 111 by the parabolic mirror 8' disposed at the upper side of the deflecting mirror 113. The parabolic mirror 8' may be disposed at the front side (i) or the rear side (ii) of the deflecting mirror 113.

In FIGS. 39A and 39B, two parabolic mirrors 8' may be provided one at the front side (i) of the deflecting mirror 113 and the other at the rear side (ii) of the deflecting mirror 113 such that the illumination light emitted from the illuminating device 40 can be irradiated onto the parabolic mirrors 8'. In this case, the parabolic mirror 8' at the front side of the deflecting mirror 113 blocks the upper half or the lower half of the illumination optical axis 38. Thus, the light reflected by the front parabolic mirror 8' illuminates the imaging area 111 from the front side of the deflecting mirror 113. The upper or lower half of the illumination optical axis 38 that is not reflected by the front parabolic mirror 8' is reflected by the parabolic mirror 8' at the rear side of the deflecting mirror 113 and illuminates the imaging area 111 from the rear side of the deflecting mirror 113. Since the imaging area 111 is illuminated from the front side and back side of the deflecting mirror 113, in the case of scanning a book, it is possible to reduce the shadow or a black line between opened pages of the book.

In the image scanning devices shown in FIGS. 39A and 39B, two turn-around mirrors 112a and 112b are shared by the imaging system and the illumination system.

FIGS. 40A through 40D are diagrams showing other examples of separating an imaging optical axis and an illumination optical axis from each other. In FIGS. 40A through 40D, at least one of the two turn-around mirrors 112a and 112b shown in FIG. 39A or FIG. 39B is divided into two turn-around mirrors.

Figure 40A:
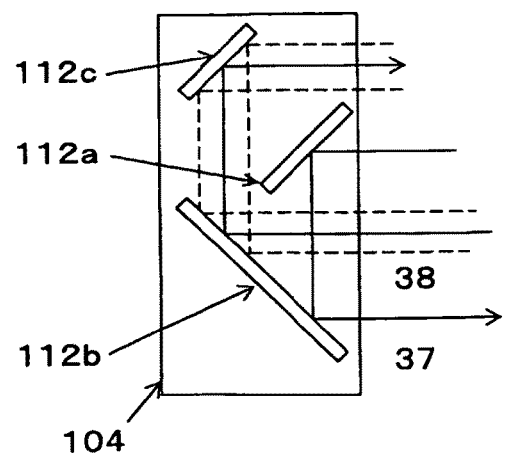
FIG. 40A is a diagram showing an example in which an upper turn-around mirror is divided into two turn-around mirrors, an imaging optical axis is situated at the lower position, and an illumination optical axis is situated at the upper position.

FIG. 40A is a diagram showing an example in which an upper turn-around mirror is divided into two turn-around mirrors, an imaging optical axis is situated at the lower position, and an illumination optical axis is situated at the upper position. That is, in FIG. 40A, the upper turn-around mirror 112a in the image scanning devices shown in FIGS. 39A and 39B is divided into two turn-around mirrors 112a and 112c; the imaging optical axis 37 is at the lower position; and the illumination optical axis 38 is at the upper position.

Figure 40B:
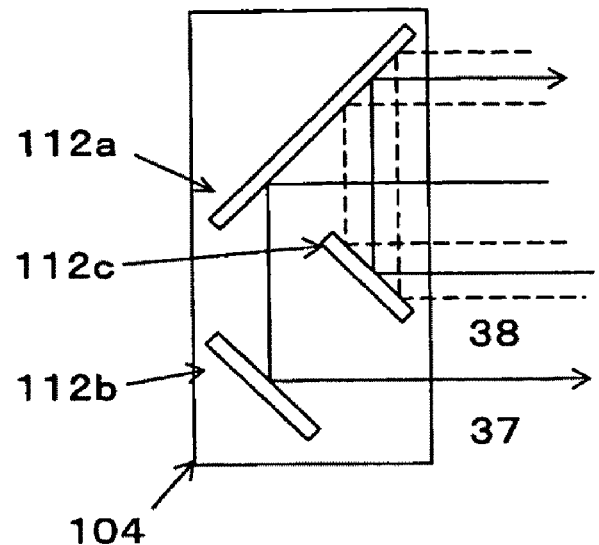
FIG. 40B is a diagram showing an example in which a lower turn-around mirror is divided into two turn-around mirrors, an imaging optical axis is situated at the lower position; and an illumination optical axis is situated at the upper position.

FIG. 40B is a diagram showing an example in which a lower turn-around mirror is divided into two turn-around mirrors, an imaging optical axis is situated at the lower position; and an illumination optical axis is situated at the upper position. That is, in FIG. 40B, the lower turn-around mirror 112b in the image scanning devices shown in FIGS. 39A and 39B is divided into two turn-around mirrors 112b and 112c; the imaging optical axis 37 is at the lower position; and the illumination optical axis 38 is at the upper position.

Figure 40C:
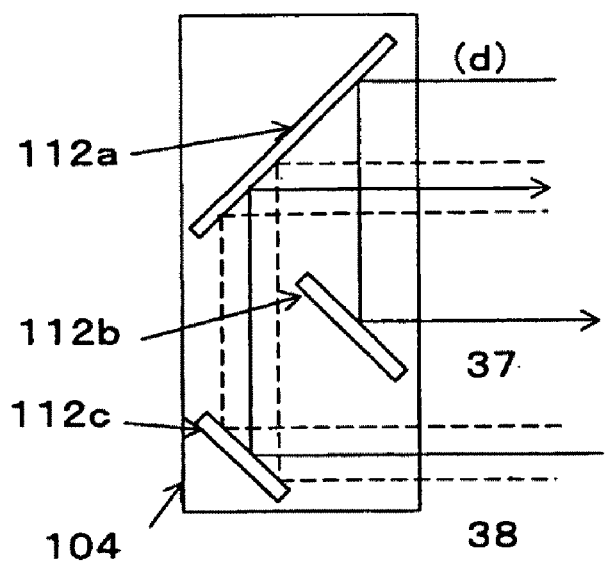
FIG. 40C is a diagram showing an example in which a lower turn-around mirror is divided into two turn-around mirrors, an imaging optical axis is situated at the upper position; and an illumination optical axis is situated at the lower position.

FIG. 40C is a diagram showing an example in which a lower turn-around mirror is divided into two turn-around mirrors, an imaging optical axis is situated at the upper position; and an illumination optical axis is situated at the lower position. That is, in FIG. 40C, the lower turn-around mirror 112b in the image scanning devices shown in FIGS. 39A and 39B is divided into two turn-around mirrors 112b and 112c; the imaging optical axis 37 is at the upper position; and the illumination optical axis 38 is at the lower position.

Figure 40D:
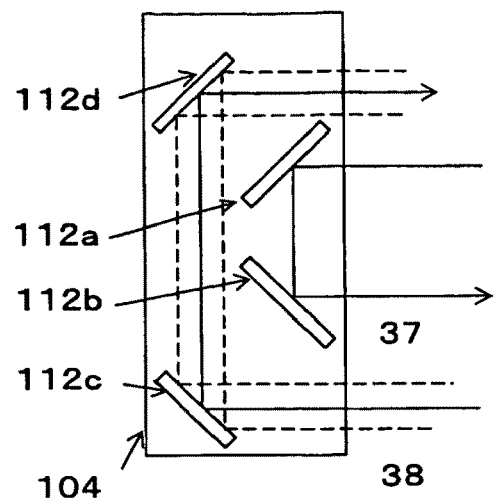
FIG. 40D is a diagram showing an example in which each of upper and lower turn-around mirrors is divided into two turn-around mirrors, an imaging optical axis is situated at the inner position, and an illumination optical axis is situated at the outer position.

FIG. 40D is a diagram showing an example in which each of upper and lower turn-around mirrors is divided into two turn-around mirrors, an imaging optical axis is situated at the inner position, and an illumination optical axis is situated at the outer position. That is, in FIG. 40D, the upper turn-around mirror 112a and lower turn-around mirrors 112b in the image scanning devices shown in FIGS. 39A and 39B are divided into two turn-around mirrors 112a and 112b and two turn-around mirrors 112c and 112d, respectively; the positions of the imaging optical axis 37 and the illumination optical axis 38 are switched.

In this way, dividing at least one of the turn-around mirrors 112a and 112b in the image scanning devices shown in FIGS. 39A and 39B makes it possible to freely select the layout of the imaging optical axis 37 and the illumination optical axis 38 and, accordingly, the layout of the imaging system and the illumination system.

In the direction orthogonal to the main-scanning direction 71 of the image scanning device, if the imaging optical axis 37 and the illumination optical axis 38 are separated from each other such that a lens barrel of the imaging system and the illuminating device 40 are in contact with or are separated from each other, the configuration of the illumination system shown in FIGS. 32A and 32B can be used in place of the configuration of the illumination system shown in FIG. 33.

<Thirteenth Embodiment>

In a thirteenth embodiment, an image scanning device capable of reducing flare due to dust accumulated in the image scanning device is described with reference to FIG. 41.

Figure 41:
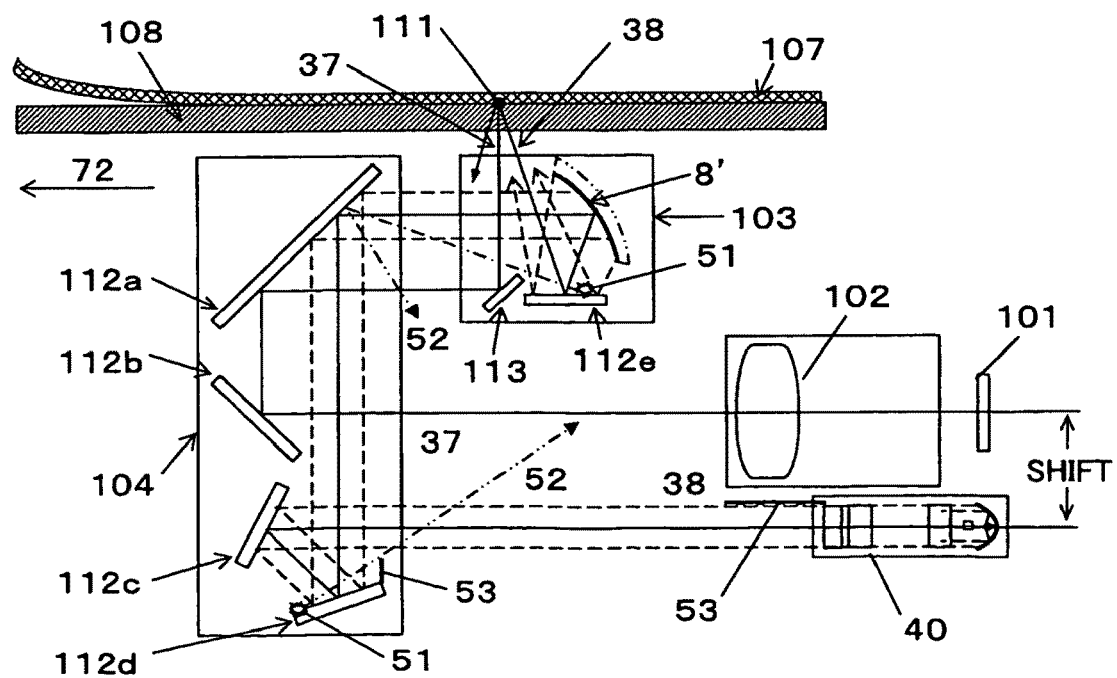
FIG. 41 is a diagram for describing an image scanning device capable of reducing flare due to dust accumulated in the image scanning device.

FIG. 41 is a diagram for describing an image scanning device capable of reducing flare due to dust accumulated in the image scanning device.

As shown in FIG. 41, over years of use of the image scanning device, dust 51 has been accumulated in the image scanning device and has adhered to various parts of the image scanning device. When an illumination light is reflected by the surface of a mirror in the image scanning device, the most part of the illumination light is reflected by the mirror surface while a small part of the illumination light is absorbed by the mirror. However, if the dust 51 is on the surface of the mirror, the illumination light is diffusely reflected due to the dust 51 on the surface of the mirror. More specifically, dust may be deposited on the surface of a mirror such as a deflecting mirror 113, turn-around mirrors 112a, 112b, etc., and a parabolic mirror 8' as a light beam focusing element. If the illumination light is incident on the mirror surface with dust 51, the light s scattered in directions different from the direction of the target surface. A part of the scattered light 52 is incident on an imaging lens 102 (resulting in flare).

As one method for reducing the scattered light 52 due to the dust 51 incident on the imaging lens is to seal the image scanning device thereby preventing entrance of dust. Another method is to seal a member having a mirror surface including a surface with a normal line extending at an angle less than 90 degrees with respect to the vertical direction (for example, to seal portions of a first moving body 103 and a second moving body 104 thorough which light does not pass). However, these methods may be not so practical.

To solve this problem, the mirror is disposed such that the normal line of the mirror surface extends at an angle of 90 degrees or greater with respect to the vertical direction. Alternatively, the mirror with a mirror surface having the normal line extending at an angle of less than 90 degrees with respect to the vertical direction is disposed or a light-shielding member, such as a light-shielding plate 53, is provided such that the light scattered by the surface of the mirror is not incident on the imaging lens 102 (i.e. is not focused onto a one-dimensional image sensor 101). In this way, flare due to dust in the image scanning device can be reduced.

More specifically, as shown in FIG. 41, among turn-around mirrors that reflect illumination light, the turn-around mirror that reflects the illumination light upward is divided into a turn-around mirror 112c with a mirror surface having a normal line extending at angle of 90 degrees or greater with respect to the vertical direction and a turn-around mirror 112d with a mirror surface having a normal line extending at angle less than 90 degrees with respect to the vertical direction. The turn-around mirror 112d is disposed or the light-shielding plate 53 is provided such that light scattered by the turn-around mirror 112d is not incident on the imaging lens 102. The parabolic mirror 8' as a light beam focusing element is disposed such that the normal line of the mirror surface of the parabolic mirror extends at an angle of 90 degrees or greater with respect to the vertical line. The turn-around mirror 112e (planar mirror) for reflecting the light reflected by the parabolic mirror 8' to an imaging area 111 is disposed so as to be covered with the parabolic mirror 8' and the deflecting mirror 113. This configuration prevents or reduces accumulation of dust 51 on the mirror surface of the parabolic mirror 8'. Even if the dust 51 is on the mirror surface of the turn-around mirror 112e and light is scattered due to the dust 51, the scattered light 52 is blocked by the deflecting mirror 113 and is not incident on the imaging lens 102.

<Fourteenth Embodiment>

Figure 42:
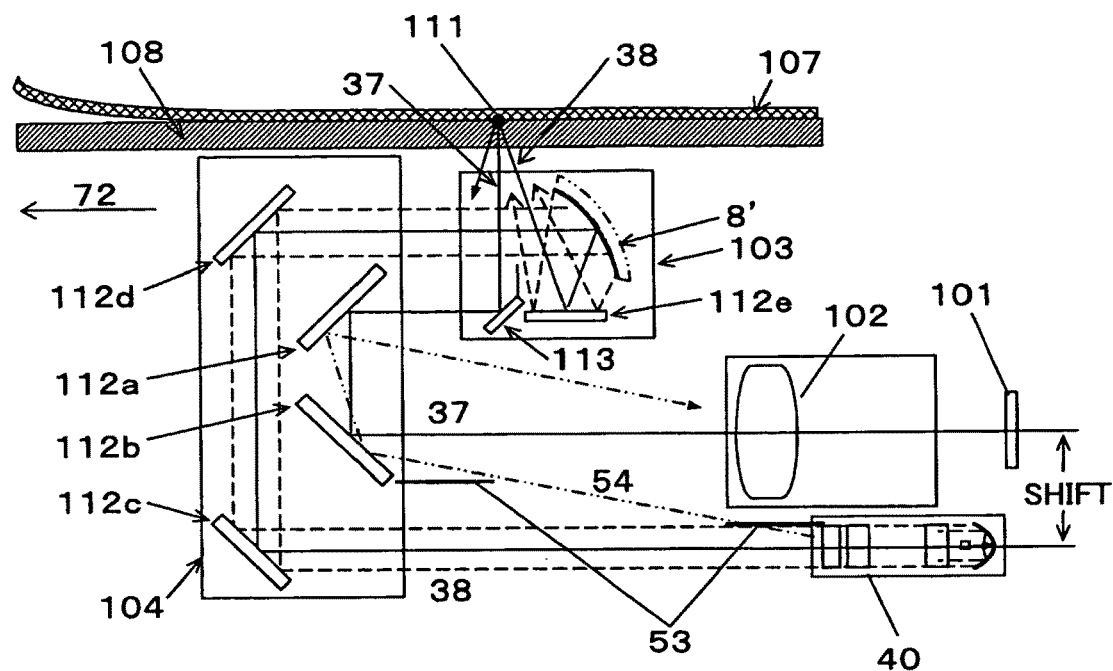
FIG. 42 is a diagram for describing an image scanning device capable of reducing flare due to divergent light from an illumination system.
Figure 43:
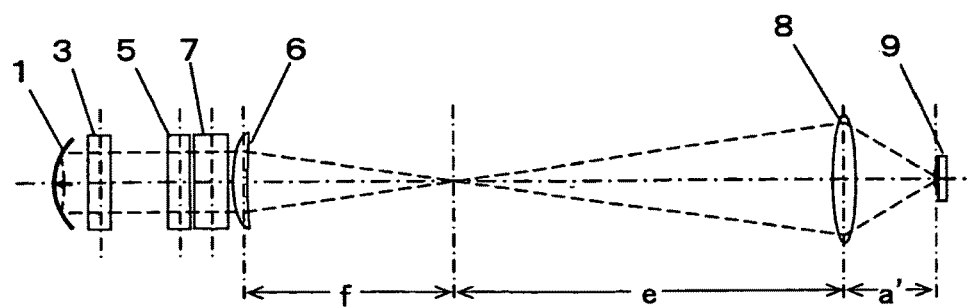
FIG. 43 is a diagram for describing an example of an illumination system including a focusing lens and a relay lens according to an embodiment of the present invention.

In a fourteenth embodiment, an image scanning device capable of reducing flare due to a divergent light emitted from an illuminating system with reference to FIGS. 42 and 43.

FIG. 42 is a diagram for describing an image scanning device capable of reducing flare due to divergent light from an illumination system.

The light source of an illuminating device of the image scanning device may have an LED and a lens at the end of the LED for converting a light emitted from the LED into a collimated light. Alternatively, the light source may have an LED and a parabolic mirror having a focal point at the position of the LED. The light emitted from the LED is ideally emitted as collimated light beams from the light source. However, the LED is not a point light source but is the light source having a certain volume, and therefore divergent light beams are also emitted from the light source. Accordingly, divergent light beams from the light source are also emitted as divergent light beams from the illuminating device 40. Then, in the plane shown in FIG. 42, a light emitted as divergent light beams from the illuminating device 40 is incident on one of the two turn-around mirrors 112b and 112c of an imaging system in a second moving body 104. When the light reflected by one of the two turn-around mirrors 112b and 112c is reflected again by the other turn-around mirror, the reflected light sometimes returns toward the illuminating device 40. If a part of the light retuning toward the illuminating device is incident on the imaging lens 102 near the illuminating device 40, flare is caused, which might result in fogging of a scanned image.

To reduce flare due to divergent light beams emitted from the illuminating device 40, the illuminating device 40 and/or at least one of the turn-around mirrors 112b and 112c may be provided with a light-shielding plate 51. In addition, or alternatively, the shift (distance) between the optical axis of an imaging lens 102 and the optical axis of the illuminating device 40 may be increased.

To reduce flare due to divergent light beams emitted from the illuminating device 40, it is preferable to reduce the divergence angle of the divergent light beams emitted from the illuminating device 40.

FIG. 43 is a diagram for describing an example of an illumination system including a focusing lens and a relay lens according to an embodiment of the present invention. In the illumination system shown in FIG. 43, a relay lens 6 is added to the illumination system shown in FIG. 32A or FIG. 32B. The relay lens 6 is a cylinder lens having a function as a lens within the plane shown in FIG. 43 (and having a function as a plane parallel plate within a plane perpendicular to the plane shown in FIG. 43). A focal length of the relay lens 6 is f shown in FIG. 43, and a focal length of a focusing lens 8 is $1/(1/e+1/a')$, wherein e represents the distance between the relay lens 6 and the focusing lens 8. The focal length f of the relay lens 6 is preferably a half of the distance between the combining lens 7 and the focusing lens 8. The relay lens 6 is disposed any place at the rear side of a light source 1 in the illumination system in the illuminating device including the light source 1, a condenser lens 3, an illumination lens 5 and the combining lens 7. The provision of the relay lens 6 in the illuminating device can slightly reduce divergence of the light beams emitted from the illuminating device.

<Fifteenth Embodiment>

In a fifteenth embodiment of the present invention, an illumination system capable of reducing divergence of light beams emitted from an illuminating device and improving light utilization ratio is described with reference to FIGS. 44A, 44B, and 44C.

Figure 44A:
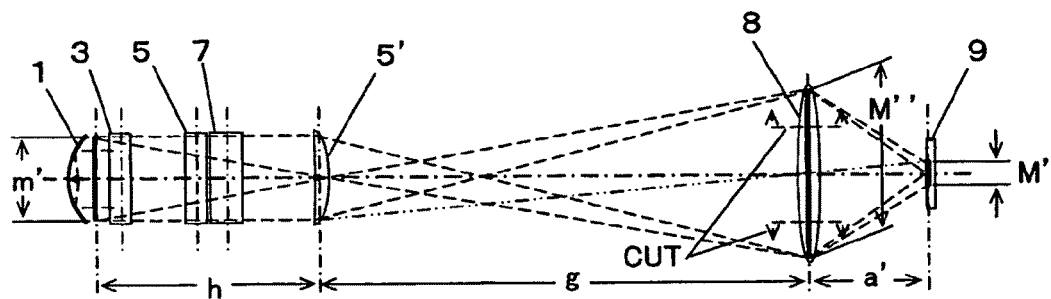
FIG. 44A is a diagram for describing a first example of an illumination system including a focusing lens and a secondary illumination lens according to an embodiment of the present invention.

FIG. 44A is a diagram for describing a first example of an illumination system including a focusing lens and a secondary illumination lens according to an embodiment of the present invention. FIG. 44B is a diagram for describing a second example of an illumination system including a focusing lens and a secondary illumination lens according to an embodiment of the present invention. FIG. 44C is a diagram for describing a third example of an illumination system including a focusing lens and a secondary illumination lens according to an embodiment of the present invention.

The illumination system shown in FIG. 44A includes, in addition to the same components as the illumination system shown in FIG. 32A, 32B, or 33, a secondary illumination lens 5' at the rear side of an illumination lens 5 as a cylinder lens array. The secondary illumination lens 5' is a cylinder lens oriented orthogonal to cylinder lenses constituting the cylinder lens array of the illumination lens 5. That is, the secondary illumination lens 5' has a function of a lens within a plane shown in FIG. 44A (in a sub-scanning direction 72 of the image scanning device), and has a function of a plane parallel plate within a plane perpendicular to the plane shown in FIG. 44A (in a main-scanning direction 71 of the image scanning device). A focal length of the secondary illumination lens 5' is $1/(1g+1/h)$, and a focal length of the cylinder lens of the focusing lens 8 is $1/(1g+1/a')$, wherein h represents the distance from an emission window of the parabolic mirror of the light source 1 to the secondary illumination lens 5'; g represents the distance from the secondary illumination lens 5' to the focusing lens 8; and a' represents the distance from the focusing lens 8 to the target surface 9. In the illumination system shown in FIG. 44A, the image of an emission window (with a size of m') of a parabolic mirror of a light source 1 is projected onto the position of the focusing lens 8 at a ratio of $M''/m'=g/h$, and the image with a size of $M''$ projected onto the position of the focusing lens 8 is projected onto a target surface 9 at a ratio of $M'/M''=a'/g$. However, it is often practically difficult to increase the size of the focusing lens 8 to $M''$. As shown with a broken line in FIG. 44A, the peripheral portion of the focusing lens 8 may be cut off so as to use only the center portion of the focusing lens 8. From the results of simulations and experiments, it is found that light utilization ratio of the illumination system shown in FIG. 44A is increased by 50% compared with light utilization ratio of the illumination system shown in FIG. 32A, 32B, 33, or 43.

Figure 44B:
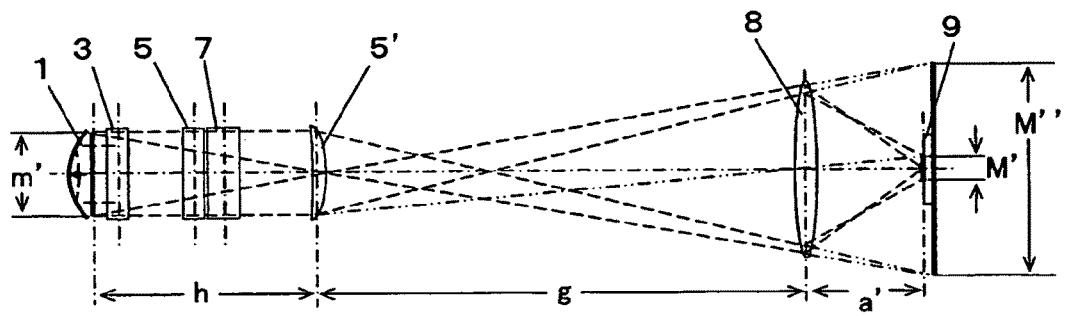
FIG. 44B is a diagram for describing a second example of an illumination system including a focusing lens and a secondary illumination lens according to an embodiment of the present invention.
Figure 44C:
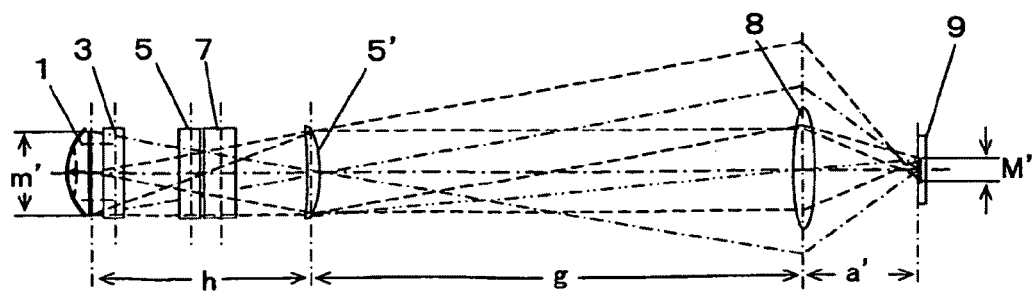
FIG. 44C is a diagram for describing a third example of an illumination system including a focusing lens and a secondary illumination lens according to an embodiment of the present invention.

In an alternative embodiment, the secondary illumination lens 5' shown in FIG. 44A may have the same focal length as the secondary illumination lens 5' shown in FIG. 44B or FIG. 44C. The focal length of the secondary illumination lens 5' shown in FIG. 44B is $1/(1/(a'+g)+1/h)$, and the focal length of the secondary illumination lens 5' shown in FIG. 44C is h. In the illumination systems shown in FIGS. 44B and 44C, the peripheral portion of the focusing lens 8 may be cut off so as to use the center portion of the focusing lens 8. If the illumination systems shown in FIGS. 44A, 44B, and 44C have the same size of focusing lenses 8, the light utilization ratio of the illumination system shown in FIG. 44B using a light beam narrowed at the position of the focusing lens 8 is higher than the illumination system of FIG. 44A using a light beam widened at the position of the focusing lens 8. In the illumination system shown in FIG. 44C, the image of a light source 1 is not focused onto the focusing lens 8, and the light beam with a width of m' $(1+g/h)$ reaches the focusing lens 8. In the illumination system shown in FIG. 44C, if the peripheral portion (having the same size as the cut off portions of the focusing lenses 8 of FIGS. 44A and 44B) of the focusing lens 8 is cut off, the amount of light collected by the focusing lens 8 is the lowest among the illumination systems shown in FIGS. 44A-44C, and the illumination system of FIG. 44C has the lowest light utilization ratio.

It is found that, in the case of using only the portion near the optical axis (center portion) of the focusing lens 8, when the focal length of the secondary illumination lens 5' is equal to $1/(1/g+1/h)$ or greater but less than or equal to h, light efficiency of the illumination system including the secondary illumination lens 5' is significantly increased compared to an illumination system not including the secondary illumination lens 5'. If the focal length of the focusing lens 8 is a' as shown in FIG. 44C, light utilization ratio of the illumination system slightly decreases but remains substantially high. In other words, when the focal length of the focusing lens 8 is equal to $1/(1/g+1/a')$ or greater but less than or equal to a', the light utilization ratio of the illumination system is improved in a similar manner.

<Sixteenth Embodiment>

In a sixteenth embodiment of the present invention, another illumination system capable of reducing divergence of light beams emitted from an illuminating device and improving light utilization efficiency is described with reference to FIGS. 45A, 45B, and 45C.

Figure 45A:
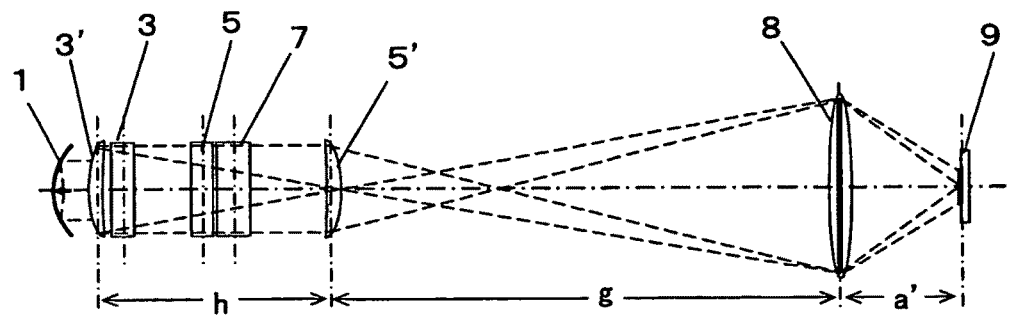
FIG. 45A is a diagram for describing a first example of an illumination system including a focusing lens, a secondary illumination lens, and a secondary condenser lens according to an embodiment of the present invention.

FIG. 45A is a diagram for describing a first example of an illumination system including a focusing lens, a secondary illumination lens, and a secondary condenser lens according to an embodiment of the present invention. FIG. 45B is a diagram for describing a second example of an illumination system including a focusing lens, a secondary illumination lens, and a secondary condenser lens according to an embodiment of the present invention. FIG. 45A is a diagram for describing a third example of an illumination system including a focusing lens, a secondary illumination lens, and a secondary condenser lens according to an embodiment of the present invention.

The illumination system shown in FIG. 45A includes, in addition to the same components as the illumination system shown in FIG. 44A, a secondary condenser lens 3' at the rear side of an emission window in a paraboloid of a light source 1. The secondary condenser lens 3' is a cylinder lens oriented orthogonal to cylinder lenses constituting a cylinder lens array of a condenser lens 3. That is, the secondary condenser lens 3' has a function of a lens within a plane shown in FIG. 45A (in a sub-scanning direction 72 of the image scanning device), and has a function of a plane parallel plate within a plane perpendicular to the plane shown in FIG. 45A (in the direction of a main-scanning direction 71 of the image scanning device). A focal length of the secondary condenser lens 3' is h, which is the distance from the secondary condenser lens 3' to the secondary illumination lens 5'. Collimated light beams emitted from the light source 1 are focused on to the position of the secondary illumination lens 5'. The relationship between the secondary illumination lens 5' and the focusing lens 8 is the same as that shown in FIG. 44A. Since the illumination system shown in FIG. 45A can use a small part of divergent light beams emitted from the parabolic mirror of the light source 1 to illuminate a target surface 9, light utilization ratio of the illumination system shown in FIG. 45A is higher by a few percentage points compared to the light utilization ratio of the illumination system shown in FIG. 44A.

Figure 45B:
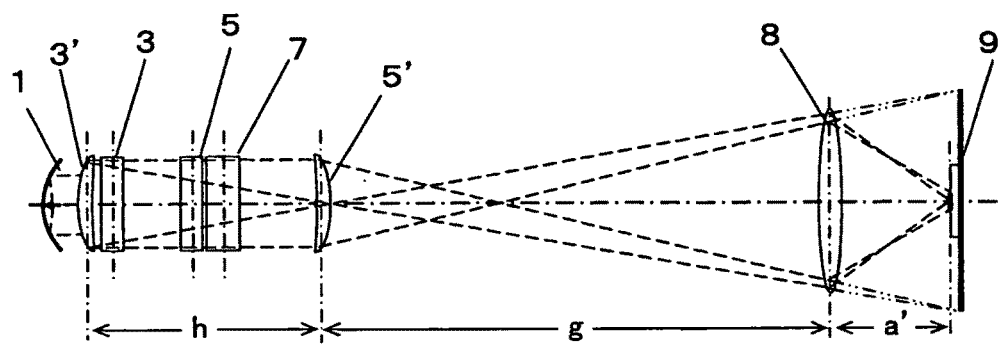
FIG. 45B is a diagram for describing a second example of an illumination system including a focusing lens, a secondary illumination lens, and a secondary condenser lens according to an embodiment of the present invention.
Figure 45C:
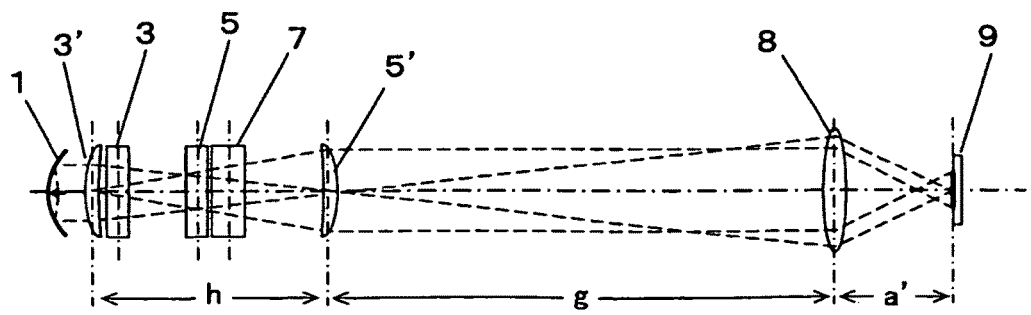
FIG. 45C is a diagram for describing a third example of an illumination system including a focusing lens, a secondary illumination lens, and a secondary condenser lens according to an embodiment of the present invention.

Similar to relationship of the illumination system of FIG. 45A with respect to the illumination system of FIG. 44A, the illumination systems shown in FIGS. 45B and 45C includes secondary condenser lenses 3' in addition to the components of the illumination systems shown in FIGS. 44B and 44C, respectively.

<Seventeenth Embodiment>

Figure 46A:
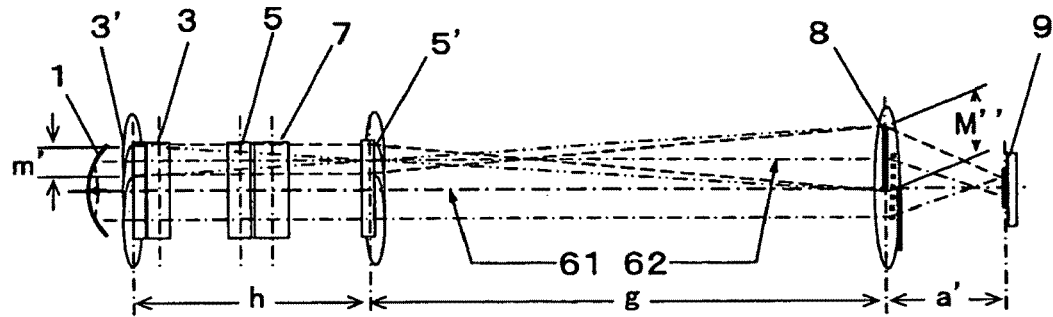
FIG. 46A is a diagram illustrating a first example of an illumination system including a focusing lens, a secondary illumination lens array, and a secondary condenser lens array according to the present invention.
Figure 46B:
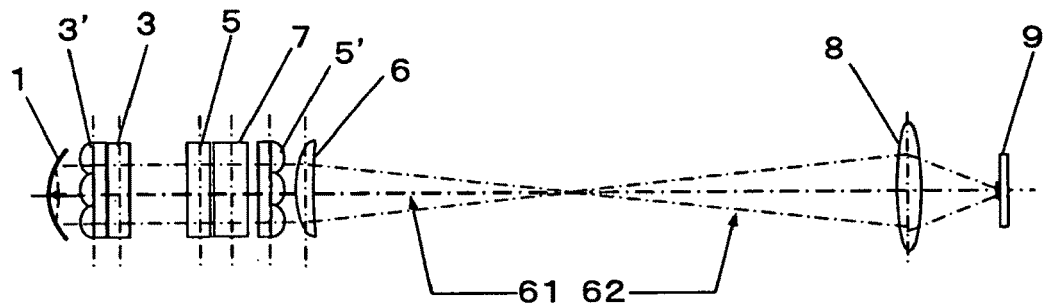
FIG. 46B is a diagram illustrating a second example of an illumination system including a focusing lens, a secondary illumination lens array, and a secondary condenser lens array according to the present invention.

A seventeenth embodiment of the present invention describes another illumination system with reference to FIGS. 46A, 46B, in which divergence of light beams emitted from an illuminating device can be reduced and the utilization rate of light can be increased.

FIG. 46A illustrates a first example of an illumination system including a focusing lens, a secondary illumination lens array, and a secondary condenser lens array according to the present invention. FIG. 46B illustrates a second example of an illumination system including a focusing lens, a secondary illumination lens array, and a secondary condenser lens array according to the present invention.

In the illumination system shown in FIG. 46A, the cylinder lens acting as the secondary condenser lens 3' and the cylinder lens acting as the secondary illumination lens 5' in the illumination system shown in FIG. 45A are respectively replaced with a secondary condenser lens array 3", which is a cylinder lens array, and a secondary illumination lens array 5", which is also a cylinder lens array. That is, in the illumination system shown in FIG. 46A, the cylinder lens acting as the secondary condenser lens 3' and the cylinder lens acting as the secondary illumination lens 5' in the illumination system shown in FIG. 45A are respectively divided into the secondary condenser lens array 3", which is a cylinder lens array, and the secondary illumination lens array 5", which is also a cylinder lens array. The focal length of each cylinder lens in the secondary condenser lens array 3" shown in FIG. 46A is the same as the focal length of the secondary condenser lens 3' shown in FIG. 45A, and the focal length of each cylinder lens in the secondary illumination lens array 5" shown in FIG. 46A is the same as the focal length of the secondary illumination lens 5' shown in FIG. 45A. In the illumination system shown in FIG. 46A, an image of a cylinder lens of the secondary condenser lens array 3", which image has a size m' (m' shown in FIG. 45A is divided by the number of cylinder lenses included in the cylinder lens array), is projected onto a position of the focusing lens 8 at a ratio of g/h. An image having a size M" projected onto the focusing lens 8 (M" shown in FIG. 45A is divided by the number of cylinder lenses included in the cylinder lens array) is projected on the target surface 9 at a ratio of a'/g. At the position of the focusing lens 8, images having the size M" corresponding to the number of cylinder lenses in the cylinder lens array are mutually superposed by the pitch of the cylinder lenses in the cylinder lens array. The illumination system shown in FIG. 46A corresponds to the illumination system shown in FIG. 45A; the illumination system shown in FIG. 46A can also correspond to the illumination system shown in FIG. 45B or 45C. However, it was not confirmed that the light utilization rate of the illumination system having the configuration shown in FIG. 46A is higher than the light utilization rate of the illumination system shown in FIG. 45A. In the descriptions with reference to FIGS. 44A through 46B, the enlargement ratio is described assuming that an image M" and an image M' are imaged by the cylinder lens having a size m' as a matter of convenience; however, in reality, such images are not formed.

In the illumination system shown in FIG. 46B, the relay lens 6 acting as the cylinder lens is added, similar to the illumination system shown in FIG. 43. In the illumination system shown in FIG. 46B, optical axes (secondary optical axes 62) of plural light beams divided by the secondary condenser lens array 3" and the secondary illumination lens array 5" are regarded as the light beams. The light utilization rate of the illumination system shown in FIG. 46B is substantially the same as the light utilization rate of the illumination system shown in FIG. 46A; however, the divergence of illumination light emitted from the illumination system shown in FIG. 46B can be slightly reduced compared to the illumination system shown in FIG. 46A.

The above only describes illumination systems employing only a focusing lens as the light beam focusing element. However, it is possible to employ a parabolic mirror or an ellipsoidal mirror as the light beam focusing element instead of employing a focusing lens. In an illumination system in an image scanning device, it is more convenient to employ a parabolic mirror or an ellipsoidal mirror rather than a focusing lens.

<Eighteenth Embodiment>

Figure 47:
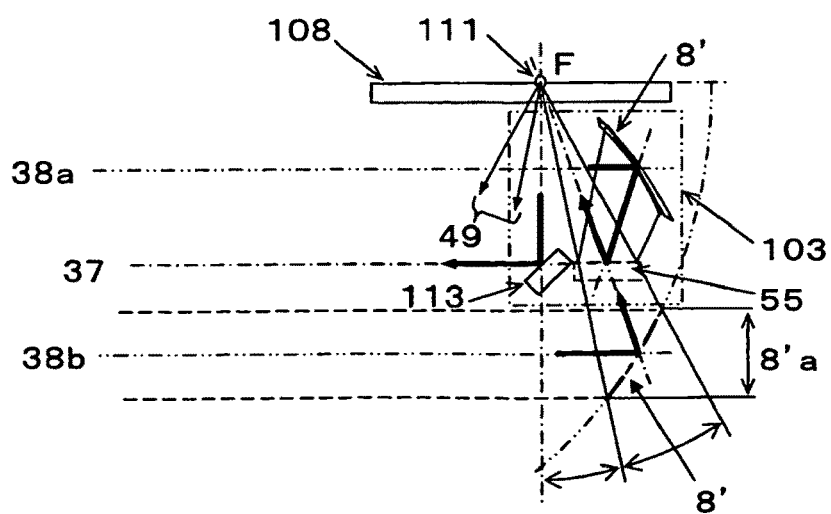
FIG. 47 is a diagram illustrating an example of an image scanning device employing a parabolic mirror as the light beam focusing element.
Figure 48:
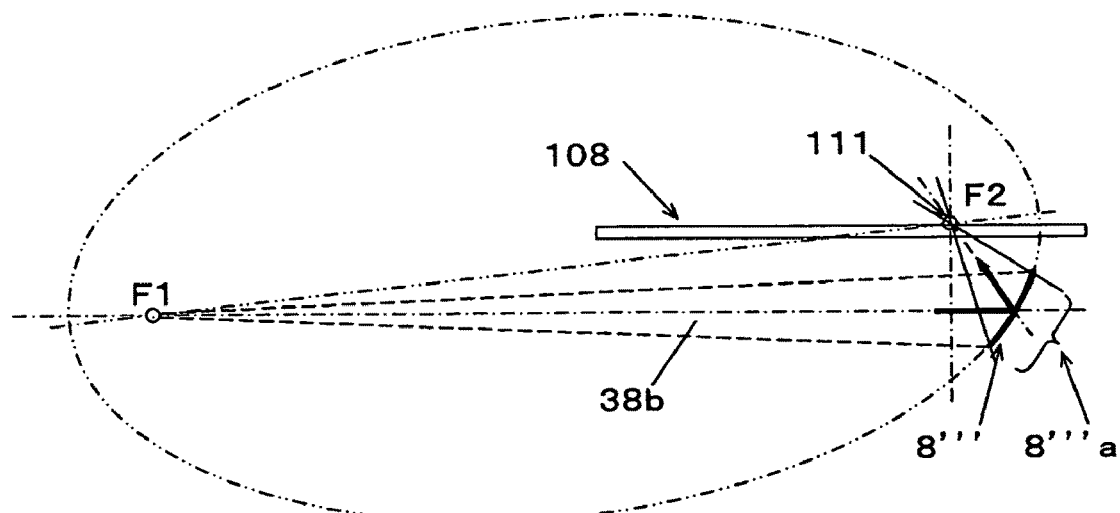
FIG. 48 is a diagram illustrating an example of an image scanning device employing an ellipsoidal mirror as the light beam focusing element.

An eighteenth embodiment describes an image scanning device in which a mirror is employed as the light beam focusing element, with reference to FIGS. 47 and 48.

FIG. 47 illustrates an example of an image scanning device employing a parabolic mirror as the light beam focusing element. Referring to FIG. 47, in a case of not using a planar mirror 55 for reflecting illumination light reflected from a parabolic mirror 8' onto the imaging area 111, the following configuration is employed. That is, the optical axis of the illuminating device 40 is shifted from the optical axis of the imaging lens 102 in an imaging system as shown in (ii) of FIGS. 39A, 39B, so that an illumination light axis 38b used when a planar mirror is not employed is positioned beneath the imaging optical axis 37. The parabolic mirror 8' provides a working range of parabolic mirror 8'a including an intersecting line of the parabolic mirror 8' having a focal point F on the linear imaging area 111 and the illumination light axis 38b used when a planar mirror is not employed. Moreover, the working range of parabolic mirror 8'a receives light beams emitted from the illuminating device 40. The deflecting mirror 113 in the imaging system is wide enough for receiving all of the valid image light incident on an imaging lens, and is also wide enough for providing a strength for supporting itself. Moreover, the deflecting mirror 113 is arranged in such a manner as to direct the light reflected from the imaging area 111 into an orthogonal direction. The position of the working range of parabolic mirror 8'a is determined in such a manner that light beams of the illumination avoid the deflecting mirror 113 and are incident on the target surface 9 on the contact glass 108 at a substantially orthogonal angle. The light beams of the illumination light reflected from the parabolic mirror 8' in the working range of parabolic mirror 8'a are efficiently focused on the imaging area 111; i.e., the imaging area 111 is efficiently illuminated. When the light beams of the illumination light are reflected from the document 107 surface or the contact glass 108 surface, the specular reflection thereof is reflected into a range of specular reflection 49 shown in FIG. 47. Hence, the specular reflection is not reflected to the deflecting mirror 113 and is not incident on the imaging lens 102 of the imaging system.

On the other hand, referring to FIG. 47, in a case of using the planar mirror 55 for reflecting illumination light reflected from the parabolic mirror 8' onto the imaging area 111, the following configuration is employed. That is, the optical axis of the illuminating device 40 is shifted from the optical axis of the imaging lens 102 in an imaging system as shown in FIG. 41 or 42, so that an illumination optical axis 38a used when a planar mirror is employed is positioned above the imaging optical axis 37. The parabolic mirror 8' provides a working range of parabolic mirror 8'a including an intersecting line of the parabolic mirror 8' having a focal point F on the linear imaging area 111 and the illumination light axis 38b used when a planar mirror is not employed. Moreover, the working range of parabolic mirror 8'a receives light beams emitted from the illuminating device 40. Furthermore, the planar mirror 55 is arranged in such a manner that the planar mirror 55 intersects the light beams reflected from the parabolic mirror 8' in the working range of parabolic mirror 8'a and focused at the focal point F of the parabolic mirror. Moreover, the parabolic mirror 8' is positioned in plane symmetry to the parabolic mirror used when a planar mirror is not employed, with respect to the mirror surface of the planar mirror 55. In this manner, in the case of employing a planar mirror, the illumination optical axis is bent by both the parabolic mirror 8' and the planar mirror 55, and reaches the imaging area 111. The mirror surface of the planar mirror 55 is covered by the parabolic mirror 8'. As a result, the mirror surface of the parabolic mirror 8' can be turned downward without reducing the focal length of the parabolic mirror 8'. Accordingly, the size of the first moving body 103 including the parabolic mirror 8' does not need to be increased. Furthermore, it is possible to prevent the dust 51 from adhering to the parabolic mirror 8' and prevent the scattered light 52 from the dust 51 adhering to the planar mirror 55 from being incident on the imaging lens 102, thereby reducing flare.

FIG. 48 illustrates an example of an image scanning device employing an ellipsoidal mirror as the light beam focusing element. An image scanning device employing an ellipsoidal mirror as the light beam focusing element can be realized by replacing the focusing lens 8 with an ellipsoidal mirror 8''', in the illumination system including the focusing lens 8 and the relay lens 6 shown in FIG. 43 or 46B. That is, a first focal point F1 of the ellipsoidal mirror 8''' is positioned at the focal point of the relay lens 6 as shown in FIG. 43 or 46B, and a second focal point F2 of the ellipsoidal mirror 8''' is positioned on the target surface 9, for example at the linear imaging area 111. An image scanning device employing an ellipsoidal mirror as the light beam focusing element can be realized by replacing the focusing lens 8 with an ellipsoidal mirror 8''', in the illumination system including the focusing lens 8 and the secondary illumination lens 5' shown in FIGS. 44A through 44C or FIGS. 45A through 45C. That is, a first focal point F1 of the ellipsoidal mirror 8''' is positioned at the secondary illumination lens 5' shown in FIGS. 44A through 44C or FIGS. 45A through 45C, and a second focal point F2 of the ellipsoidal mirror 8''' is positioned on the target surface 9, for example at the linear imaging area 111. Furthermore, the ellipsoidal mirror 8''' and the deflecting mirror 113 are arranged as shown in FIG. 47. The planar mirror 55 is not employed in the example shown in FIG. 48; however, the planar mirror 55 can be used together with the ellipsoidal mirror 8''' as shown in FIG. 47.

<Nineteenth Embodiment>

In a nineteenth embodiment of the present invention, another illumination system is described with reference to FIGS. 49 and 50. The illumination system of the nineteenth embodiment makes it possible to reduce divergence of a light beam emitted form an illuminating device and thereby to improve the utilization rate of light.

Figure 49:
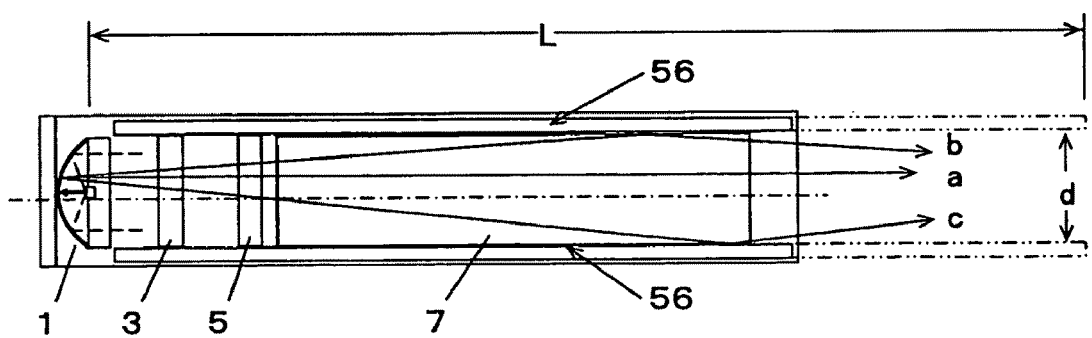
FIG. 49 is a diagram illustrating an exemplary illuminating device including an internal reflective surface.

FIG. 49 is a diagram illustrating an exemplary illuminating device including an internal reflective surface. The exemplary illuminating device shown in FIG. 49 comprises a light source 1 including an LED and a parabolic mirror having a focal point at the position of the LED and configured to reflect light emitted from the LED and thereby to output the light as a substantially collimated light beam (a light beam emitted from the focal point of the parabolic mirror is output as a collimated light beam), a condenser lens 3 implemented by a cylinder lens array, an illumination lens 5 implemented by a cylinder lens array, and a combining lens 7 implemented by a cylinder lens. The exemplary illuminating device shown in FIG. 49 outputs a collimated light beam emitted from the light source 1 as a collimated light beam in a plane shown in FIG. 49.

Precisely speaking, since the LED of the light source 1 has certain planar dimensions or a volume, a light beam emitted from a position on the LED outside of the focal point of the paraboloid of revolution is output as a divergent light beam instead of as a collimated light beam.

Figure 50:
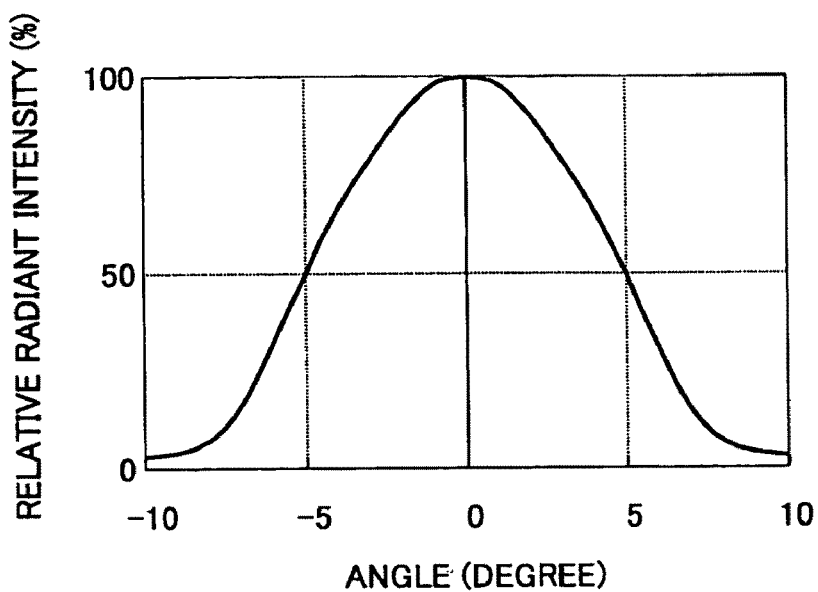
FIG. 50 is a graph showing an exemplary relative radiant intensity distribution of light beams emitted from an LED and reflected by a parabolic mirror.

FIG. 50 is a graph showing an exemplary relative radiant intensity distribution of light beams emitted from the LED and reflected by the parabolic mirror. In FIG. 50, the horizontal axis indicates radiation angles (degrees) of light beams emitted from the LED and reflected by the parabolic mirror and the vertical axis indicates relative radiant intensities (%) of the light beams. The relative radiant intensity distribution of light beams emitted from the LED and reflected by the parabolic mirror changes depending on the size of the LED and the F value of the parabolic mirror. However, practically, the relative radiant intensity distribution becomes as shown in FIG. 50. As shown in FIG. 50, the relative radiant intensity of light emitted from the light source 1 at a radiation angle of +5° or −5° is about 50% of that of completely collimated light. In the above described embodiment, the focusing lens 8 can receive light beams emitted from the light source 1 at radiation angles of 0°±1-2°. In this embodiment, reflective surfaces 56 like a mirror surface of a reflecting plate are provided on the inner wall of an illuminating device 9 to use light beams emitted at radiation angles larger than 0°±1-2°. In FIG. 49, among light beams a through c emitted from the light source 1, the light beams b and c are going out of a width d of the combining lens 7. The reflective surfaces 56 on the internal wall of the illuminating device 9 reflect and thereby cause the light beams b and c to enter the focusing lens 8. Thus, the configuration shown in FIG. 49 improves the utilization rate of light in the illumination system, for example, about 10%.

Meanwhile, in an image scanning device as shown in FIG. 42, a portion of light emitted from the illuminating device 9 and reflected by the turn-around mirrors 112a and 112b may enter the imaging lens 102 of an imaging system and cause flare. To reduce or prevent such flare, a non-reflective surface such as a light-absorbing plate may be provided (instead of a reflective surface) on one side of the inner wall of the illuminating device shown in FIG. 49. The non-reflective surface absorbs a portion of light emitted from the light source 1 and thereby reduces the amount of divergent light that causes flare in the illuminating device. For example, in FIG. 49, if the reflective surface 56 on the upper side is left as is and the reflective surface 56 on the lower side is replaced with a light-absorbing surface, the light beam b is output from the illuminating device but the light beam c is absorbed and not output from the illuminating device. This configuration, however, reduces the above mentioned improvement in utilization rate of light in the illuminating device by half.

The illuminating device shown in FIG. 49 may also include a secondary condenser lens 3', a secondary illumination lens 5', or a relay lens 6. An illuminating device with such a configuration may also provide advantageous effects similar to those provided by the illuminating device shown in FIG. 49.

<Twentieth Embodiment>

In a twentieth embodiment, a color image scanning device in which the utilization rate of light is improved by using a prism is described with reference to FIGS. 51A through 54.

Figure 51A:
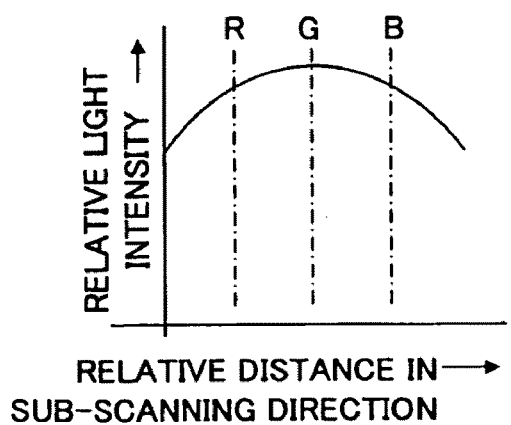
FIG. 51A is a graph showing an illuminance distribution in the sub-scanning direction in an imaging area of a conventional image scanning device.
Figure 51B:
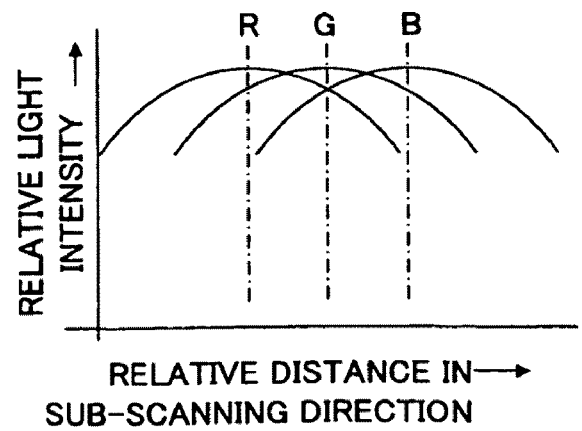
FIG. 51B is a graph showing an illuminance distribution in the sub-scanning direction in an imaging area of an image scanning device according to an embodiment of the present invention.
Figure 52:
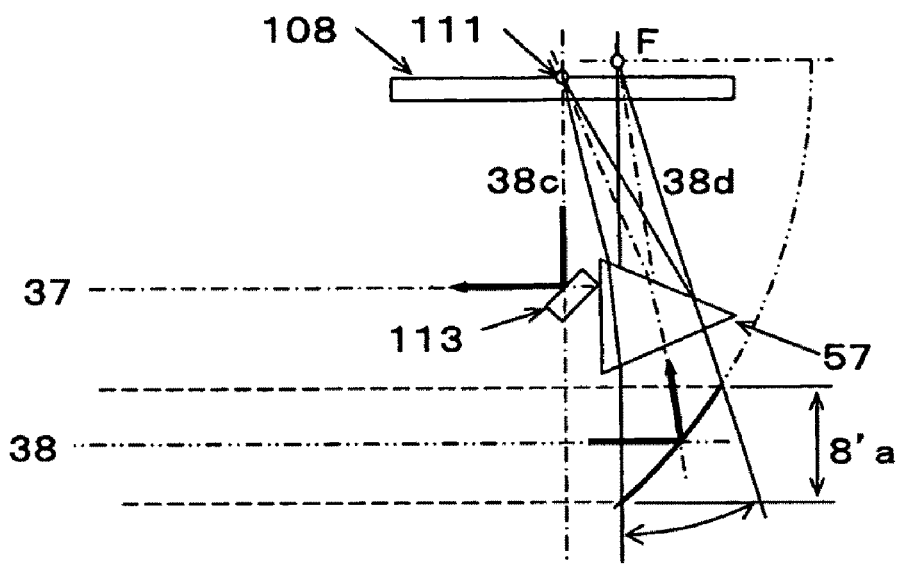
FIG. 52 is a diagram illustrating a first exemplary image scanning device using an illumination system including a prism according to an embodiment of the present invention.

FIGS. 51A and 51B are graphs showing illuminance distributions in the sub-scanning direction in imaging areas of image scanning devices. FIG. 51A is a graph showing an illuminance distribution in the sub-scanning direction in an imaging area of a conventional image scanning device whose illumination system is replaced with an illumination system of the above embodiment. FIG. 51B is a graph showing an illuminance distribution in the sub-scanning direction in an imaging area of an image scanning device according to an embodiment of the present invention. In FIGS. 51A and 51B, the horizontal axis indicates positions in the sub-scanning direction in an imaging area of the corresponding image scanning device and the vertical axis indicates relative illuminance at corresponding positions. FIG. 52 is a diagram illustrating a first exemplary image scanning device using an illumination system including a prism according to an embodiment of the present invention.

As shown in FIG. 51A, the illuminance distribution in the sub-scanning direction in the imaging area of a conventional image scanning device shows the maximum illuminance at an intersection between the imaging area and the illumination axis. In a color image scanning device, a one-dimensional image sensor comprises three one-line CCDs arranged in the sub-scanning direction. In front of the one-line CCDs, color filters of red (R), green (G), and blue (B) are provided, respectively. The distance between the one-line CCDs corresponds to four to eight pixels on the imaging area. With this configuration, the amounts of light reflected from the imaging area and entering the one-line CCDs assigned to respective colors correspond to the illuminance distribution in the sub-scanning direction in the imaging area of the image scanning device. In other words, the amounts of light entering the one-line CCDs are proportional to illuminance at positions in the imaging area corresponding to the one-line CCDs. In the example shown in FIG. 51A, the illuminance at positions in the imaging area corresponding to the one-line CCDs assigned to R and B is relatively lower than the illuminance at a position in the imaging area corresponding to the one-line CCD assigned to G. The difference in the amount of light entering the one-line CCDs for R, G, and B caused by the illuminance distribution in the imaging area can be normally corrected by changing the amplification factors used when electrically processing signals from the one-line CCDs. However, as shown in FIG. 51B, to improve the utilization rate of light in an image scanning device, it is preferable that the relative intensity of an illuminating light beam of each color become maximum at a position in the imaging area corresponding to the one-line CCD assigned to that color.

For example, as shown in FIG. 52, with a prism 57 inserted in the path of illuminating light in an image scanning device, it becomes possible to disperse illuminating light reflected by a mirror such as the parabolic mirror 8' or the ellipsoidal mirror 8''' into light beams of different wavelengths by the dispersion effect of the prism 57 and to direct the dispersed light beams to the imaging area 111. Thus, it is possible to focus illuminating light beams having different wavelengths, i.e. illuminating light beams having different colors, at different positions in the imaging area 111 by combining the prism 57 and a mirror such as the parabolic mirror 8' or the ellipsoidal mirror 8''' so that the illuminating light beams provide maximum illuminance at the corresponding positions in the imaging area 111. In other words, it is possible to disperse illuminating light into illuminating light beams of R, G, and B so that the illuminating light beams provide substantially maximum illuminance at respective positions in the imaging area which positions correspond to the one-line CCDs assigned to those colors. Thus, the configuration as shown in FIG. 52 makes it possible to substantially maximize the relative intensities of illuminating light beams of respective colors at respective positions in the imaging area which positions correspond to the one-line CCDs assigned to those colors.

Figure 53:
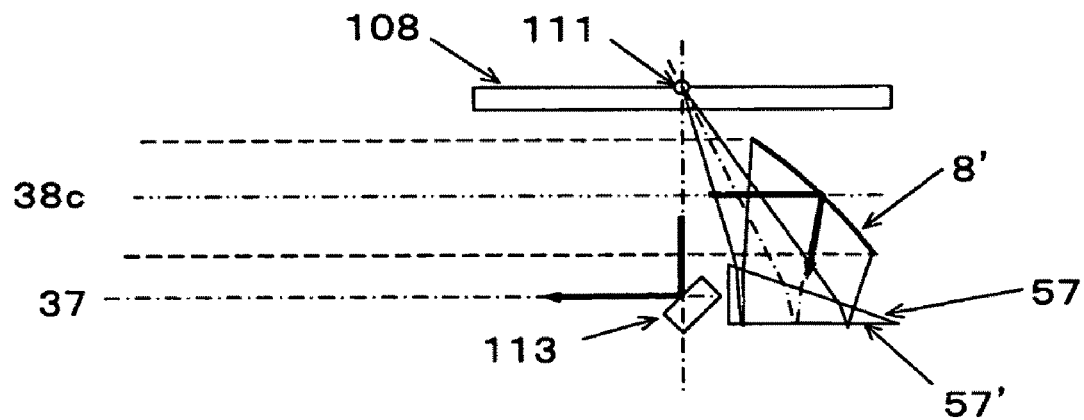
FIG. 53 is a diagram illustrating a second exemplary image scanning device using an illumination system including a prism according to an embodiment of the present invention.

FIG. 53 is a diagram illustrating a second exemplary image scanning device using an illumination system including a prism according to an embodiment of the present invention. As shown in FIG. 53, a color image scanning device may include a prism 57 having a mirror surface 57' and a mirror such as the parabolic mirror 8' or the ellipsoidal mirror 8'''. In the exemplary image scanning device shown in FIG. 53, illuminating light reflected by a mirror such as the parabolic mirror 8' or the ellipsoidal mirror 8''' enters the prism 57 having the mirror surface 57'. The illuminating light entering the prism 57 having the mirror surface 57' is dispersed into light beams of different wavelengths by the dispersion effect of the prism 57 and the dispersed light beams are reflected by the mirror surface 57' of the prism 57 toward the imaging area 111. Thus, the configuration shown in FIG. 53 makes it is possible to focus illuminating light beams having different wavelengths, i.e. illuminating light beams having different colors, on different positions in the imaging area 111 such that the illuminating light beams provide maximum illuminance at the corresponding positions in the imaging area 111. As shown in FIG. 53, to provide a necessary dispersion effect, the apex angle of the prism 57 having the mirror surface 57' that reflects illuminating light is preferably one half of the apex angle of the prism 57 shown in FIG. 52 that transmits illuminating light.

In FIGS. 52 and 53, the prism 57 is disposed near the imaging area 111. Therefore, the length of the prism 57 in the main-scanning direction is substantially the same as that of the imaging area 111 in the main-scanning direction.

Figure 54:
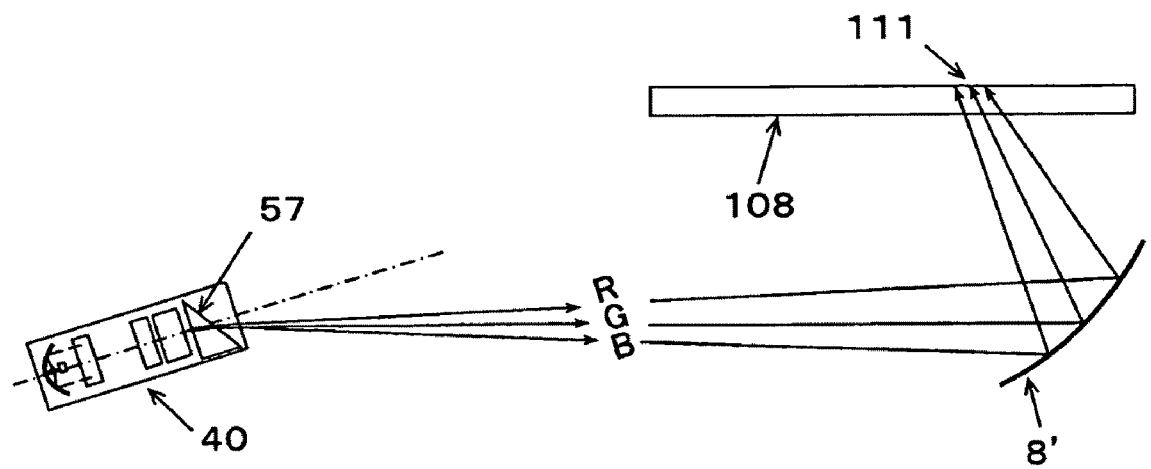
FIG. 54 is a diagram illustrating a third exemplary image scanning device using an illumination system including a prism according to an embodiment of the present invention.

FIG. 54 is a diagram illustrating a third exemplary image scanning device using an illumination system including a prism according to an embodiment of the present invention. As shown in FIG. 54, the prism 57 may be disposed in an illuminating device or near the exit of an illuminating device. This configuration makes it possible to reduce the size of the prism 57 in the main-scanning direction of the exemplary image scanning device. When a light-beam focusing element such as the focusing lens 8 is provided in an image scanning device, the dispersion effect of a prism (the refractive index and the apex angle of a prism) is preferably determined taking into account the convergence of illuminating light beams of respective colors by the light-beam focusing element.

<Twenty-First Embodiment>

In a twenty-first embodiment, a color image scanning device with an improved utilization rate of light is described with reference to FIGS. 55A through 56B.

FIGS. 55A through 55C are diagrams illustrating an exemplary color illumination system with an improved utilization rate of light according to an embodiment of the present invention. FIG. 55A is a top view of the exemplary color illumination system, FIG. 55B is an elevational view of the exemplary color illumination system, and FIG. 55C is a side view of a light source of the exemplary color illumination system.

As shown in FIG. 55C, a light source 1 of the color illumination system includes LEDs and parabolic mirrors that reflect and collimate light emitted from the LEDs. Each of the LEDs is positioned at the focal point of the corresponding parabolic mirror. In the light source 1 of the color illumination system, LEDs of the same emission colors are arranged in lines in a main-scanning direction 71 of the image scanning device. On the other hand, in a sub-scanning direction 72 of the image scanning device, LEDs of three different emission colors, for example, LEDs of red (R), LEDs of green (G), and LEDs of blue (B), are arranged in lines.

Also, as shown in FIGS. 55A and 55B, the illuminating device of the exemplary color illumination system comprises, in addition to the light source 1, a secondary condenser lens 3' implemented by a cylinder lens array that includes cylinder lenses arranged in the sub-scanning direction 72 and corresponding to the LEDs of respective colors, a condenser lens 3, an illumination lens 5, a combining lens 7, a secondary illumination lens 5', and a secondary combining lens 7'. Further, the exemplary color illumination system includes, in addition to the color illuminating device, a light-beam focusing element such as a focusing lens, 8, a parabolic mirror 8', or an ellipsoidal mirror 8''' for focusing light beams divided in the sub-scanning direction 72 by the secondary condenser lens 3' on a target surface 9.

The condenser lens 3, the illumination lens 5, and the combining lens 7 function as shown in FIG. 55A in a plane (along the main-scanning direction 71) shown in FIG. 55A; and therefore the color illumination system functions in a similar manner to that of the illumination system shown in FIGS. 32 and 33.

In a plane (along the sub-scanning direction 72) shown in FIG. 55B, the focal length of the cylinder lenses constituting the cylinder lens array of the secondary condenser lens 3' equals the distance h between the secondary condenser lens 3' and the secondary illumination lens 5', and the cylinder lenses correspond to the LEDs of respective colors and the parabolic mirrors of the light source 1. The shape and the number of the cylinder lenses constituting the secondary illumination lens 5' are identical to those of the cylinder lenses constituting the secondary condenser lens 3'. The focal length of the secondary combining lens 7' equals the distance g between the secondary combining lens 7' and the focusing lens 8. The focal length of the focusing lens B is expressed by the formula $1/(1/(b'+g)+1/a')$. In the formula, a' indicates the distance between the focusing lens 8 and the target surface 9 and b' indicates the distance between the secondary illumination lens 5' and the secondary combining lens 7'. With the above configuration, optical axes of B, G, R light beams intersect at the center of the focusing lens 8, and focal positions of the B, G, R light beams are arranged on the target surface 9 at intervals of P. When the light beams are arranged in the order of B, G, and R from the top at the light source 1, the focal positions of the light beams are arranged in the order of R, G, and B on the target surface 9. The combined focal length of the focal length h of the cylinder lenses constituting the secondary illumination lens 5' and the focal length g of the secondary combining lens 7' equals the focal length of the secondary illumination lens 5' of the illumination system shown in FIG. 45A. Since the functions of the focusing lens 8 in the color illumination system of FIG. 55 and the focusing lens 8 in the illumination system of FIG. 45A are substantially the same, the utilization rate of light emitted from each of the LEDs of respective colors in the color illumination system of FIG. 55 is substantially the same as that in the illumination system of FIG. 45A. In addition, with the color illumination system of FIG. 55, since the optical axes of optical devices of respective colors, i.e. LEDs of R, G, and B, are shifted from each other in the sub-scanning direction, it is possible to substantially maximize the relative intensities of illuminating light beams of respective colors at different positions on the target surface 9. For example, it is possible to substantially maximize the relative intensities of illuminating light beams of respective colors at respective positions in the imaging area which positions correspond to the one-line CCDs assigned to those colors. Accordingly, the utilization rate of light beams of respective colors in the color illumination system is improved.

The color illumination system shown in FIG. 55 corresponds to the illumination system shown in FIG. 45A. Alternatively, it is possible to design a color illumination system that corresponds to the illumination system shown in FIG. 45B or 45C. Further, it is possible to design a color illumination system corresponding to the illumination system shown in FIG. 44A, 44B, or 44C that does not include the secondary condenser lens 3'. The utilization rate of each of the light beams of respective colors in a color illumination system with the above configuration is substantially the same as that in the illumination systems shown in FIGS. 44A through 44C, and therefore the entire utilization rate of light beams of respective colors in the color illumination system is improved.

Meanwhile, the cylinder lens arrays of the secondary condenser lens 3' and the secondary illumination lens 5' in the color illumination system shown in FIGS. 55A through 55C function differently from those of the secondary condenser lens 3' and the secondary illumination lens 5' in the illumination system shown in FIGS. 46A and 46B. The cylinder lens arrays of the secondary condenser lens 3' and the secondary illumination lens 5' in the illumination system shown in FIGS. 46A and 46B are configured to divide a light beam emitted from a light source of one color. On the other hand, the cylinder lens arrays of the secondary condenser lens 3' and the secondary illumination lens 5' in the color illumination system shown in FIGS. 55A through 55C are configured such that one cylinder lens is provided for each of the light sources of respective colors. In other words, in the color illumination system, three cylinder lenses are provided for the light sources of three colors.

To improve the illumination efficiency of the color illumination system shown in FIGS. 55A through 55C, it is preferable to make the ratio (g/h) of the distance g between the secondary illumination lens 5' and the focusing lens 8 to the distance h between the secondary condenser lens 3' and the secondary illumination lens 5' as small as possible so that the illuminating light does not spread too much at the position of the focusing lens 8. For this reason, the condenser lens 3, the illumination lens 5, and the combining lens 7 that function in the main-scanning direction 71 are inserted between the secondary condenser lens 3' and the secondary illumination lens 5'. However, the condenser lens 3, the illumination lens 5, and the combining lens 7 are not necessarily inserted between the secondary condenser lens 3' and the secondary illumination lens 5'.

Figure 56A:
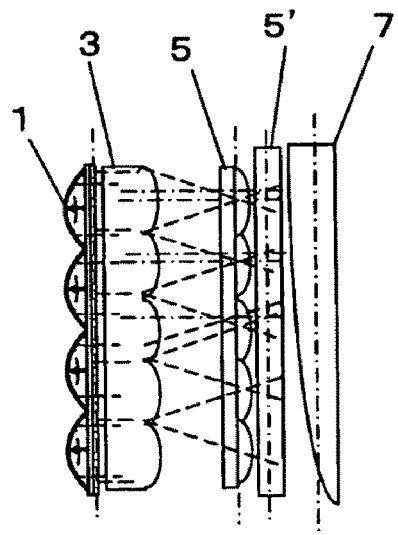
FIGS. 56A and 56B are a top view and an elevational view of an exemplary illumination system including a lens that provides functions of multiple lenses.
Figure 56B:
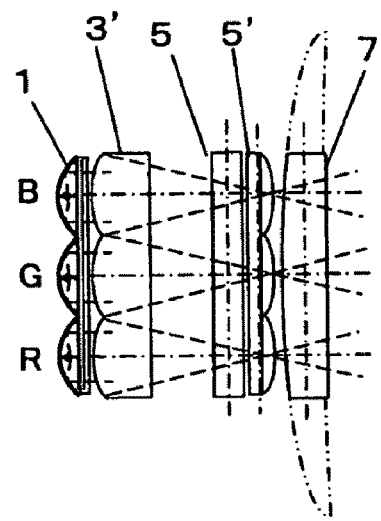

FIGS. 56A and 56B are diagrams illustrating an exemplary illumination system including a lens that provides functions of multiple lenses. FIG. 56A is a top view of the exemplary illumination system and FIG. 56B is an elevational view of the exemplary illumination system.

In the illumination system shown in FIGS. 56A and 56B, the condenser lens 3 and the secondary condenser lens 3' shown in FIG. 55B are combined into a single lens. Although the illumination lens 5 and the secondary illumination lens 5' are provided as separate cylinder lens arrays in FIGS. 56A and 56B, they may also be combined. Thus, it is possible to combine adjacent cylinder lenses (or cylinder lens arrays) in an illumination system. For example, an optical device having a shape formed by combining multiple cylinder lenses (or cylinder lens arrays) can be produced by plastic molding.

<Twenty-Second Embodiment>

In a twenty-second embodiment, an illumination system that can improve illuminance distribution in the main-scanning direction of an image scanning device is described with reference to FIGS. 57 and 58.

Figure 57:
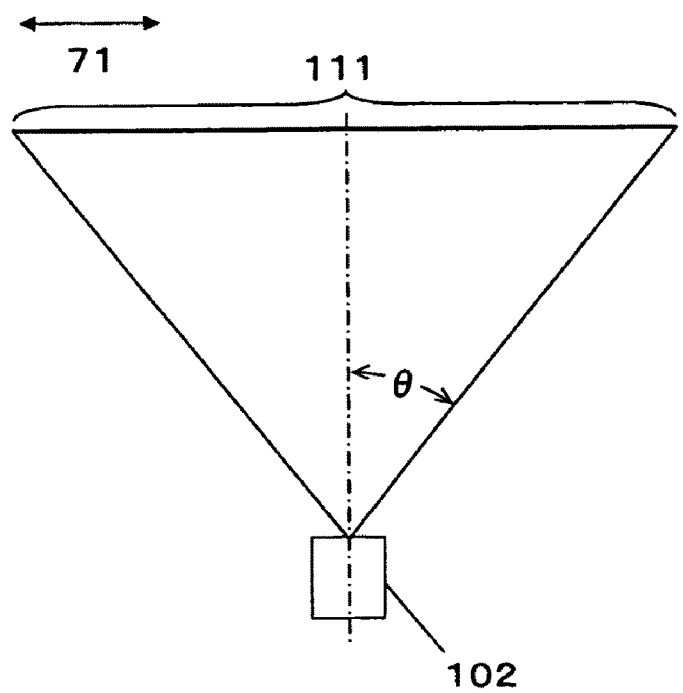
FIG. 57 is a diagram used to describe characteristics of luminance of an image formed by an imaging lens of an imaging system.

FIG. 57 is a diagram used to describe characteristics of luminance of an image formed by an imaging lens of an imaging system. FIG. 58 is a graph used to describe a preferable illuminance distribution in the main-scanning direction of an image scanning device. In FIG. 58, the horizontal axis indicates an angle θ relative to the optical axis of an imaging lens of an imaging system and the vertical axis indicates relative luminance of an image formed by the imaging lens at the angle θ or preferable relative illuminance (relative intensity) in an imaging area. Here, it is assumed that the luminance of an image or the illuminance in the imaging area at the optical axis of the imaging lens is 1. Also in FIG. 58, line (i) indicates the distribution of relative luminance of an image in relation to the angle θ and line (ii) indicates a preferable illuminance distribution in relation to the angle θ.

In FIG. 57, a line-shaped imaging area 111 extending in the main-scanning direction 71 is disposed perpendicular to the optical axis of an imaging lens 102. In this case, the luminance of an image of the imaging area 111 formed by the imaging lens 102 normally decreases, because of the characteristics of the imaging lens 102 of the imaging system, as the angle θ from the optical axis of the imaging lens 102 increases or as it departs from the intersection between the imaging area 111 and the optical axis of the imaging lens 102.

Figure 58:
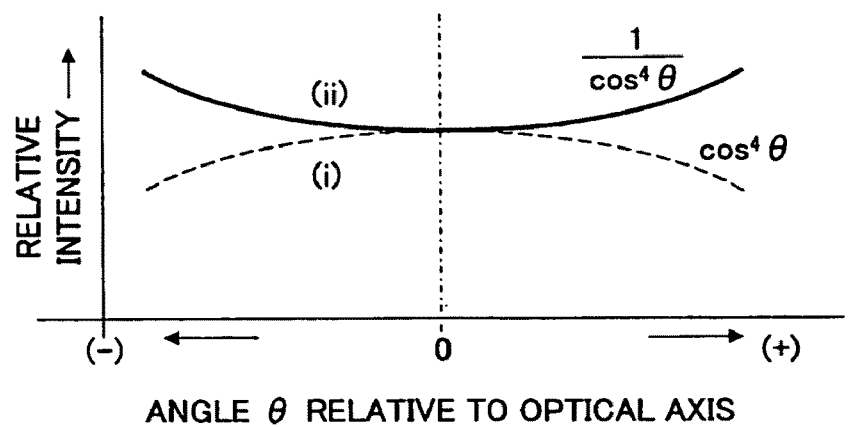
FIG. 58 is a graph used to describe a preferable illuminance distribution in the main-scanning direction of an image scanning device.

As line (i) in FIG. 58 shows, the luminance of an image formed by the imaging lens 102 disposed perpendicular to the line-shaped imaging area 111 extending in the main-scanning direction 71 decreases as the angle θ from the optical axis of the imaging lens 102 increases. The luminance of the image at an angle θ is $\cos^4 θ$ times as large as the luminance at the optical axis of the imaging lens 102.

As described above, embodiments of the present invention provide an illumination system and an image scanning device that make it possible to achieve a uniform illuminance distribution on an imaging area or a target surface. In addition, illuminance distribution in an imaging area of an image scanning device is preferably determined taking into account the characteristics of an imaging lens.

In the above described illumination system, the focal length of cylinder lenses constituting the condenser lens 3 is set at "c" and the focal length of the cylinder lenses constituting the illumination lens 5 is set at $1/(1/(a+b)+1/c)$ so that the illuminance distribution on the target surface 9 becomes uniform. With this configuration, a portion of illuminating light that is affected by the cylindrical aberration (corresponding to spherical aberration of a spherical lens) of the cylinder lenses constituting the condenser lens 3 and the illumination lens 5 is discarded, and it reduces the utilization rate of the illumination system.

More specifically, a light beam near the optical axis (secondary optical axis) of the condenser lens 3 is not affected much by the cylindrical aberration of the cylinder lenses constituting the condenser lens 3. Therefore, the light beam converges at the center of the illumination lens 5, passes through the illumination lens 5, and evenly illuminates a portion of the target surface 9. On the other hand, a light beam passing through the periphery of the condenser lens 3 is affected by the cylindrical aberration of the cylinder lenses constituting the condenser lens 3. As a result, the light beam converges at a point before the illumination lens 5 and cannot reach the target surface 9. However, when such an illumination system is used in an image scanning device, since the magnification of an illuminating light beam is as large as several tens of times, it is preferable to use even a light beam strongly affected by cylindrical aberration. A illuminance distribution represented by $1/\cos^4 θ$ and indicated by line (ii) in FIG. 58, which illuminance distribution is opposite to the illuminance distribution provided by the imaging lens 102 and represented by $\cos^4 θ$, can be achieved on the target surface 9 (imaging area 111) by causing even a light beam passing through the periphery of the condenser lens 3, which light beam is greatly affected by the cylindrical aberration caused by the cylinder lenses, to fall on the periphery of the target surface 9 by using the illumination lens 5.

For example, the illuminance distribution represented by $1/\cos^4$ can be achieved by increasing the distance between the condenser lens 3 and the illumination lens 5 by several to ten-odd percent of the focal length of the condenser lens 3 and the illumination lens 5. With this configuration, even a light beam passing through the periphery of the condenser lens 3 can reach the periphery of the target area. As a result, the illuminance on the periphery of the target surface 9 becomes higher than that in the central portion of the target surface 9, and the illuminance distribution becomes close to $1/\cos^4$. Also, according to a simulation, this configuration improves the illuminance on the entire target surface 9 and increases the illumination efficiency by about 50% compared with a case where the illuminance distribution is uniform.

<Twenty-Third Embodiment>

Figure 59:
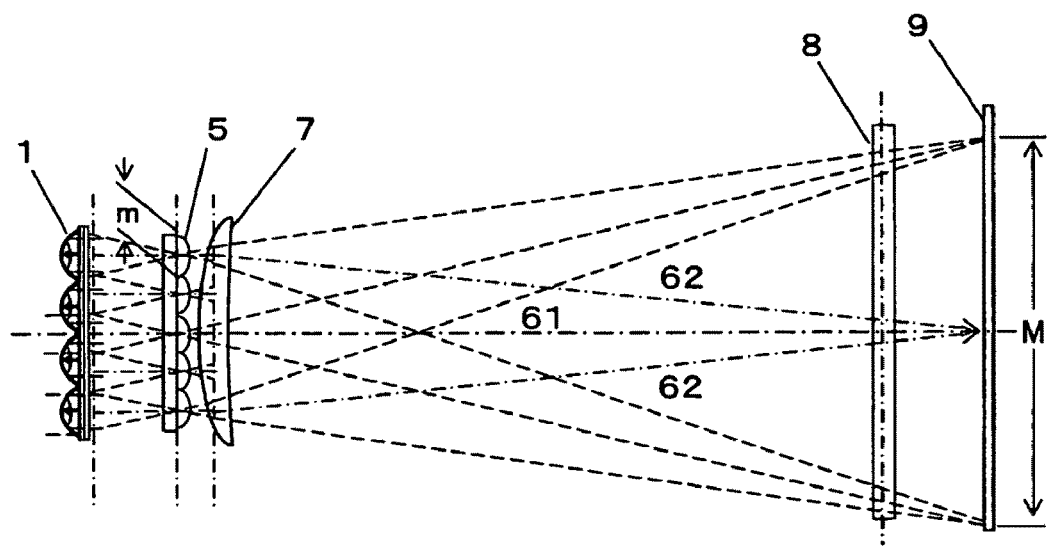
FIG. 59 is a diagram illustrating an exemplary illumination system that does not include a condenser lens according to an embodiment of the present invention.

In a twenty-third embodiment, an exemplary illumination system that does not include a condenser lens is described with reference to FIG. 59. FIG. 59 is a diagram illustrating an exemplary illumination system that does not include a condenser lens according to an embodiment of the present invention. Each of the illumination systems of the above embodiments includes the condenser lens 3. The condenser lens 3, however, may be removed from an illumination system when it is preferable to reduce the number of parts in the illumination system even at the cost of reduced illumination efficiency. As shown in FIG. 59, in the exemplary illumination system that does not include the condenser lens 3 as in illumination systems of the above embodiments, light beams emitted from the light source 1 are directed to the target surface 9 by the illumination lens 5 comprising multiple lenses, and the light beams passing through the multiple lenses of the illumination lens 5 are combined by the combining lens 7 on the target surface 9. Each of the multiple lenses constituting the illumination lens 5 is configured to obtain multiple light beams from a light beam from the light source 1 and to cause the multiple light beams to partially overlap on the target surface 9.

<Twenty-Fourth Embodiment>

Figure 60:
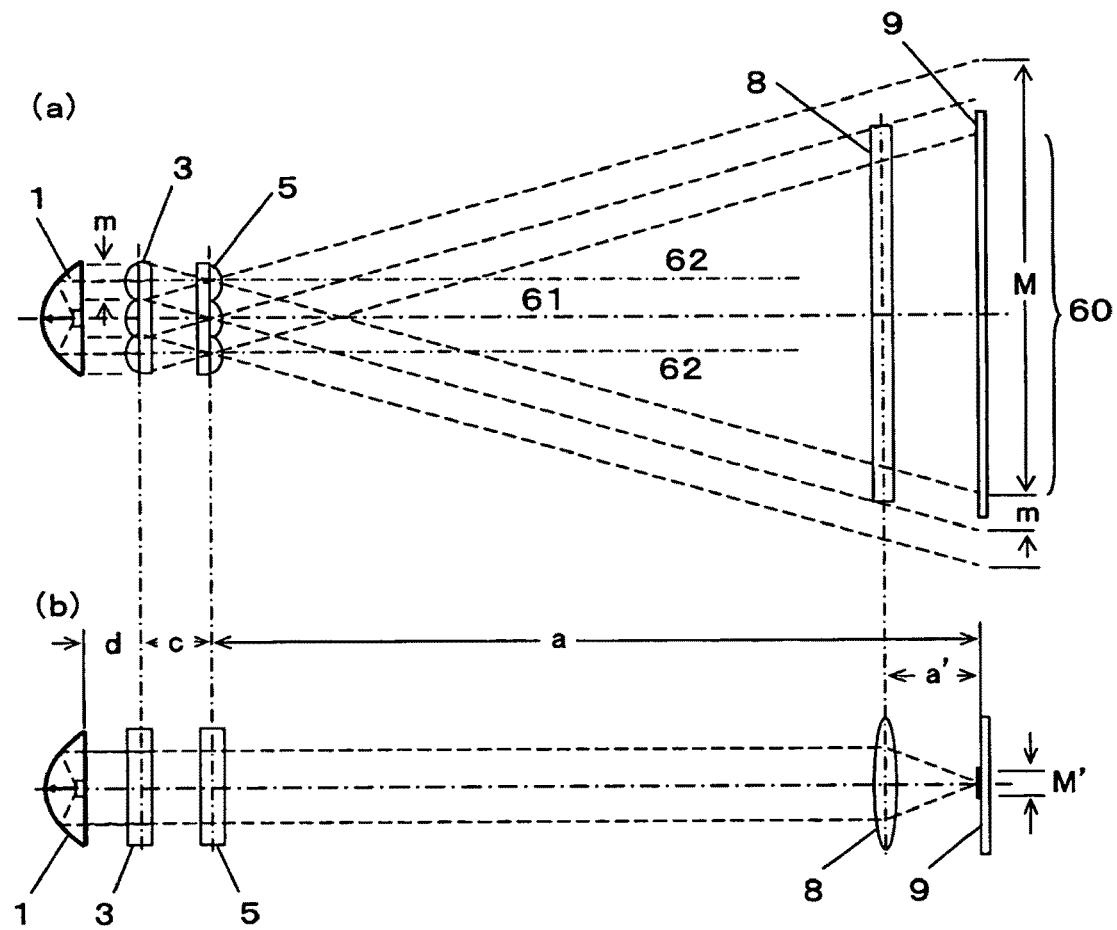
FIG. 60 is a diagram illustrating an exemplary illumination system according to an embodiment of the present invention that does not include a combining lens, in which (a) is a top view and (b) is an elevational view of the exemplary illumination system.

In a twenty-fourth embodiment, an exemplary illumination system that does not include a combining lens is described with reference to FIGS. 60 through 61B. FIG. 60 is a diagram illustrating an exemplary illumination system that does not include a combining lens according to an embodiment of the present invention. FIG. 60 (a) is a top view of the exemplary illumination system that does not include a combining lens and FIG. 60 (b) is an elevational view of the exemplary illumination system.

In a plane shown in FIG. 60 (a), a light beam emitted from the light source 1 is divided into multiple light beams by the condenser lens 3. The divided light beams are directed to the target surface 9 by the illumination lens 5 so as to partially overlap on the target surface. The focusing lens 8 provides substantially the same function as that of a plane parallel plate in the plane shown in FIG. 60 (a).

As shown in FIG. 60 (a), a light beam with a size m that is identical to the size of each of the cylinder lenses constituting the condenser lens 3 and the illumination lens 5 is magnified to a size M on the target surface 9. Multiple light beams directed to the target surface by the cylinder lenses of the illumination lens 5 overlap on the target surface 9. The overlapping light beams are shifted from each other by the size m of the cylinder lenses constituting the condenser lens 3 and the illumination lens 5. In other words, an area on the target surface 9 is uniformly illuminated by the overlapping multiple light beams directed to the target surface 9 by the cylinder lenses of the illumination lens 5. The uniformly illuminated area may be used as a scanning area. In the illumination system shown in FIG. 60, the scanning area is expressed by the following formula: M−m×(umber of cylinder lenses−1). Therefore, when the number of cylinder lenses constituting the condenser lens 3 and the illumination lens 5 is small, the scanning area becomes large. Normally, the size m of each of the cylinder lenses constituting the condenser lens 3 and the illumination lens 5 is between about 1 mm and about several mm. Accordingly, even when no combining lens is used, the scanning area decreases only by 1 mm to several mm.

In a plane shown in FIG. 60 (b), a light beam emitted from the light source 1 passes through the condenser lens 3 and the illumination lens 5 as a collimated light beam and is focused on the target surface 9 by the focusing lens 8. The condenser lens 3 and the illumination lens 5 provide substantially the same function as that of a plane parallel plate in the plane shown in FIG. 60 (b).

As in the case of the twenty-third embodiment, the condenser lens 3 may be removed from the exemplary illumination system of this embodiment at the cost of reduced illumination efficiency. Such a configuration still provides advantageous effects of the present invention.

Figure 61A:
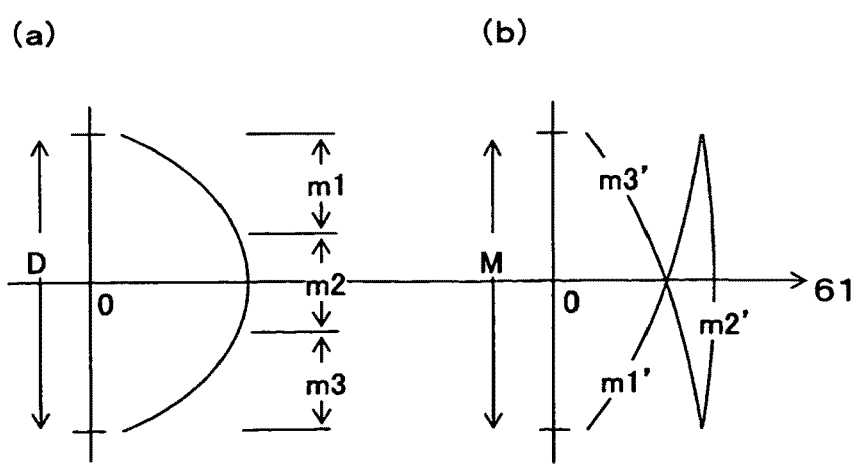
FIG. 61A is a diagram used to describe an exemplary illumination system where a cylinder lens array comprising an odd number of cylinder lenses is provided for each light source, in which (a) shows the intensity distribution of a light beam emitted from a light source and (b) shows illuminance distributions on a target surface.

FIG. 61A is a diagram used to describe an exemplary illumination system where a cylinder lens array comprising an odd number of cylinder lenses is provided for each light source. FIG. 61A (a) shows the intensity distribution of a light beam emitted from a light source and FIG. 61A (b) shows illuminance distributions on a target surface.

Let us assume that a light beam having an intensity distribution as shown in FIG. 61A (a) is emitted from a light source (for example, an LED+a collimator lens or a mirror) having a diameter D in an illumination system as shown in FIG. 60. The light beam having an intensity distribution as shown in FIG. 61A (a) passes through the condenser lens 3 and the illumination lens 5 each of which comprises three cylinder lenses m1, m2, and m3 having widths m1, m2, and m3, respectively. As shown in FIG. 61A (b), light passing through the cylinder lenses m1 provides an illuminance distribution m1' on the target surface 9. Similarly, light passing through the cylinder lenses m2 provides an illuminance distribution m2' on the target surface 9 and light passing through the cylinder lenses m3 provides an illuminance distribution m3' on the target surface 9. The entire light passing through the cylinder lenses m1, m2, and m3 provides an illuminance distribution obtained by combining the illuminance distributions m1', m2', and m3' and, as a result, the scanning area M on the target surface 9 is uniformly illuminated.

FIG. 61B is a diagram used to describe an exemplary illumination system where a cylinder lens array comprising an even number of cylinder lenses is provided for each light source. FIG. 61B (a) shows the intensity distribution of a light beam emitted from a light source and FIG. 61A (b) shows illuminance distributions on a target surface.

Let us assume that a light beam having an intensity distribution as shown in FIG. 61B (a) is emitted from a light source (for example, an LED+a collimator lens or a mirror) having a diameter D in an illumination system as shown in FIG. 60. The light beam having an intensity distribution as shown in FIG. 61B (a) passes through the condenser lens 3 and the illumination lens 5 each of which comprises four cylinder lenses m1, m2, m3, and m4 having widths m1, m2, m3, and m4, respectively. As shown in FIG. 61B (b), light passing through the cylinder lenses m1 provides an illuminance distribution m1' on the target surface 9. Similarly, light passing through the cylinder lenses m2 provides an illuminance distribution m2' on the target surface 9, light passing through the cylinder lenses m3 provides an illuminance distribution m3' on the target surface 9, and light passing through the cylinder lenses m4 provides an illuminance distribution m4' on the target surface 9. The entire light passing through the cylinder lenses m1, m2, m3, and m4 provides an illuminance distribution obtained by combining the illuminance distributions m1', m2', m3', and m4' and, as a result, the scanning area M on the target surface 9 is uniformly illuminated.

In the above embodiments, a light-beam focusing element is implemented by a focusing lens or a reflecting mirror such as a parabolic mirror or a ellipsoidal mirror. Alternatively, any one of the other lenses may be replaced with a reflecting mirror used as a light-beam focusing element. For example, the combining lens 7 may be replaced with a parabolic mirror (in this case, it is necessary to reverse the direction of the illuminating device or to add another planar mirror).

Also, a light-emitting element other than an LED may be used as a light source.

Further, an illumination system and an imaging system may be provided on the same moving body. With this configuration, it becomes possible to scan a document and obtain an image on the document using the same moving body. In this case, since an illumination device, an imaging lens, a one-dimensional scanning device, etc. are mounted on a single moving body, the weight of the moving body increases and it becomes difficult to move the moving body at high speed. However, this configuration reduces the cause of flare.

The present invention is not limited to the specifically disclosed embodiments, and variations and modifications may be made without departing from the scope of the present invention.

The present application claims priority from Japanese Patent Application No. 2005-080772 filed on Mar. 18, 2005 and Japanese Patent Application No. 2006-075711 filed on Mar. 17, 2006, the entire contents of which are hereby incorporated herein by reference.

Industrial Applicability

The present invention is applicable to an image scanning device incorporated in an image forming device such as a digital PPC and including a reducing optical system comprising a solid-state image sensor, an imaging lens, and an illuminating device and to an image scanning method. Also, an image scanning device of the present invention is applicable to a scanner, such as a film scanner or a book scanner, that scans an image from the upper side of a document table.

The invention claimed is:

1. An illuminating device for illuminating a target with light emitted from at least one light source of a light source unit, comprising:

a light-beam dividing element configured to divide the light emitted from the at least one light source into multiple light beams in a first plane;

a light-beam illumination element configured to receive the multiple light beams in the first plane and further configured to illuminate the target with the multiple light beams; and a light-beam combining element configured to cause the multiple light beams to overlap in the first plane on the target, wherein a distance between the light-beam dividing element and the light-beam illumination element is larger than a focal length of the light-beam dividing element and a focal length of the light-beam illumination element.

2. The illuminating device as claimed in claim 1, wherein the light-beam combining element is further configured to focus multiple light beams in a second plane on the target, where the second plane is orthogonal to the first plane.

3. The illuminating device as claimed in claim 1, wherein the light source unit includes a first light source configured to emit first light with a first wavelength and a second light source configured to emit second light with a second wavelength.

4. An image scanning device that illuminates a target having an image formed thereon with light emitted from a light source and scans the image by receiving light reflected from the target, comprising:

the illuminating device as claimed in claim 1 configured to illuminate the target with the light emitted from the light source; and an image sensor configured to scan the image by receiving the light reflected from the target.

5. The illuminating device as claimed in claim 1, further comprising:

an optical element disposed between the light-beam combining element and the target and configured to receive the light emitted from the at least one light source in a second plane that is orthogonal to the first plane and to illuminate the target with the light.

6. The illuminating device as claimed in claim 1, wherein the at least one light source emits collimated light that is parallel to an optical axis of the illuminating device.

7. The illuminating device as claimed in claim 1, wherein:

the light-beam dividing element includes first lenses arranged in the first plane;

the light-beam illumination element includes second lenses arranged in the first plane; and a number of the first lenses equals a number of the second lenses.

8. The illuminating device as claimed in claim 1, wherein:

the light source unit includes multiple light sources;

the light-beam dividing element includes first lenses arranged in the first plane;

the light-beam illumination element includes second lenses arranged in the first plane; and a number of the multiple light sources is different from a number of the first lenses and a number of the second lenses.

9. The illuminating device as claimed in claim 1, further comprising:

an optical element disposed between the light-beam combining element and the target and configured to separate the light emitted from the at least one light source into light beams with different wavelengths.

10. The illuminating device as claimed in claim 1, further comprising:

an absorber configured to absorb at least a portion of the light emitted from the at least one light source.

11. The illuminating device as claimed in claim 1, wherein the illuminating device is configured to illuminate a linear area on the target.

* * * * *